United States Patent [19]
Tone

[11] Patent Number: 5,361,342
[45] Date of Patent: Nov. 1, 1994

[54] TAG CONTROL SYSTEM IN A HIERARCHICAL MEMORY CONTROL SYSTEM

[75] Inventor: Hirosada Tone, Fuchu, Japan

[73] Assignee: Fujitsu Limited, Kawasaki, Japan

[21] Appl. No.: 737,333

[22] Filed: Jul. 29, 1991

[30] Foreign Application Priority Data

Jul. 27, 1990 [JP] Japan .................. 2-199729

[51] Int. Cl.⁵ ............................ G06F 13/00
[52] U.S. Cl. .................................. 395/425
[58] Field of Search .................. 395/425, 400

[56] References Cited

U.S. PATENT DOCUMENTS

| | | | |
|---|---|---|---|
| 4,394,731 | 7/1983 | Flusche et al. | 395/425 |
| 4,442,487 | 4/1984 | Fletcher et al. | 395/425 |
| 4,445,174 | 4/1984 | Fletcher | 364/200 |
| 4,503,497 | 3/1985 | Krygowski et al. | 395/425 |
| 4,755,930 | 7/1988 | Wilson, Jr. et al. | 395/425 |
| 4,783,736 | 11/1988 | Ziegler et al. | 364/200 |
| 4,823,259 | 4/1989 | Aichelmann, Jr. et al. | 395/425 |
| 5,097,409 | 3/1992 | Schwartz et al. | 395/425 |
| 5,222,224 | 6/1993 | Flynn et al. | 364/DIG. 1 |

FOREIGN PATENT DOCUMENTS

| | | |
|---|---|---|
| 53-11537 | 2/1978 | Japan . |
| 53-47240 | 4/1978 | Japan . |
| 53-73927 | 6/1978 | Japan . |
| 54-92137 | 7/1979 | Japan . |
| 56-19575 | 2/1981 | Japan . |
| 57-33472 | 2/1982 | Japan . |
| 60-138653 | 7/1985 | Japan . |
| 63-187354 | 8/1988 | Japan . |

*Primary Examiner*—David L. Robertson
*Attorney, Agent, or Firm*—Staas & Halsey

[57] ABSTRACT

A hierarchical memory control system including N central processing units each processing unit having a store-in type buffer storage unit; a main storage unit commonly used by the N central processing units; and a global buffer storage unit of a store-in type connected between the central processing units and the main storage unit. The global buffer storage unit is used for storing a data block transferred from the main storage unit, each entry of the global buffer storage unit being larger than each entry of the buffer storage unit, and the data block in each entry of the global buffer storage unit being divided into M divided blocks. In addition, the invention includes a tag unit for managing the entries of the global buffer storage unit, including tags respectively corresponding to the entries of the global buffer storage unit, each tag including managing data for managing the data block. A buffer control unit controls the managing data in the tag unit, the buffer control unit controlling the tag unit and the global buffer storage unit in such a way that, when the data stored in the buffer storage unit is modified, the modified data is reflected at the global buffer storage unit in accordance with the managing data in the tag unit. Also, when the data stored in the global buffer storage unit is modified, the modified data is reflected at the main storage unit in accordance with the managing data in the tag unit.

42 Claims, 23 Drawing Sheets

Fig. 6

| V | M | B 1 | B 2 ———————————————— B 19 |

Fig. 7

|   | $I_0$ | $I_1$ | $I_2$ | $I_3$ |
|---|---|---|---|---|
| $B_0$ | V  E  $M_0$ | $C_{00}$ | $C_{01}$ | $C_{02}$ | $C_{03}$ | B 1  B 2 ——— B 9 |
| $B_1$ | $M_1$ | $C_{10}$ | $C_{11}$ | $C_{12}$ | $C_{13}$ |
| $B_2$ | $M_2$ | $C_{20}$ | $C_{21}$ | $C_{22}$ | $C_{23}$ |
| $B_3$ | $M_3$ | $C_{30}$ | $C_{31}$ | $C_{32}$ | $C_{33}$ |

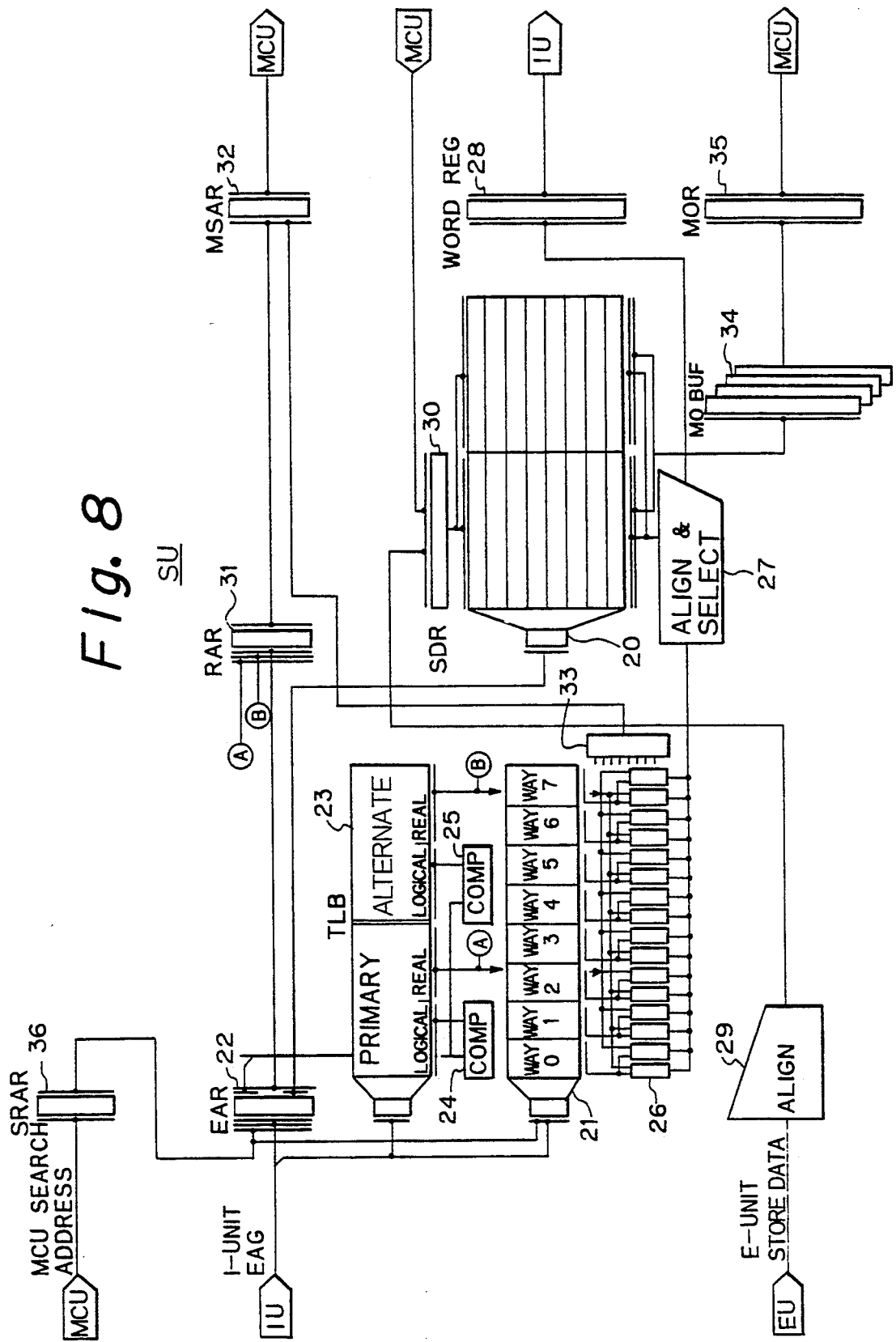

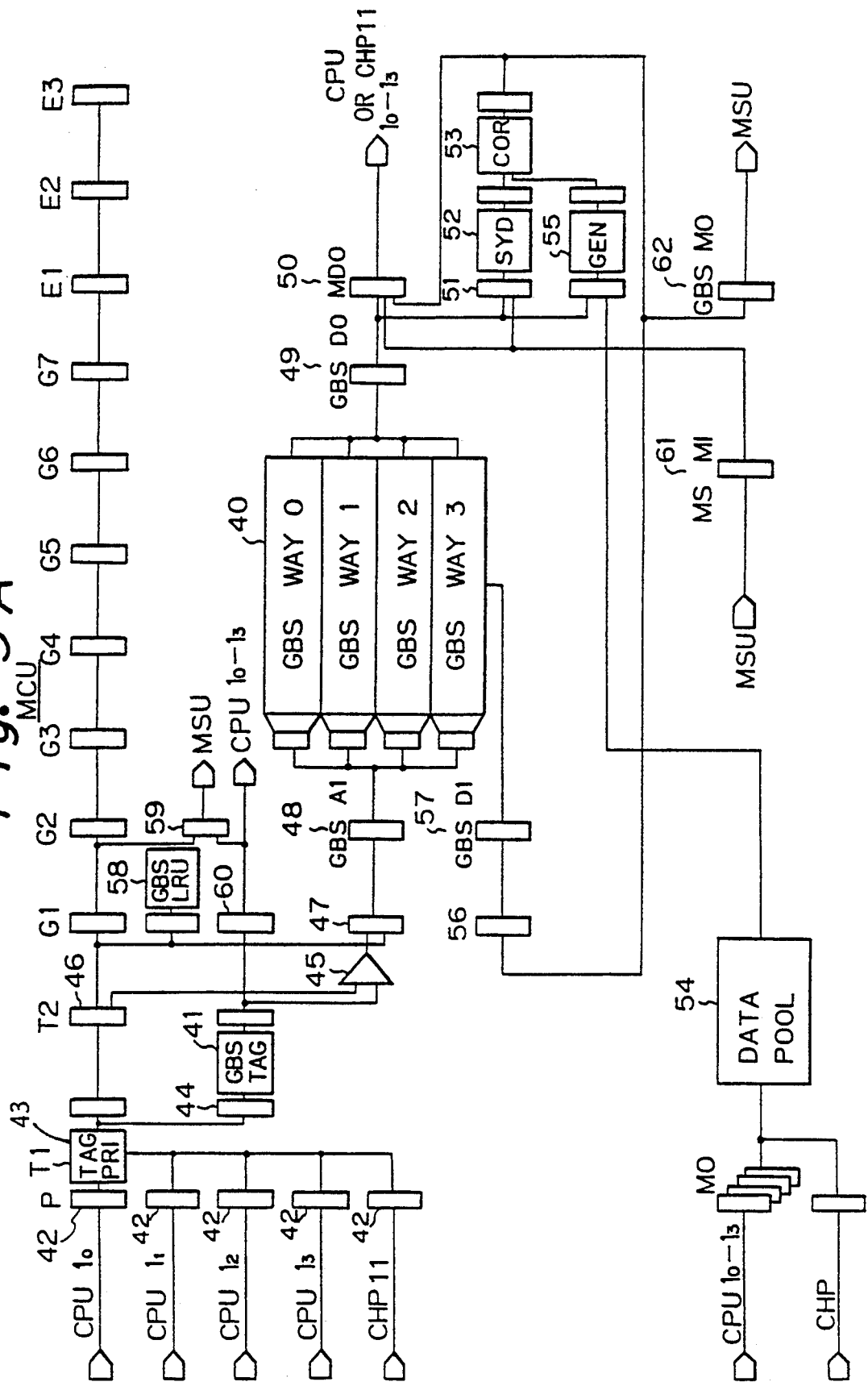

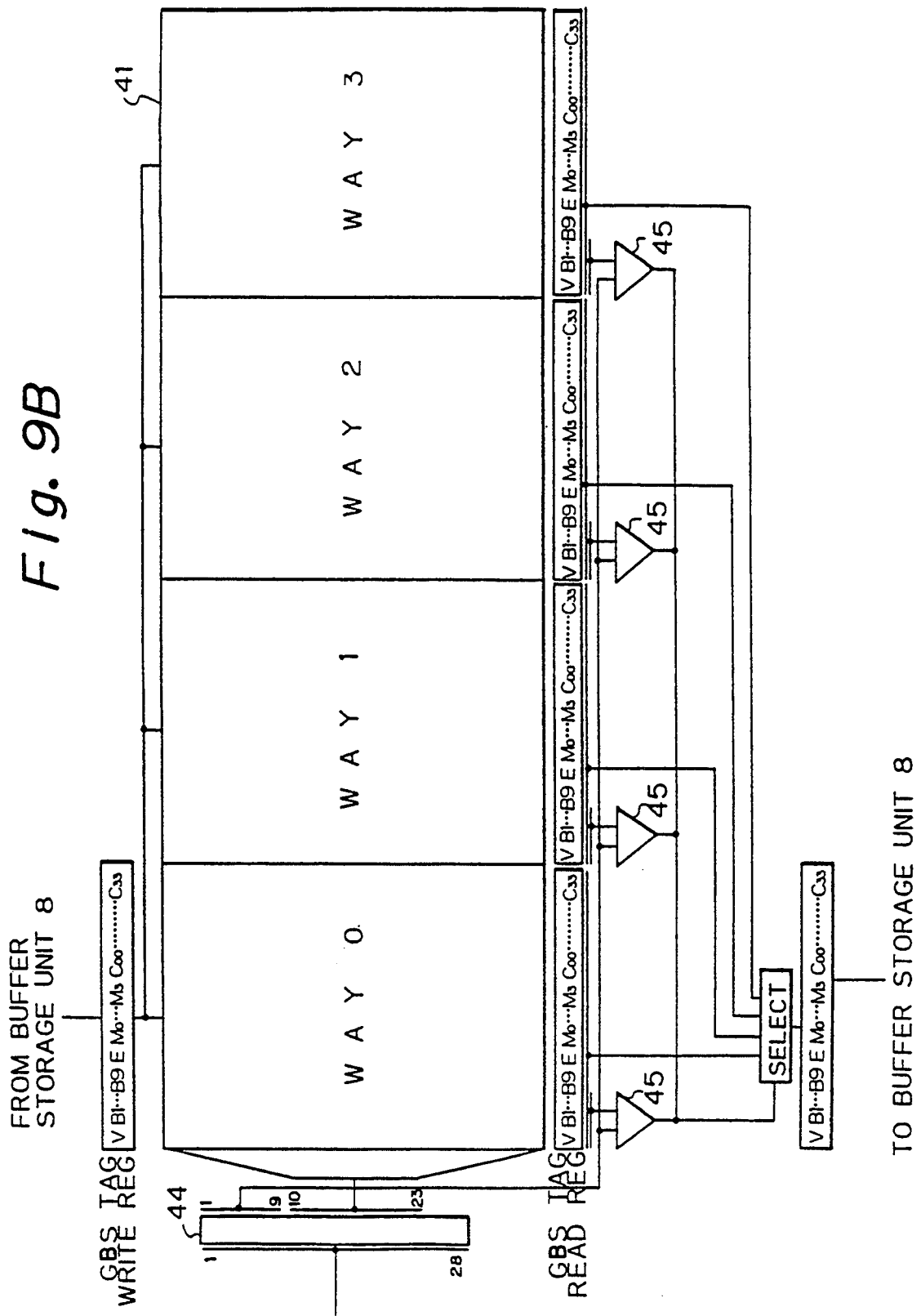

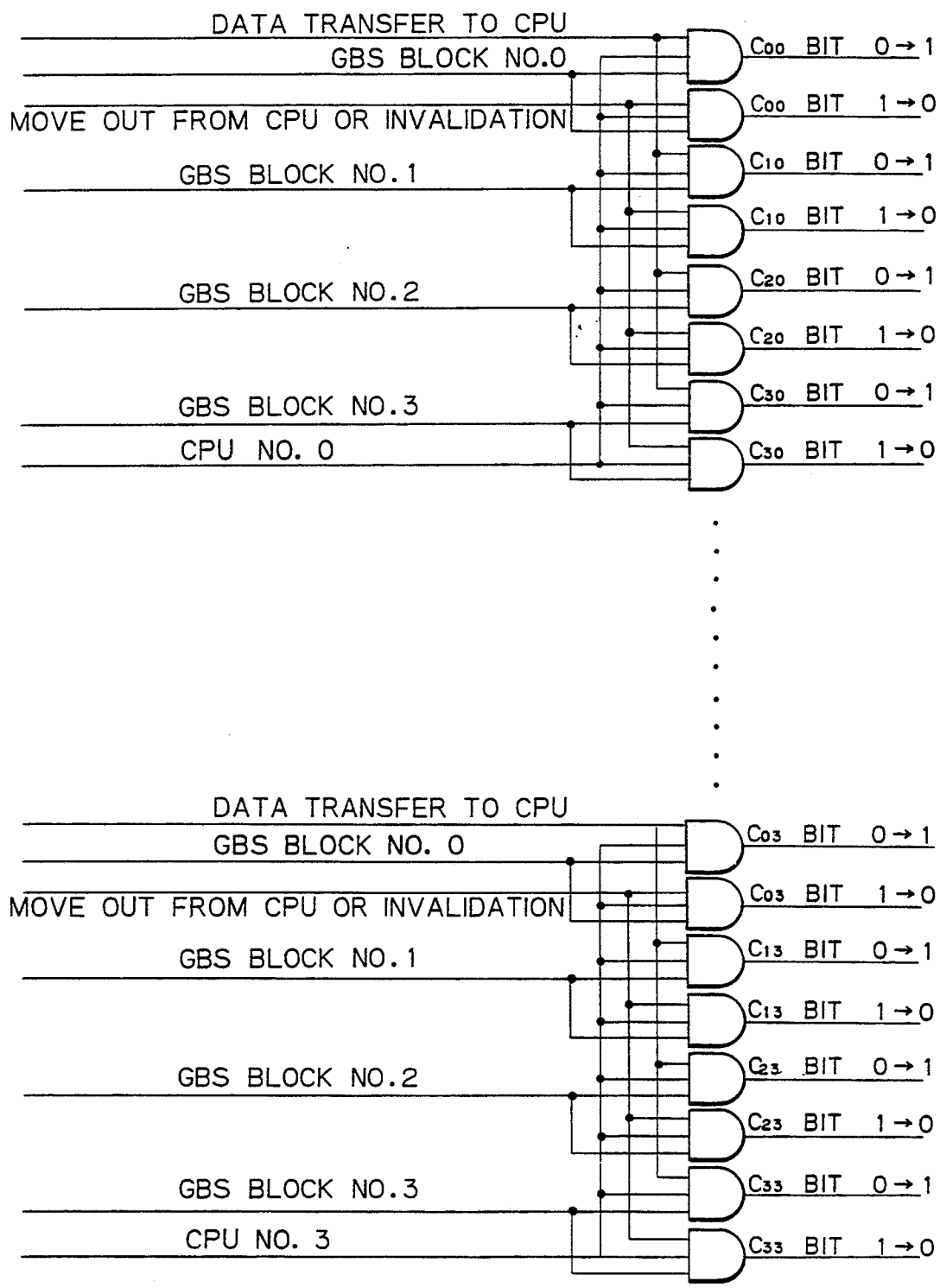

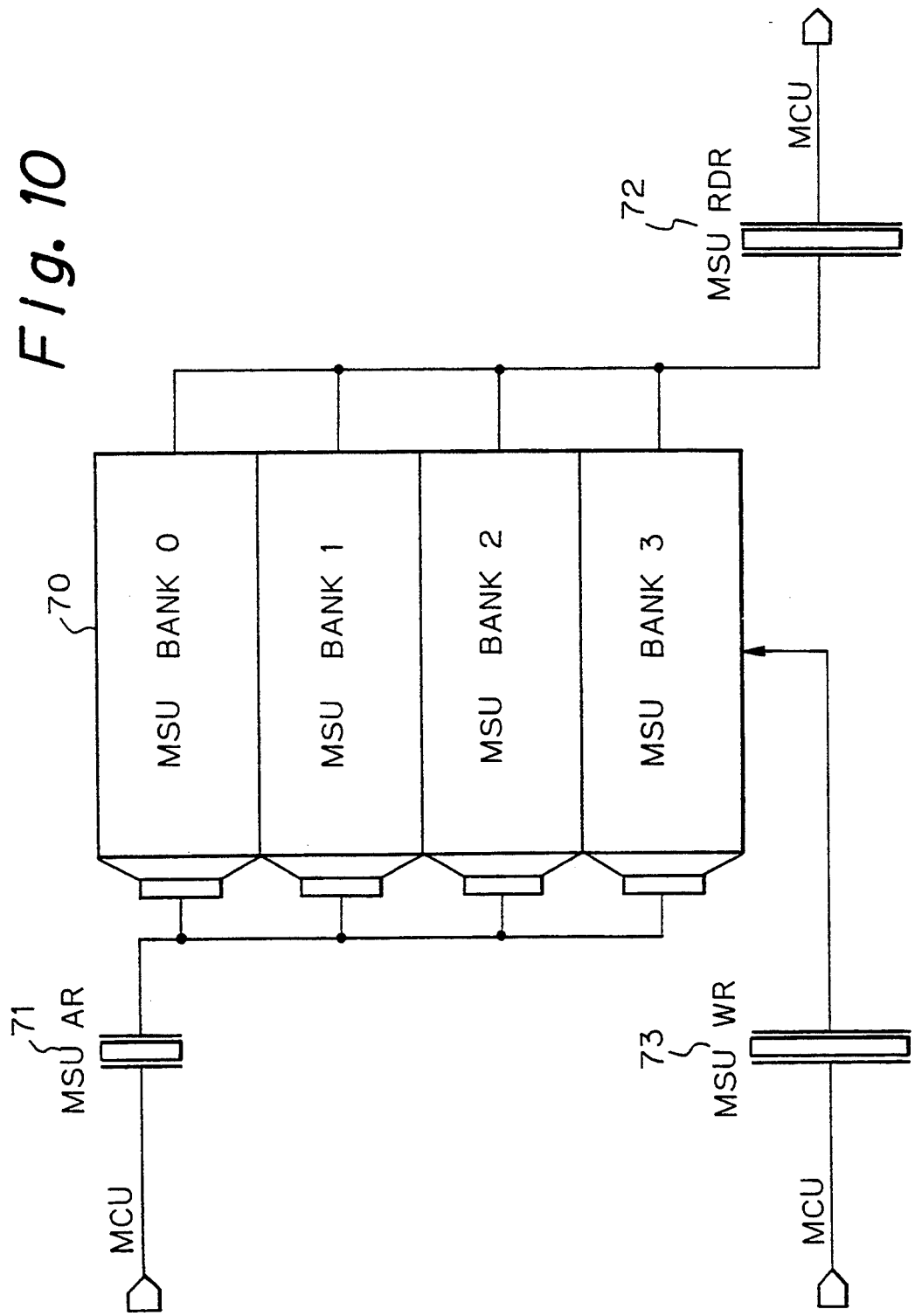

Fig. 11

| V=1 E=0 | $M_0=$ | $C_{00}=1$ | $C_{01}=$ | $C_{02}=$ | $C_{03}=$ | REAL ADDRESS=A |
| --- | --- | --- | --- | --- | --- | --- |
| | $M_1=$ | $C_{10}=$ | $C_{11}=$ | $C_{12}=$ | $C_{13}=$ | |
| | $M_2=$ | $C_{20}=$ | $C_{21}=$ | $C_{22}=$ | $C_{23}=$ | |
| | $M_3=$ | $C_{30}=$ | $C_{31}=$ | $C_{32}=$ | $C_{33}=$ | |

| V=1 E=0 | $M_0=$ | $C_{00}=1$ | $C_{01}=$ | $C_{02}=$ | $C_{03}=$ | REAL ADDRESS=A |
| --- | --- | --- | --- | --- | --- | --- |
| | $M_1=$ | $C_{10}=$ | $C_{11}=$ | $C_{12}=$ | $C_{13}=$ | |
| | $M_2=$ | $C_{20}=$ | $C_{21}=1$ | $C_{22}=$ | $C_{23}=$ | |
| | $M_3=$ | $C_{30}=$ | $C_{31}=$ | $C_{32}=$ | $C_{33}=$ | |

Fig. 12

| V=1 E=1 | $M_0=$ | $C_{00}=$ | $C_{01}=$ | $C_{02}=$ | $C_{03}=$ | REAL ADDRESS=A |
| --- | --- | --- | --- | --- | --- | --- |
| | $M_1=$ | $C_{10}=$ | $C_{11}=1$ | $C_{12}=$ | $C_{13}=$ | |
| | $M_2=$ | $C_{20}=$ | $C_{21}=$ | $C_{22}=$ | $C_{23}=$ | |
| | $M_3=$ | $C_{30}=$ | $C_{31}=$ | $C_{32}=$ | $C_{33}=$ | |

| V=1 E=1 | $M_0=$ | $C_{00}=$ | $C_{01}=$ | $C_{02}=$ | $C_{03}=$ | REAL ADDRESS=A |
| --- | --- | --- | --- | --- | --- | --- |
| | $M_1=$ | $C_{10}=$ | $C_{11}=1$ | $C_{12}=$ | $C_{13}=$ | |
| | $M_2=$ | $C_{20}=$ | $C_{21}=1$ | $C_{22}=$ | $C_{23}=$ | |
| | $M_3=$ | $C_{30}=$ | $C_{31}=$ | $C_{32}=$ | $C_{33}=$ | |

Fig. 17

| V = 1  E = 0 | $M_0=$ | $C_{00}=1$ $C_{01}=$ | $C_{02}=1$ $C_{03}=$ | REAL ADDRESS=A |
| | $M_1=$ | $C_{10}=1$ $C_{11}=$ | $C_{12}=1$ $C_{13}=$ | |
| | $M_2=$ | $C_{20}=1$ $C_{21}=$ | $C_{22}=1$ $C_{23}=$ | |
| | $M_3=$ | $C_{30}=$ $C_{31}=$ | $C_{32}=$ $C_{33}=$ | |

| V = 1  E = 1 | $M_0=$ | $C_{00}=0$ $C_{01}=$ | $C_{02}=0$ $C_{03}=$ | REAL ADDRESS=A |
| | $M_1=$ | $C_{10}=0$ $C_{11}=$ | $C_{12}=0$ $C_{13}=$ | |
| | $M_2=$ | $C_{20}=0$ $C_{21}=1$ | $C_{22}=0$ $C_{23}=$ | |
| | $M_3=$ | $C_{30}=$ $C_{31}=$ | $C_{32}=$ $C_{33}=$ | |

Fig. 18

| V = 1  E = 1 | $M_0=$ | $C_{00}=$ $C_{01}=$ | $C_{02}=$ $C_{03}=$ | REAL ADDRESS=A |
| | $M_1=$ | $C_{10}=$ $C_{11}=1$ | $C_{12}=$ $C_{13}=$ | |
| | $M_2=$ | $C_{20}=$ $C_{21}=$ | $C_{22}=$ $C_{23}=$ | |
| | $M_3=$ | $C_{30}=$ $C_{31}=$ | $C_{32}=$ $C_{33}=$ | |

| V = 1  E = 1 | $M_0=$ | $C_{00}=$ $C_{01}=$ | $C_{02}=$ $C_{03}=$ | REAL ADDRESS=A |
| | $M_1=$ | $C_{10}=$ $C_{11}=1$ | $C_{12}=$ $C_{13}=$ | |
| | $M_2=$ | $C_{20}=$ $C_{21}=1$ | $C_{22}=$ $C_{23}=$ | |
| | $M_3=$ | $C_{30}=$ $C_{31}=$ | $C_{32}=$ $C_{33}=$ | |

Fig. 23

| V=1 E=0 | $M_0=$ | $C_{00}=$ | $C_{01}=$ | $C_{02}=$ | $C_{03}=$ | REAL ADDRESS=A |
|---|---|---|---|---|---|---|
| | $M_1=$ | $C_{10}=$ | $C_{11}=$ | $C_{12}=$ | $C_{13}=$ | |
| | $M_2=$ | $C_{20}=1$ | $C_{21}=1$ | $C_{22}=1$ | $C_{23}=$ | |
| | $M_3=$ | $C_{30}=$ | $C_{31}=$ | $C_{32}=$ | $C_{33}=$ | |

| V=1 E=1 | $M_0=$ | $C_{00}=$ | $C_{01}=$ | $C_{02}=$ | $C_{03}=$ | REAL ADDRESS=A |
|---|---|---|---|---|---|---|
| | $M_1=$ | $C_{10}=$ | $C_{11}=$ | $C_{12}=$ | $C_{13}=$ | |
| | $M_2=$ | $C_{20}=0$ | $C_{21}=1$ | $C_{22}=0$ | $C_{23}=$ | |
| | $M_3=$ | $C_{30}=$ | $C_{31}=$ | $C_{32}=$ | $C_{33}=$ | |

Fig. 24

| V=1 E=1 | $M_0=$ | $C_{00}=$ | $C_{01}=$ | $C_{02}=$ | $C_{03}=$ | REAL ADDRESS=A |
|---|---|---|---|---|---|---|
| | $M_1=$ | $C_{10}=$ | $C_{11}=$ | $C_{12}=$ | $C_{13}=$ | |
| | $M_2=0$ | $C_{20}=$ | $C_{21}=1$ | $C_{22}=$ | $C_{23}=$ | |
| | $M_3=$ | $C_{30}=$ | $C_{31}=$ | $C_{32}=$ | $C_{33}=$ | |

| V=1 E=1 | $M_0=$ | $C_{00}=$ | $C_{01}=$ | $C_{02}=$ | $C_{03}=$ | REAL ADDRESS=A |
|---|---|---|---|---|---|---|
| | $M_1=$ | $C_{10}=$ | $C_{11}=$ | $C_{12}=$ | $C_{13}=$ | |
| | $M_2=1$ | $C_{20}=$ | $C_{21}=0$ | $C_{22}=$ | $C_{23}=$ | |
| | $M_3=$ | $C_{30}=$ | $C_{31}=$ | $C_{32}=$ | $C_{33}=$ | |

| V=1 | E=1 | $M_0=$ | $C_{00}=$ | $C_{01}=$ | $C_{02}=$ | $C_{03}=$ | REAL ADDRESS=A |
| | | $M_1=$ | $C_{10}=$ | $C_{11}=$ | $C_{12}=$ | $C_{13}=$ | |
| | | $M_2=0$ | $C_{20}=$ | $C_{21}=1$ | $C_{22}=$ | $C_{23}=$ | |
| | | $M_3=$ | $C_{30}=$ | $C_{31}=$ | $C_{32}=$ | $C_{33}=$ | |

| V=1 | E=1 | $M_0=$ | $C_{00}=$ | $C_{01}=$ | $C_{02}=$ | $C_{03}=$ | REAL ADDRESS=A |
| | | $M_1=$ | $C_{10}=$ | $C_{11}=$ | $C_{12}=$ | $C_{13}=$ | |
| | | $M_2=0$ | $C_{20}=$ | $C_{21}=0$ | $C_{22}=$ | $C_{23}=$ | |
| | | $M_3=$ | $C_{30}=$ | $C_{31}=$ | $C_{32}=$ | $C_{33}=$ | |

| V | E | $M_0$ | $C_0$ | $C_{P0}$ | $C_{P1}$ | $C_{P2}$ | $C_{P3}$ | B1 ------ B9 |
| | | $M_1$ | $C_1$ | | | | | |
| | | $M_2$ | $C_2$ | | | | | |
| | | $M_3$ | $C_3$ | | | | | |

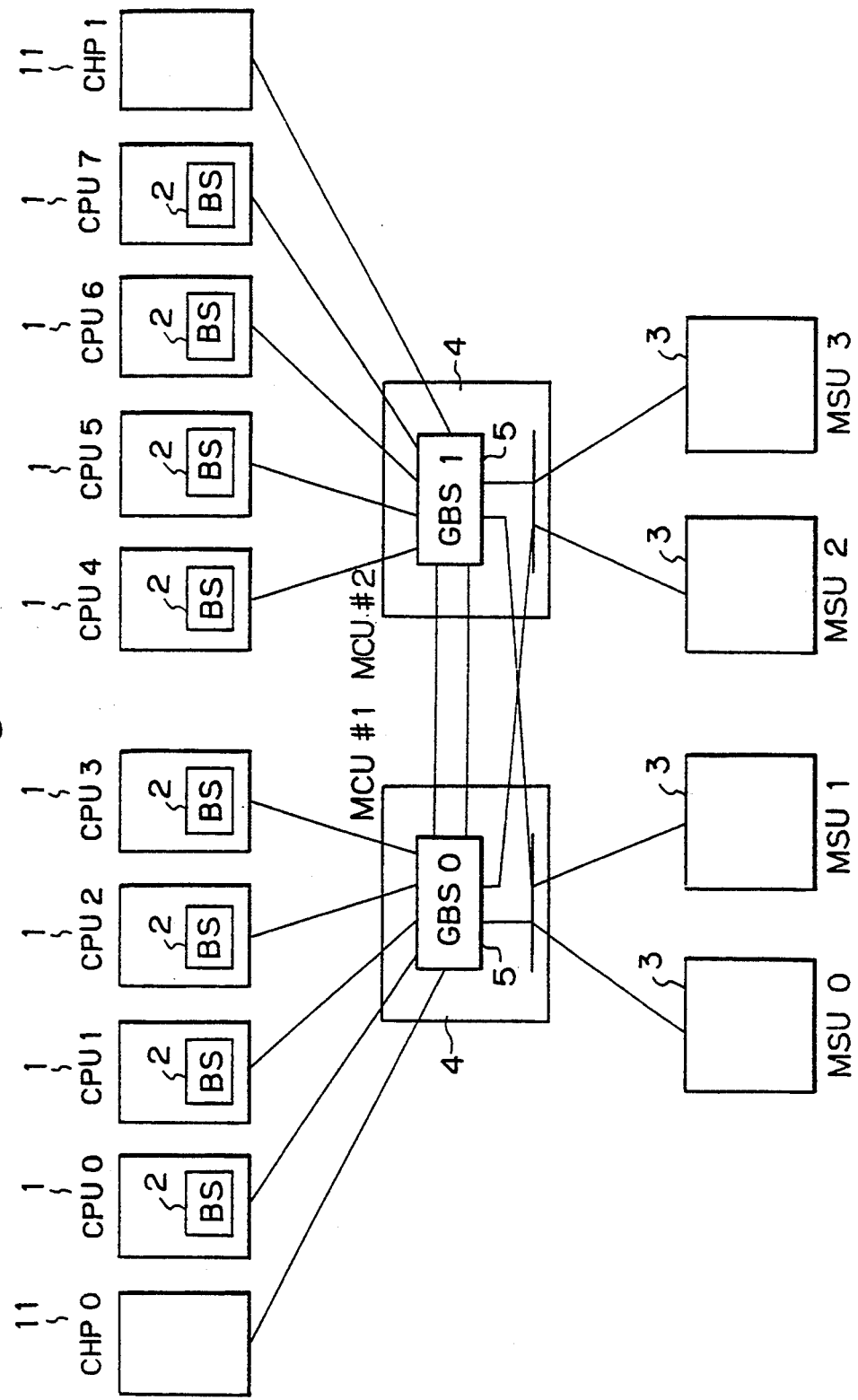

TAG CONTROL SYSTEM IN A HIERARCHICAL MEMORY CONTROL SYSTEM

BACKGROUND OF THE INVENTION

1. Field of the Invention

The present invention relates to a hierarchical memory control system in a data processing system, and more particularly, to a hierarchical memory control system having a common global buffer storage unit provided between one or more central processing units each having a store-in buffer storage unit and one or more main storage units commonly used by the central processing units, in which the global buffer storage unit has a relatively large memory capacity in comparison with the memory capacity of each buffer storage unit in each of the central processing units.

2. Description of the Related Art

In a large-scale computer system, it is difficult to obtain satisfactory system performance with a single processor, and therefore, a multi-processor configuration is employed, to thus improve the system performance. In a data processing system having the multi-processor configuration, each processor has a buffer storage unit called a cache memory.

A buffer storage control system contained in a data processing system having a multi-processor configuration, a store-through system and a store-in system are known. In the store-through system, when data in a cache memory is modified by the central processing unit, corresponding data in the main storage unit is simultaneously modified. Conversely, in the store-in system, the data in the main storage is not modified at the time of the modification of the cache memory in the central processing unit, but the data modified by the central processing unit is copied into the main storage unit when the central processing unit requires the data in the cache memory to be transferred to the main storage or when the cache memory is full of data.

In the conventional data processing system, the store-through method is employed, but due to the increase of the number of the processors used in a multi-processor system, the storage accessing frequency is increased in the store-through method, because this method requires modified data storing steps. Therefore, the store-in method is now increasingly used in recent data processing systems.

On the other hand, to improve the system performance, it is essential to improve the storage accessing time and the storage throughput, and as one countermeasure, there is provided a configuration in which a medium speed, large capacity global buffer storage unit is provided between the cache memories in the central processing units and the main storage units.

In the conventional data processing system, however, when the global buffer storage unit is employed, only the store-through buffer storage control system is employed, as a store-in buffer control system can not be employed. Therefore, a problem arises in the conventional data processing system in that a sufficient improvement of the system performance is not obtained. Namely, in the conventional data processing system, when the global buffer storage unit is employed, the data in the global buffer storage unit is read by a central processing unit comprising a store-through cache memory, and thus the conventional data processing system does not support the store-in control system employed in most multi-processing systems.

Further, in the conventional data processing system comprising a global buffer storage unit, the size of each entry of the global buffer storage is the same as the size of each entry of the cache memory in the central processing unit. Therefore, in the conventional store-through system, a system such as that in which the size of the global buffer storage unit is larger than that of the cache memory does not exist. Further, in the conventional data processing system, a system such as that in which the storage capacity of the global buffer storage unit is larger than that of the cache memory does not exist.

Still further, in a conventional data processing system of a Tightly Coupled multi-processor (TCMP) type, which processes data by a common use of storage, cache memories in the central processing units can be mutually accessed. Nevertheless, a system such as that in which a global buffer storage unit is commonly used by the central processing units does not exist. Accordingly, in the conventional TCMP type data processing system, a problem arises in that a sufficient improvement of the system performance can not be obtained.

SUMMARY OF THE INVENTION

The present invention is provided in view of the above problems and circumstances, and an object thereof is to provide a new hierarchical memory control system which realizes, in a multi-processing data processing system employing a global buffer storage unit having a large capacity and provided between one or more central processing units each comprising a buffer storage unit (or cache memory) and one or more main storage units commonly used by the central processing units, a buffer storage control using the store-in system that will enable an efficient data processing even when the number of the processors is increased.

To attain the above object, according to the present invention, there is provided a hierarchical memory control system including N central processing units each including a store-in type buffer storage unit, where N is a positive integer; at least one main storage unit for storing main memory data commonly used by the N central processing units; and a global buffer storage unit of a store-in type connected between the central processing units and the main storage unit. The N central processing units are able to commonly use the global buffer storage unit. The global buffer storage unit includes a data managing unit operatively connected to the N central processing units and to the at least one main storage unit and having a plurality of entries each storing a data block transferred from the main storage unit. Each of the entries has a relatively large memory capacity in comparison with the memory capacity of each entry of the buffer storage unit. The data block in each entry of the data managing unit is divided into M divided blocks, where M is a positive integer. The global buffer storage unit further includes a tag unit operatively connected to the data managing unit for managing the entries of the data managing unit. The tag unit includes a plurality of tags respectively corresponding to the entries of the data managing unit, and each of the tags in the tag unit manages data for managing the data block. The global buffer storage unit further comprises a buffer control unit operatively connected to the tag unit and to the data managing unit for controlling the managing data in the tag unit.

The managing data in each of the tags comprises a valid bit indicating whether or not the corresponding entry of the data managing unit is valid, and an exclude bit indicating whether or not the corresponding entry of the data managing unit is exclusively accessed by one of the N central processing units. In addition, the managing data includes M modify bits respectively corresponding to the M divided blocks, each of the M modify bits indicating whether or not the data in the corresponding divided block has been modified after the data in the divided block was transferred from the main storage unit. Further, the managing data includes copy bits each corresponding to one of the M divided blocks and one of the N central processing units, for indicating whether or not the data in the corresponding divided block is copied to the buffer storage unit in the corresponding N central processing units, and address bits indicating an address in the main storage unit. The data block is transferred from the address to the entry of the data managing unit.

The buffer control unit controls the tag unit and the data managing means in such a way that, when the data stored in the buffer storage unit is modified, the modified data is reflected on the data managing unit in the global buffer storage unit in accordance with the managing data in the tag unit. In addition, when the data stored in the data managing unit is modified, the modified data is reflected on the main storage unit in accordance with the managing data in the tag unit.

According to one aspect of the present invention, the copy bits in each of the tags have M×N copy bits each corresponding to one of the M divided blocks and one of the N central processing units.

According to another aspect of the present invention, the copy bits in each of said tags consist of M block bits each corresponding to one of the M divided blocks and N CPU bits each corresponding to one of the N central processing units. Thus, when one of the M block bits indicates that the corresponding block is being copied and when one or more CPU bits indicate that the corresponding central processing units are copying data, the block is deemed to be copied to the one or more central processing units.

According to still another aspect of the present invention, each of the tags includes a single exclude bit for indicating whether or not the entry corresponding to the tag is used by a central processing unit with an exclusive right.

Alternatively, each of the tags includes M exclude bits each indicating whether or not the corresponding block in the entry corresponding to the tag is used by a central processing unit with an exclusive right.

According to further aspect of the present invention, there is provided a hierarchical memory control system comprising two data processing systems, each of the two data processing systems being substantially the same as the hierarchical memory control system described above. According to this aspect of the present invention, the global buffer storage unit commonly uses the main storage units by referring to the managing data in the tag unit managed by the global buffer storage unit of the opposite or second system (#2). When a central processing unit of the own or first system (#1) generates a data block transfer request, the buffer control unit in the own or first system (#1) searches for the requested data block in the data managing unit of the own system (#1), by referring to the tag unit of the own system (#1). When it is determined that the requested data block is not stored in the data managing unit of the own system (#1), the buffer control unit in the own system (#1) generates a data block transfer request to the main storage unit of the own system (#1), and further, generates a search request to search for the data block in the data managing unit of the opposite or second system (#2) by referring to the managing data in the tag unit of the opposite system (#2). As a result of the search, when the requested data block is stored in the data managing unit of the opposite system (#2), the transfer request issued to the main storage unit of the own system (#1) is cancelled, and a transfer request for a transfer of an entry including the requested data block is issued to the global buffer storage unit of the opposite system (#2). The global buffer storage unit of the opposite system (#2), which has received the transfer request, transfers the entry including the requested data block to the global buffer storage unit originating the request in the first system. During the transfer process, when the exclude bit in the tag corresponding to the entry indicates that the entry is used with an exclusive right, the copied data block in the buffer storage unit of the corresponding central processing unit exclusively using the data block is moved out to the global buffer storage unit in the second system, and the moved out entry is then transferred to the global buffer storage unit originating the request.

According to an aspect of the present invention, the global buffer storage unit of the own system (#1) includes a copy of the managing data in the tag unit in the global buffer storage unit of the opposite system (#2), and by referring to the copy, it is determined whether or not the data block requested by the central processing unit of the own system (#1) is stored in the global buffer storage unit of the opposite system (#2).

When the modify bit corresponding to the transferred block indicates that the block has been modified, the data block is transferred to the main storage unit of the own system, the modify bit is reset to indicate that the block is not modified, and then the entry is transferred to the global buffer storage unit originating the data transfer request of the own system.

The global buffer storage unit originating the data transfer request registers the modify bits in the entry to be transferred as modify bits in the tag unit of the own system (#).

BRIEF DESCRIPTION OF THE DRAWINGS

The above object and features of the present invention will be more clearly understood from the following description of the preferred embodiments when read in conjunction with the accompanying drawings, wherein:

FIG. 6 is a diagram showing an example of a BS tag for controlling an entry of the buffer storage unit shown in FIG. 4;

FIG. 7 is a diagram showing an example of a GBS tag for controlling an entry of the global buffer storage unit shown in FIG. 5;

FIG. 8 is a diagram showing a buffer control unit in a central processing unit in the system shown in FIG. 3;

FIG. 9A is a diagram showing a memory control unit including the global buffer storage unit in the system shown in FIG. 3;

FIG. 9B is a diagram showing in detail the construction of the GBS tag unit 41 and its periphery in the memory control unit shown in FIG. 9A;

FIG. 9H is a diagram showing a logic circuit for changing copy bits in a GBS tag;

FIG. 10 is a block diagram showing the construction of the main storage unit in the system shown in FIG. 3;

FIG. 11 to FIG. 25 are diagrams explaining various changes of the contents of a GBS tag according to an embodiment of the priest invention;

FIG. 26 is a diagram showing a third embodiment of the invention showing another example of a GBS tag for controlling an entry of the global buffer storage unit in the system shown in the second embodiment in FIG. 3;

FIG. 28 is a block diagram showing a data processing system according to another or fourth embodiment of the present invention.

DESCRIPTION OF THE PREFERRED EMBODIMENT

Figure 1:
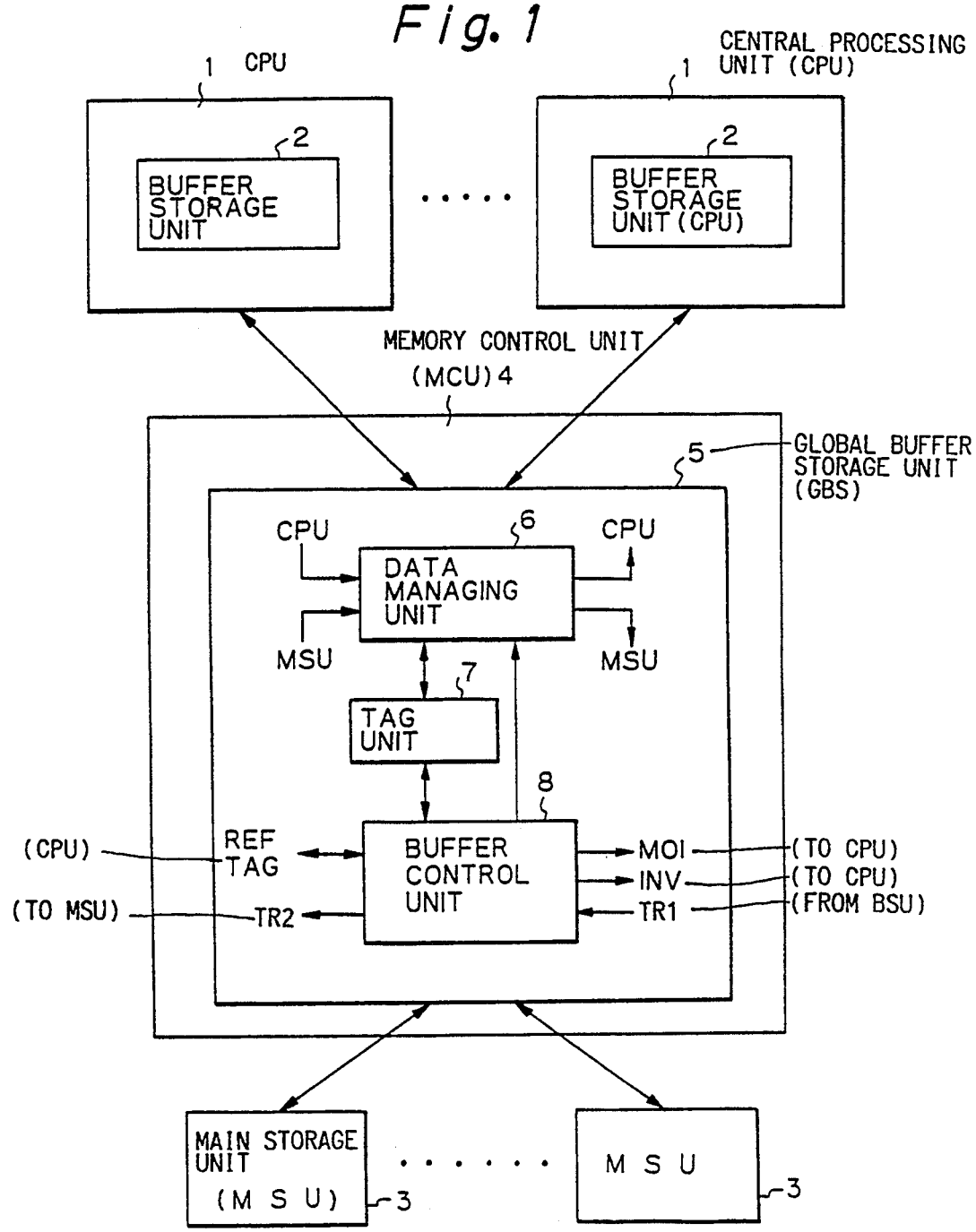
FIG. 1 is a block diagram showing the principle of a data processing systems according to an embodiment of the present invention.
Figure 2:
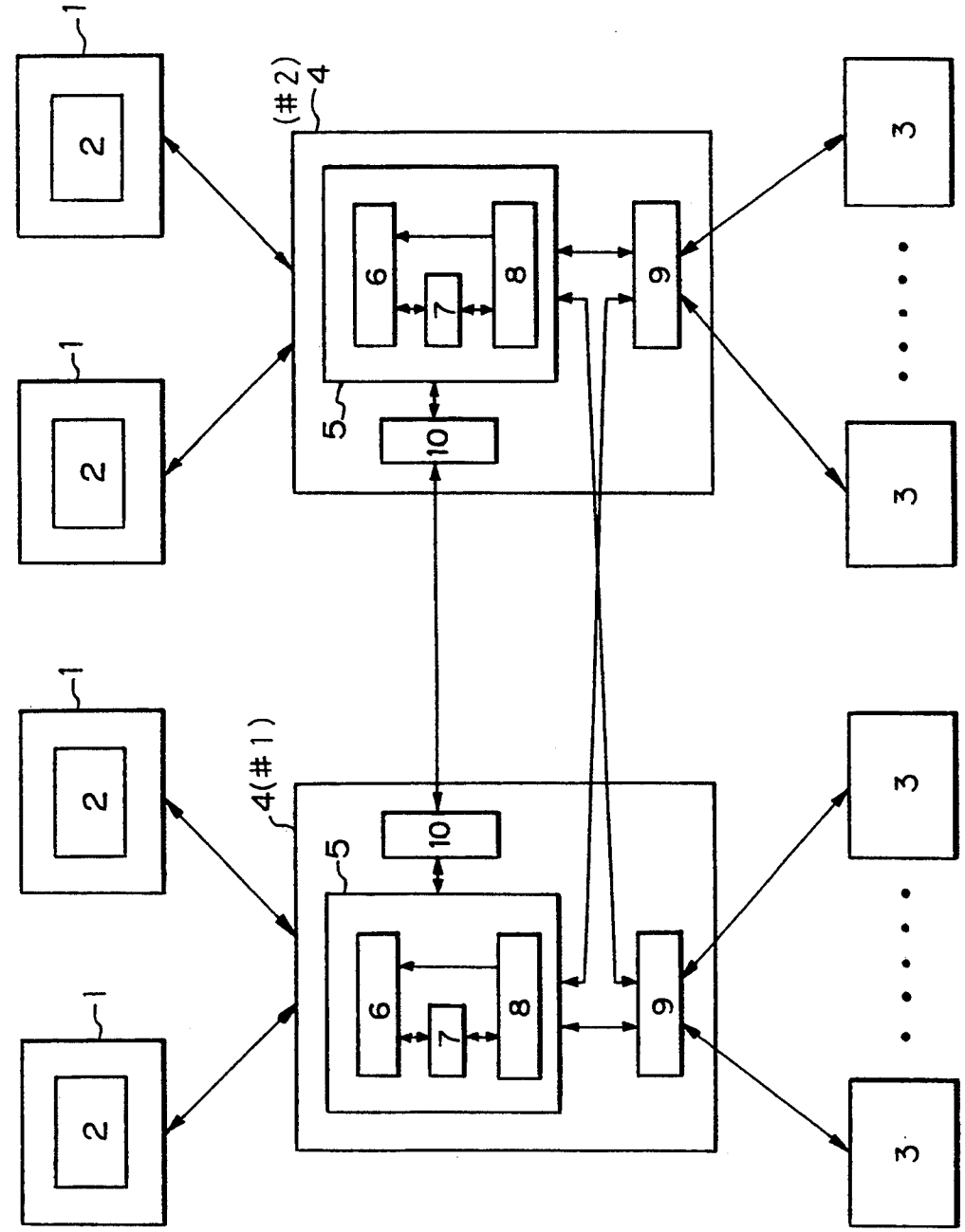
FIG. 2 is a block diagram showing the principle of a data processing systems according to another or second embodiment of the present invention.

FIG. 1 shows a principal construction of a first embodiment of the present invention, and FIG. 2 shows a principal construction of another or second embodiment of the present invention.

In the first embodiment, a hierarchical memory control system is realized by providing a tree-hierarchical memory structure in which a buffer storage unit is controlled by the store-in method. In the second embodiment, a hierarchical memory control system is realized in a data processing system of the TCMP type, which is constructed by using the data processing system of the first embodiment.

In FIG. 1, reference numeral 1 is one or a plurality of central processing units each comprising a store-in type buffer storage unit 2. Reference numeral 3 is one or a plurality of main storage units which are commonly used by the central processing units, 4 is a memory control unit for controlling the main storage units 3, and 5 is a store-in type global buffer storage unit (GBS) provided between the buffer storage units 2 and the main storage units 3 and having a relatively large storage capacity in comparison with the storage capacity of each buffer storage unit 2. The global buffer storage unit 5 is provided in, for example, the memory control unit 4, as illustrated.

Each of the main storage units 3 has an extremely large memory capacity of, for example, 1 giga bytes. The global buffer storage unit 5 has a memory capacity of, for example, 16 mega bytes, which is smaller than the total memory capacity of the main storage units. Each of the buffer storage units 2 has a relatively small memory capacity of, for example, 32 kilo bytes, which is smaller than the memory capacity of the global buffer storage unit 5. The global buffer storage unit 5 has a plurality of entries each having a relatively large size of, for example, 256 bytes. In each entry of the global buffer storage unit 5, main memory data of, for example, 256 bytes, is transferred from one of the main storage units 3 and is temporarily stored therein. Each of the buffer storage units 2 in each of the central processing units 1 has a plurality of entries each having a relatively small size of, for example, 64 bytes.

Each of the main storage units 3 stores main memory data. Part of the main memory data in the main storage units 3 is transferred to the global buffer storage unit 5 and is temporarily stored therein, and part of the main memory data in the global buffer storage unit 5 is transferred to each of the buffer storage units 2 in the central processing units 1 and is temporarily stored therein. Each of the buffer storage units 2 may store part of the main memory data directly transferred from the main storage units 3 when the global buffer storage unit 5 does not store the necessary data. The main memory data in each of the buffer storage units 2 may be modified by an execution of a data processing by the central processing unit 1 including the buffer storage unit 2. When the main memory data in a buffer storage unit 2 is modified, the corresponding main memory data in the global buffer storage unit 5 and in the main storage units 3 also must be modified so that the main memory data of the same address remains the same in the main storage units 3, in the global buffer storage unit 5, and in the buffer storage units 2.

When the main memory data in a buffer storage unit 2 is modified in a central processing unit 1, the modified main memory data in each entry of, for example, 64 bytes, is moved out to the corresponding address in the global buffer storage unit 5 in accordance with the Least Recently Used (LRU) method and so forth, so that the modification of data in the buffer storage unit 2 is reflected in the main memory data stored in the global buffer storage unit 5. The modified main memory data stored in each entry of the global buffer storage unit 5 is then moved out to the corresponding address in one of the main storage units 3 in accordance with the LRU method and so forth, so that the modification of the main memory data in the global buffer storage unit 5 is reflected in the main memory data stored in the main storage unit 3 which is the managing origin. The move-out process from the buffer storage unit 2 to the global buffer storage unit 5 is executed in accordance with the entry size of the buffer storage unit 2, i.e., 64 bytes, for example. The move-out process from the global buffer storage unit 5 to the main storage unit 3 is also executed in accordance with the entry size of the buffer storage unit 2, i.e., 64 bytes, for example. Note that it is also possible to move out the main memory data from the global buffer storage unit 5 to the main storage unit 3 in accordance with another block size, for example, 128 bytes.

In the following, the expression "data transfer" means a kind of data transfer in which the data of the transferred origin or device originating the transfer is maintained as valid data such as the data transfer from a main storage unit 3 to the global buffer storage unit 5 or from the global buffer storage unit 5 to a buffer storage unit 2. When data transmitted from the main storage unit 3 to the GBS 5 is modified, the "move-out" feature guarantees unity of the data by backing up the modified data to the main storage unit 3. Similarly, when data transmitted from the GBS 5 to the buffer storage unit 2 is modified, unity of the data is guaranteed by backing up the modified data to the GBS 5. Namely along with the execution of the move out, an indication of the validity of the remaining original data is set to be invalid.

The global buffer storage unit 5 comprises a data managing unit 6, a GBS tag unit 7, and a buffer control unit 8.

The data management unit 6 holds data blocks transmitted from the main storage unit 3 to the GBS 5. The tag unit 7 holds a real address and control information of the data transmitted to the GBS 5. The buffer control unit 8 controls the data management unit 6 and tag unit 7.

Assuming that each entry in the data managing unit 6 is divided into M blocks ($M > 1$), and assuming that the number of the central processing units 1 which commonly use the global buffer storage unit 5 is N ($N \geq 2$), then each of the tags for each entry of the global buffer storage unit 5 includes a valid bit, an exclude bit, M modify bits, copy bits, and an address, as shown in FIG. 7.

The valid bit indicates whether the entry in the data managing unit 6 is valid or invalid, and the exclude bit indicates whether or not the entry in the data managing unit 6 is exclusively accessed by one of the central processing units 1. Alternatively, M exclude bits may be provided to correspond to each entry in the global buffer storage unit 5. In this case, each exclude bit corresponds to one of the divided blocks in the entry of the global buffer storage unit 5, and indicates whether or not the corresponding block in the entry in the data managing unit 6 is exclusively accessed by one of the central processing units 1.

When data in a buffer storage unit 2 is modified by an execution of a data processing by the corresponding central processing unit 1, the modified data is moved out by the LRU method to the corresponding area in the global buffer storage unit 5, as mentioned before, and thus the corresponding data in the global buffer storage unit 5 is also modified. Each of the M modify bits indicates whether or not the data in the corresponding block in the entry in the data managing unit 6 has been modified after a data transfer from the buffer storage unit 2 to the global storage unit 5.

Each of the copy bits indicates which one of the buffer storage units 2 stores the copy of which one of the blocks in the entry in the data managing unit 6.

The address indicates the real address information on the main storage units 3 of the entry in the data managing unit 6.

The exclude bit included in the tag is set to allow only one central processing unit 1 to access the global buffer storage unit 5 when the central processing unit 1 executes a rewrite of the main memory data in its buffer storage unit 2 or when the rewritten data is moved out to the global buffer storage unit 5. If a second central processing unit is allowed to access the global buffer memory unit 5 while the first central processing unit is executing the rewriting or moving out the rewritten data, the main memory data in the first central processing unit may become different from the main memory data obtained from the same address in the global buffer storage unit 5 and stored in the second central processing unit. The above exclusive process is provided to prevent such a noncoincidence or disparity of data stored in the total system.

Therefore, when the exclude bit indicates that an exclusive right is acquired, the state is such that the data in the entry of the data managing unit 6 is being copied to only a particular one of the central processing units 1.

When M exclude bits are provided to correspond to the divided blocks in the entry, and when an exclude bit indicates that an exclusive right is acquired, it can be immediately known which one of the data in the divided blocks in the entry is copied to the buffer storage unit 2 in which one of the central processing units 1, simply by referring to the exclude bit indicating that the exclusive right is acquired for the block. This is because the block corresponding to the exclude bit indicating that the exclusive right is acquired and the block including the copy bit indicating the copied state are in a one to one relationship.

In contrast, when a single exclude bit is provided to correspond to one entry of the global buffer storage unit 5, it is necessary to refer to not only the exclude bit but also to a copy bit, when it is necessary to know which one of the blocks in the data managing unit 6 is copied to which one of the buffer storage units 2.

On the other hand, when the exclude bit does not indicate the exclusive right acquisition state, the central processing units 1 can read the main memory data stored in the entry of the global buffer storage unit 5 only for reference and not for rewriting. Therefore, the data in the entry of the data managing unit 6 is not being copied by one or a plurality of central processing units 1.

Each of the modify bits included in each tag in the GBS tag unit 7 indicates whether or not the data in the corresponding block in the entry in the data managing unit 6 is modified after a data transfer from the main storage units 3 to the block in the entry of the global buffer storage unit 5. The modification of the data in a block in the entry in the global buffer storage unit 5 is executed only when the corresponding data in a buffer storage unit 2 is modified by the central processing unit 1 and the modified data is moved out from the buffer storage unit 2 to the block in the entry of the global buffer storage unit 5. Therefore, the modify bit indicating the modified state represents that the data in the block in the entry of the global buffer storage unit 5 has a hysteresis or was different than the data stored in buffer storage unit 2 such that the data was returned from the central processing unit 1 which has acquired the exclusive right to modify the data.

Each tag in the tag unit 7 includes, according to an embodiment of the present invention, $M \times N$ copy bits, but when this managing process by the use of the $M \times N$ copy bits is executed, the hardware amount is very large.

Therefore, as the copy bits, according to another embodiment of the present invention, $(M+N)$ copy bits may be employed for each tag in which there are M block bits allocated to the M-divided blocks in the entry respectively, and N CPU bits allocated to the N central processing units 1 respectively. Here, each block bit indicates whether or not the corresponding block is being copied, and each CPU bit indicates whether or not the corresponding central processing unit 1 is the destination of the copy.

By this construction, M×N points of copy bits can be compacted to (M+N) points of copy bits, and thus the hardware can be reduced. In this case, however, there may be a block which is not actually copied on the buffer storage unit 2 in any central processing unit 1, even when the block is managed as being copied in the central processing unit 1. Therefore, since the blocks which are not copied are also indicated to be copied by the buffer storage unit 2, this construction may enforce unnecessary processes on the central processing units 1. Note that the unnecessary processes, however, are not error processes and do not cause any serious problem, as later described in more detail.

FIG. 2 shows a data processing system according to another or second embodiment of the present invention. In the figure, the data processing system consists of at least two systems which are each the hierarchical memory control system of the embodiment shown in FIG. 1. The global buffer storage unit 5 in each of the data processing systems refers to not only the managing data in the tag unit 7 of the own or first system (#1) but also to the managing data in the tag unit 7 in the global buffer storage unit 5 of the other or second system. In addition, the main storage units 3 are commonly used to execute the data processing.

In FIG. 2, each of the memory control units 4 comprises an interface unit 9 and a communication unit 10. The interface unit 9 executes an interface process between the memory control unit 4 and the main storage units of the own system (#1), and the communication unit 10 executes a communication process between the global buffer storage units 5 in the own system (#1) and in the other system (#2).

Each of the global buffer storage units 5 manages its own tag unit 7, and further, may comprise copies of the managing data in another tag unit 7 contained in the global buffer storage unit 5 of another system.

First, the operation of the embodiment described with reference to FIG. 1 is explained, and then the operation of the embodiment described with reference to FIG. 2 is explained.

According to the embodiment shown in FIG. 1, when one of the buffer storage units 2 does not store the main memory data necessary for data processing, the central processing unit 1 containing the buffer storage unit 2 issues a transfer request signal (TR1) which is applied to the buffer control unit 8 in the global buffer storage unit 5. The transfer request signal TR1 is a signal requesting the buffer control unit 8 to transfer a block of the main memory data from the data managing unit 6 to the buffer storage unit 2. In response to the transfer request signal TR1, the buffer control unit 8 refers to the managing data in the tag unit 7, to determine whether or not the data block required to be transferred is stored in the data managing unit 6.

After this search process, two cases exist; i.e., (A) a case in which the requested data block is not present in the data managing unit 6, and (B) a case in which the requested data block is present in the data managing unit 6.

The case (A) includes two further cases; i.e., (A1) a case in which the entry having a data block to be replaced by the requested data block has been used without an exclusive right, and (A2) a case in which the entry having a data block to be replaced by the requested data block has been used with an exclusive right.

Also, the case (B) includes two further cases; i.e., (B1) a case in which the entry having the requested data block has been used without an exclusive right, and (B2) a case in which the entry having the requested data block has been used with an exclusive right.

Further, the case (B1) includes two cases; i.e. (B1$_i$) the case in which the central processing unit 1 requests the data block without an exclusive right, and (B1$_{ii}$) the case in which the central processing unit 1 requests the data block with an exclusive right.

Similarly, the case (B2) includes two cases; i.e., (B2$_i$) the case in which the central processing unit 1 requests the data block without an exclusive right, and (B2$_{ii}$) the case in which the central processing unit 1 requests the data block with an exclusive right.

The operations in these cases are described as follows.

(A) When it is determined that the data block required by the central processing unit 1 is not stored in the data managing unit 6, i.e., when the tag unit 7 does not store the address of the required main memory data, the buffer control unit 8 selects one of the entries of the data managing unit 6 which is storing unwanted data to be replaced by the required data from one of the main storage units 3. Then, the buffer control unit 8 generates a transfer request signal TR2, which is applied to the main storage units 3 to request data transfer of the requested block from the main storage unit 3 to the selected entry of the data managing unit 6.

If the selected entry stores main memory data which has been modified by any one of the central processing units 1, the modified main memory data should be reflected at the main storage unit 3, which is the managing origin or originator of the main memory data, before replacing the modified main memory data with the requested data. To this end, the following process sequence is executed.

Namely, first the buffer control unit 8 refers to or accesses the tag unit 7 to determine whether or not the exclude bit of the selected entry, in which the data to be replaced by the requested data is stored, indicates that the entry has been used with an exclusive right.

(A1) As a result of this determination, when it is determined that the exclusive right is not set for the selected entry, this means that one or a plurality of the central processing units 1 may read the data in the selected entry only for reference and not for rewriting the data in the global buffer storage unit 5. In this case, the buffer control unit 8 refers to the copy bits in the selected entry in the tag unit 7, to determine which one of the divided blocks in the entry is being copied to which one of the central processing units, and then the buffer control unit 8 generates an invalidating signal INV by which the copied data block in the central processing unit 1 is made invalid. Thereafter, only the modified data block in the selected entry to be replaced is moved out or transferred to the main storage unit 3 which is the managing origin or originator of the main memory data. Here, the reason why not only the move out but also the data transfer from the selected entry in the data managing unit 6 to the main storage unit 3 is allowed for the modified data block is that, after the data transfer, the modified data block in the selected entry is rewritten by the requested data block transferred later from the main storage unit 3. The unmodified data blocks in the selected entry are not moved out or transferred to the main storage unit 3 but remain in the selected entry as they are. Therefore, by leaving the unmodified data blocks in the selected entry, unnecessary move out or data transfer operations can be eliminated and a high processing speed can be attained.

Thus, when the exclusive right is not acquired for the selected entry to be replaced, the copied data blocks in the buffer storage unit 2 in the central processing unit 1 are made invalid, and only the modified data blocks are moved out or transferred from the data managing unit 6 to the main storage unit 3. Thus the main memory data modified by the store-in method is reflected at the main storage unit 3.

(A2) On the other hand, by referring to the tag unit 7, when it is determined that the exclusive right is set for the selected entry, this means that one of the central processing units 1 is reading a data block in the selected entry for rewriting. In this case, the buffer control unit 8 refers to the copy bits of the selected entry in the tag unit 7, to determine which one of the blocks in the entry is being copied to which one of the central processing units. Alternatively, when a plurality of exclude bits are provided to correspond to the divided blocks in the entry, the buffer control unit 8 may refer to the exclude bits to determine which one of the blocks in the entry is being copied to which one of the central processing units. Then, the buffer control unit 8 refers to a BS tag unit (not shown in FIG. 1) in the determined or requesting central processing unit by a signal REF TAG, to check whether or not the determined or selected block has been actually modified. When it is acknowledged that the determined or selected block has been actually modified, the buffer control unit 8 generates a move out instruction MOI, which is given to the determined or requesting central processing unit 1 so that the determined block is moved out from the buffer storage unit 2 of the determined central processing unit 1 to the main storage unit 3 via data managing unit 6, which is the managing origin of the data block.

For the determined block which has not been actually modified in the central processing unit 1, and for the blocks corresponding to the copy bits indicating that the blocks are not copied, the buffer control unit 8 carries out a move out or a data transfer process of only the modified blocks in the selected entry to be replaced; the modified blocks having the modify bits indicating that the blocks have been modified after they were transferred from the main storage unit 3 of the managing origin of the blocks. The reason why not only the move out but also the data transfer is allowed is the same as described before, i.e., the moved out or transferred block is replaced by a new data block later transferred from a main storage unit 3.

Thus, when the exclusive right is acquired for the selected entry to be replaced, the newest modified block stored in the buffer storage unit 2 is moved out from the central processing unit 1 to the main storage unit 3 via the data managing unit 6. Further, in the blocks which are not copied in the central processing units 1, only the blocks which have been modified are moved out or transferred from the data managing unit 6 to the main storage units 3, and thus the main memory data modified by the store-in method is reflected at the main storage units 3.

(B) Further, according to the embodiment of the present invention shown in FIG. 1, when a central processing unit 1 issues a transfer request (TR1 in FIG. 1) to the buffer control unit 8, to transfer a data block of the main memory data from the data managing unit 6 to the central processing unit 1, and the buffer control unit 8 determines that the data managing unit 6 is storing the data block required by the central processing unit 1, the data block is transferred from the data managing unit 6 to the buffer storage unit 2 in the central processing unit 1 by the data transfer. In this process, it is necessary to maintain the system as a whole without contradiction or inconsistencies with respect to the main memory data stored in different storage units, and to this end, the following process is executed.

Namely, the buffer control unit 8 first refers to the tag unit 7 to determine whether or not the exclude bit in the entry including the block to be transferred indicates that the entry is used with an exclusive right.

(B1) As a result of this determination, if it is determined that the entry including the block to be transferred is not used with an exclusive right, the following process is executed.

(B1$_i$) When the data transfer request from the central processing unit 1 is for a process without an exclusive right, i.e., for only a data reading process and not for a data rewriting process, the data copied in the buffer storage unit 2 is the same as the data in the data managing unit 6. Thus the buffer control unit 8 transfers the required data block from the data managing unit 6 to the central processing unit 1 requesting the data transfer.

(B1$_{ii}$) In contrast, when the data transfer request from the central processing unit 1 is for a process with an exclusive right (data transfer request for a rewriting process), it must be made possible for only one central processing unit 1 to introduce a copy of a data block. To this end, the buffer control unit 8 determines or selects, with reference to the copy bits, a data block in the entry and a central processing unit in which the data block is being copied. Then, the buffer control unit 8 instructs the determined central processing unit 1 to make the copied data block in the central processing unit 1 corresponding to the determined or selected data block in the data managing unit 6 invalid (INV in FIG. 1). The buffer control unit 8 then transfers the requested data block to the central processing unit 1 which originated the request.

(B2) Further, referring to the tag unit 7, when it is determined that the entry of the data block to be transferred to the central processing unit 1 has been used with an exclusive right, the buffer control unit 8 then refers to the copy bits of the entry of the data block to be transferred, to determine which one of the central processing units 1 has the exclusive right.

(B2$_i$) As a result of this determining process, it is determined that the central processing unit 1 requesting the data transfer is the central processing unit 1 which is executing a process with an exclusive right. The data block which is to be transferred is transferred as is to the central processing unit 1 which originated the request, since the transfer of the data block to be transferred does not break the rule that only the central processing unit which has acquired the exclusive right can introduce a copy of the data block. This rule can prevent the phenomenon whereby the data block in the data managing unit 6 and the corresponding data block in the central processing unit 1 become different from each other.

(B2$_{ii}$) In contrast, when it is determined that the central processing unit 1 requesting the data transfer is not the central processing unit 1 which has the exclusive right, it must be made possible for only one central processing unit, i.e., the determined or exclusive central processing unit to introduce a copy of the block data in the data managing unit 6. To this end, the buffer control unit 8 determines a data block and a central processing unit 1 having the exclusive right, the determined central processing unit, and the determined data block is copied into the determined central processing unit 1. Then, the buffer control unit 8 moves the determined data block out of the determined central processing unit 1 to the data managing unit 6, and thereafter, the buffer control unit 8 transfers the requested data block from the data managing unit 6 to the central processing unit 1 which issued the request to data transfer.

Therefore, only a central processing unit requesting a data block for use with an exclusive right can copy the data block in the global buffer storage unit 5. Since the modified data block is moved out to the data managing unit 6 before delivering the exclusive right from the previous central processing unit having the exclusive right to a later central processing unit requesting the data block with an exclusive right, and since other data processing units without an exclusive right cannot access the data managing unit, a consistency between the data block in the data managing unit 6 and any one of the central processing units is maintained.

Next, the operation of another or second embodiment of the present invention shown in FIG. 2 is described.

In the embodiment of the present invention shown in FIG. 2, two systems #1 and #2 are provided each being substantially the same as the system shown in FIG. 1. The two systems #1 and #2 have the memory control units 4 respectively. The two systems #1 and #2 are connected to each other through the memory control units 4. The operation of the two systems is basically realized by adding a process of referring to the tag unit 7 in the system #2 to the operation for the single system described with reference to FIG. 1.

The operation of the second embodiment shown in FIG. 2 is as follows.

When a buffer storage unit 2 of the own or first system (#1) is not storing the necessary main storage data, the central processing unit 1 having that buffer storage unit issues a transfer request TR1 for the data block of the necessary main storage data to the buffer control unit 8 of the own system (#1). The buffer control unit 8 which receives the transfer request TR1 then refers to the managing data in the tag unit 7 of the own system (#1), to determine whether or not the requested data block is stored in the data managing unit 6 of the own system (#1). As a result of this search, when it is determined that the data block requested by the central processing unit 1 is stored in the data managing unit 6 of the own system (#1), the same operation as the above described operation (B) for the embodiment shown in FIG. 1 is carried out, and therefore a detailed description thereof omitted.

As a result of this search, when it is determined that the data block requested by the central processing unit 1 is not stored in the data managing unit 6 of the own system (#1), the buffer control unit 8 of the own system (#1) selects one of the entries of the data managing unit 6 as a replacing entry, whereby the selected entry is made empty. The buffer control unit 8 then issues a transfer request of the data block requested by the central processing unit 1 to the commonly used main storage units 3, by designating the selected entry as the destination of the data block to be stored and executing the same process as that of the process (A) described above for the embodiment of the present invention shown in FIG. 1.

In addition, in the embodiment shown in FIG. 2, the buffer control unit 8 of the own system (#1) issues a search request for a search for the requested data block in the global buffer storage unit 5 of the opposite or second system (#2), through the communication units 10.

It may be possible to design the whole system in such a way that the tag unit 7 in the own system (#1) has not only the managing data of the entries in the data managing unit 6 of the own system (#1) but also a copy of the managing data of the entries in the data managing unit 6 of the opposite or second system (#2). In this case, the search of the data block in the opposite system (#2) is executed by using the copy.

In the following, it is assumed that the tag unit 7 of the own system (#1) does not have the copy of the managing data in the tag unit 7 of the opposite system (#2).

In response to the search request, the buffer control unit 8 in the global buffer storage unit 5 of opposite system (#2) refers to the managing data in the tag unit 7 of the opposite system (#2) to determine whether or not the requested data block is stored in the data managing unit 6 of the opposite system (#2). The result of the search is sent to the buffer control unit 8 in the global buffer storage unit 5 of the own system (#1) which originated the interrogation or request.

When the buffer control unit 8 in the global buffer storage unit 5 of the own system (#1) originating the interrogation or request receives a search result indicating that the data block requested to be transferred by the central processing unit 1 is stored in the global buffer storage unit 5 of the opposite system (#2), the buffer control unit 8 in the global buffer storage unit 5 of the own system (#1) origin cancels the data transfer request issued to the main storage units 3. In addition, the buffer control unit 8 in the own system (#1) issues, to the global buffer storage unit 5 in the opposite system (#2) which is storing the requested data block, the data transfer request to transfer the data block from the global buffer storage unit 5 of the opposite system (#2) to the global buffer storage unit 5 of the own system (#1).

Conversely, when the buffer control unit 8 in the global buffer storage unit 5 of the own system (#1) originating the interrogation receives a search result indicating that the requested data block is not stored in the global buffer storage unit 5 of the opposite system (#2), the data block transferred from a main storage unit 3 in response to the data transfer request issued to the main storage units 3 is stored in the data managing unit 6. Then the requested block data is transferred from the data managing unit 6 to the central processing unit 1 originating the request.

Further, when the global buffer storage unit 5 of the opposite system (#2) stores the requested data block requested by the central processing unit 1, the buffer control unit 8 in the opposite system (#2) refers to the managing data in the tag unit 7 of the opposite system (#2) to determine whether or not the entry including the requested data block is used with an exclusive right.

If as a result of the determination it is determined that the entry including the requested data block is used with an exclusive right, a central processing unit having the exclusive right, i.e., the determined or exclusive central processing unit is determined. Then, the newest modified data stored in the buffer storage unit 2 of the determined or exclusive central processing unit is read to the data managing unit 6 of the opposite system (#2). Thereafter, the data block in the entry including the read newest modified data is transferred from the data managing unit 6 of the opposite system (#2) to the global buffer storage unit 5 of the own system (#1) which originated the request for the data transfer. Thereafter, the same process as that for the embodiment shown in FIG. 1 is executed.

However, if as a result of the determination it is determined that the entry including the requested data block is used without an exclusive right, the data block in the data managing unit 6 of the opposite system (#2) is transferred as is to the global buffer storage unit 5 of the own system (#1) which originated the request. Thereafter, the same process as that for the embodiment shown in FIG. 1 is executed.

In the above processes for the second embodiment, it is necessary to maintain the matching or consistency between the contents of tag units 7 in the own system (#1) and in the opposite system (#2), and to this end, there are two methods are employed as follows.

Namely, in one of the two methods, i.e., the first method, when the modify bit of the data block to be transferred from the opposite system (#2) to the own system (#1) indicates that the data block has been modified, the buffer control unit 8 in the global buffer storage unit 5 of the opposite system (#2), which originated the request for a transfer of the data block, transfers the data block not only to the global bugger storage unit 5 of the own system (#1) requesting the data block but also to the main storage unit 3 of the opposite system (#2) which is the managing origin or originator of the data block, and then resets the modify indication to indicate an unmodified state.

According to the other method, i.e., the second method, the global buffer storage unit 5 in the opposite system (#2) informs the global buffer storage unit 5 of the own system (#1) requesting the data block of the state of the indication of the modify bit, without transferring the data block to the main storage unit 3 of the managing origin. The buffer control unit 8 in the global buffer storage unit 5 in the own system (#1) requesting the data block registers this state of the indication of the modify bit in the tag unit 7 of the own system (#1).

Thus, according to the second embodiment of the present invention shown in FIG. 2, by using the data processing system of the embodiment of the present invention shown in FIG. 1, a data processing system of a TCMP (Tightly Coupled Multiprocessor) type commonly using the global buffer storage units and having a extremely high system performance can be constructed.

The embodiments of the present invention will now be described in more detail.

Figure 3:
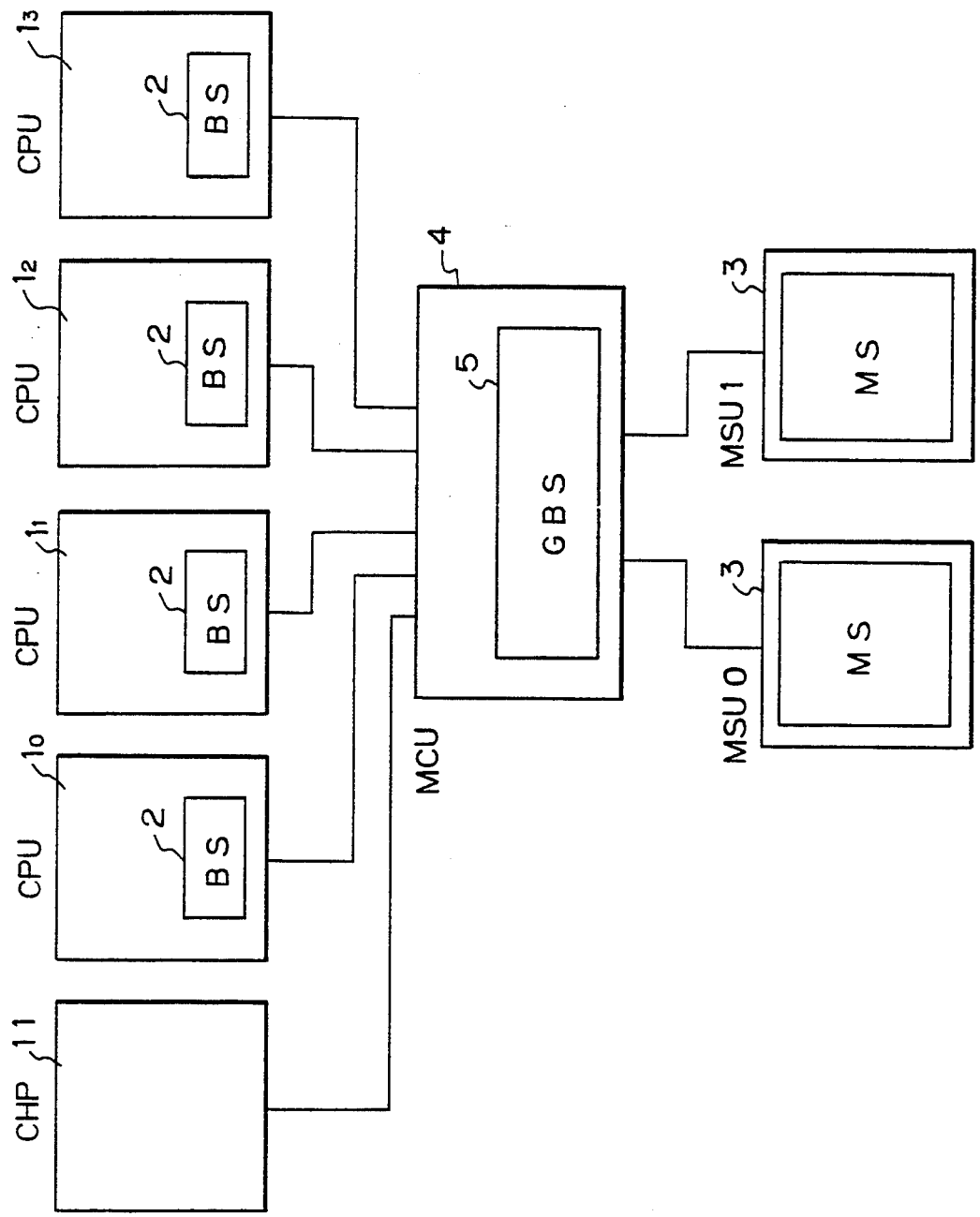
FIG. 3 is a block diagram showing an example of the data processing system shown in FIG. 1.

FIG. 3 shows the data processing system of the first embodiment of the present invention. In FIG. 1 and FIG. 3, the same reference numerals represent the same parts. In addition, reference numeral 11 represents a channel processing unit (CHP). The global buffer storage unit 5 is commonly used by the channel processing unit 11 and the central processing units.

Four central processing units (CPU) $1_0$ to $1_3$ each having a store-in buffer storage unit 2 are provided, and these central processing units $1_0$ to $1_3$ commonly use the global buffer storage unit (GBS) 5 provided in the memory control unit (MCU) 4. The memory control unit 4 is connected to two main storage units (MS) 3, as an example.

Figure 4:
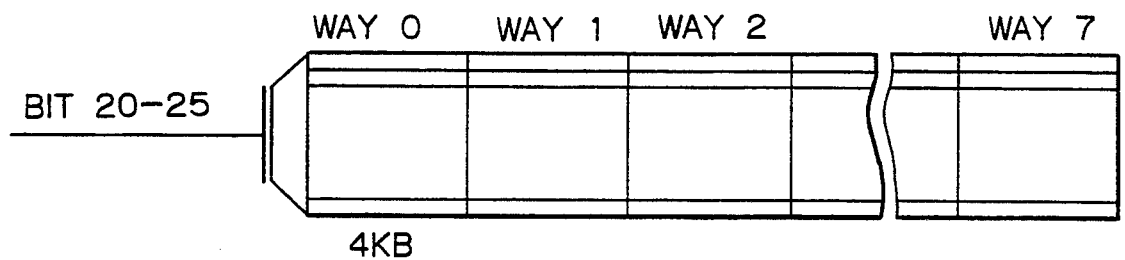
FIG. 4 is a diagram showing the construction of a buffer storage unit in the system shown in FIG. 3.

FIG. 4 shows an example of the memory construction of one of the buffer storage units 2. As shown in the figure, each of the buffer storage units 2 consists of eight associative levels WAY0 to WAY7 each having 64 entries. Each entry of the associative levels has a memory size of 64 bytes, and therefore, the capacity of each associative level is 4 kilo bytes, and the total capacity of each buffer storage unit 2 is 32 kilo bytes.

Figure 5:
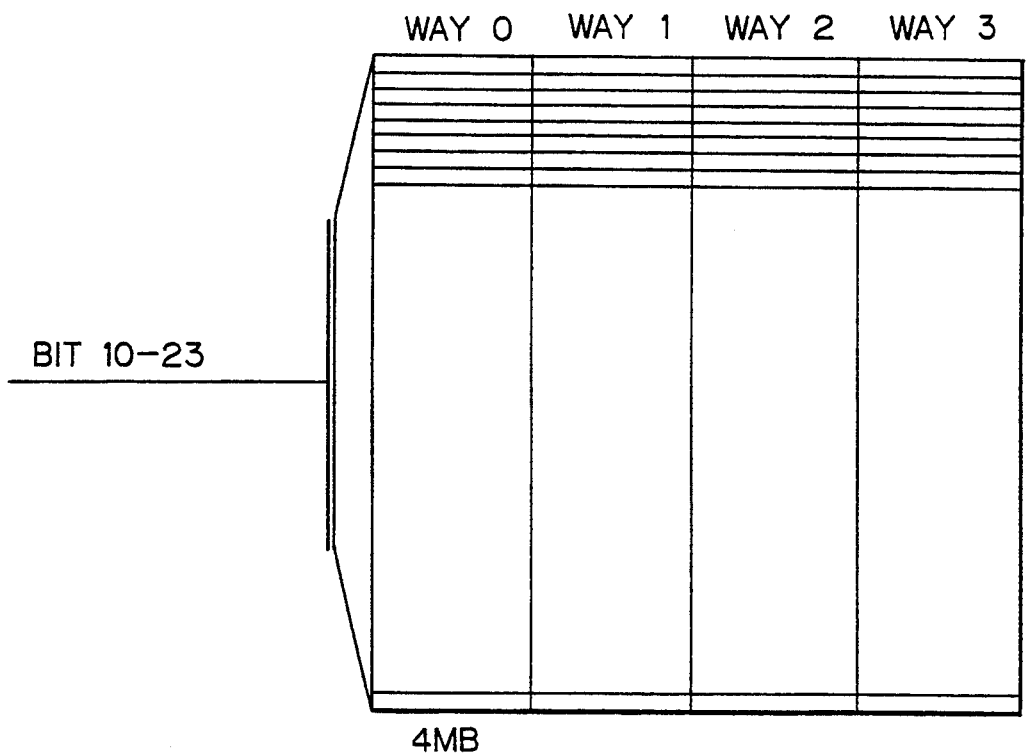
FIG. 5 is a diagram showing the construction of a global buffer storage unit in the system shown in FIG. 3.

FIG. 5 shows an example of the memory construction of the global buffer storage unit 5. Accompanied by or because of the increase in the memory space needed for an operating system or application software, the capacity of the global buffer storage unit must be enlarged. When a global buffer storage unit has a capacity of 16 megabytes, and when each entry of the associative levels thereof is constructed by a 64-byte block, which is same as each entry of the buffer storage unit, the number of entries of the global storage unit becomes as large as 512 times that of the buffer storage unit. Thus the hardware amount of a tag unit for managing the global storage unit 5 becomes large. To reduce the hardware amount of the tag unit, as shown in FIG. 5, the global buffer storage unit 5 according to the embodiment of the present invention consists of four associative levels WAY0 to WAY3 each having 16K entries accessed by a real address consisting of bits 10 to 23. Each entry of the associative levels has a large or maximum size of 256 bytes. Therefore, the capacity of each associative level is 4 mega bytes, and the total capacity of the global buffer storage unit 5 is 16 megabytes.

The data stored in each of the buffer storage units 2 is moved out to the global buffer storage unit 5 in a sequence, from data having a low accessing frequency or infrequently accessed data in accordance with, for example, the LRU (Least Recently Used) method. Also, the data stored in the global buffer storage unit 5 is moved out in a sequence, from those of the low accessing frequency, to the main storage units 3.

In the conventional data processing system, the size of each entry of the global buffer storage unit 5, i.e., a buffer storage tag (BS) is the same as the size of each entry of the buffer storage unit (cache memory) in each of the central processing units. Conversely, according to the present invention, to reduce the number of entries in the global buffer storage unit 5, to thus reduce the hardware amount of the tag unit 7, the block size of each entry of the global buffer storage unit 5 is, for example, four times as large as the block size of the buffer storage unit 2. By this construction, since each entry of the global buffer storage unit 5 is divided into four blocks, only the necessary block in an entry is moved out to the main storage unit, and thus the amount of data transfer between the global buffer storage unit 5 and the main storage unit 5 can be reduced.

FIG. 6 shows an example of the construction of a buffer storage (BS) tag for managing an entry of the associative level of a buffer storage unit 2. There is one tag corresponding to each entry of 64 bytes in the buffer storage unit 2. Since one associative level in the buffer storage unit 2 includes 64 entries, and since there are eight associative levels WAY0 to WAY7, there are 512 tags in the BS tag unit. To manage each entry, the tag in the buffer storage unit 2 includes, as shown in FIG. 6, a valid bit V indicating whether the entry is valid or invalid, a modify bit M indicating whether the data in the entry has been modified or not after the data was transferred from the memory control unit 4 to this entry of the buffer storage unit 2, and real address bits B1 to B19 indicating the address of the main storage unit 3 from which the data block is copied through the memory control unit 4 and stored in this entry of the buffer storage unit 2.

When the modify bit M indicates that the data in the entry has been modified, and when the data is to be replaced by new data, the data and its address in the entry must be moved out to the corresponding address in memory control unit 4 before introducing the new data into this entry.

FIG. 7 shows an example of a global buffer storage (GBS) tag in the GBS tag unit 7 for managing an entry of an associative level in the global buffer storage unit 5. There is one tag corresponding to each entry of 256 bytes in the global buffer storage unit 5. Thus, since one associative level in the global buffer storage unit 5 includes 16K entries, and since there are four associative levels WAY0 to WAY3, there are 16K×4 GBS tags in the GBS tag unit 7 for managing the four associative levels. To manage one entry, the GBS tag in the global buffer storage unit 5 includes, as shown in FIG. 7, a valid bit V indicating whether this entry is valid or invalid, and an exclude bit E indicating whether or not, for example, one of the central processing units $1_0$, $1_1$, $1_2$, and $1_3$ in FIG. 3 exclusively uses this entry. In addition, the GBS tag also includes four modify bits $M_0$, $M_1$, $M_2$, and $M_3$ each indicating whether or not the data in the divided block of 64 bytes in this entry has been modified after the data block was transferred from a main storage unit 3 to the global buffer storage unit 5, sixteen copy bits $C_{ij}$, where i is an identification character of a divided block in this entry and j is an identification character of a central processing unit $1_j$, and real address bits B1 to B9 indicating the address in the main storage units 3 from which the data is copied and stored in this entry of the global buffer storage unit 5.

When one of the modify bits $M_0$ to $M_3$ is "1" indicating that the data block of 64 bytes in the entry has been modified, and when the modified data block is to be replaced by a new data block, the modified data block must be moved out to the original area in the corresponding main storage unit 3 which is the managing origin of the data block. Thus the modified contents in the global buffer storage unit 5 are reflected at the corresponding main storage unit 3.

Further, regardless of the indication of the modify bits $M_0$ to $M_3$, when the exclude bit indicates that this entry is being used with an exclusive right, it means that the data block transferred from this entry of the global buffer storage unit 5 to the buffer storage unit 2 in a central processing unit $1_j$ may be rewritten by the central processing unit $1_j$. Therefore, when this data block in the central processing unit $1_j$ is replaced by a new data block in the global buffer storage unit 5 or in the main storage units 3, the data block in the central processing $1_j$ must be moved out to the original area in the corresponding main storage unit 3.

In the example shown in FIG. 7, one exclude bit E is provided to correspond to one entry of 256 bytes, but it is also possible to provide four exclude bits corresponding to respective 64-bytes divided blocks in the entry. In this case, by referring to an exclude bit indicating that the corresponding block is being used with an exclusive right, it can be immediately known which one of the 64-bytes divided blocks in the 256 bytes entry is being copied to the buffer storage unit 2.

Figure 22:
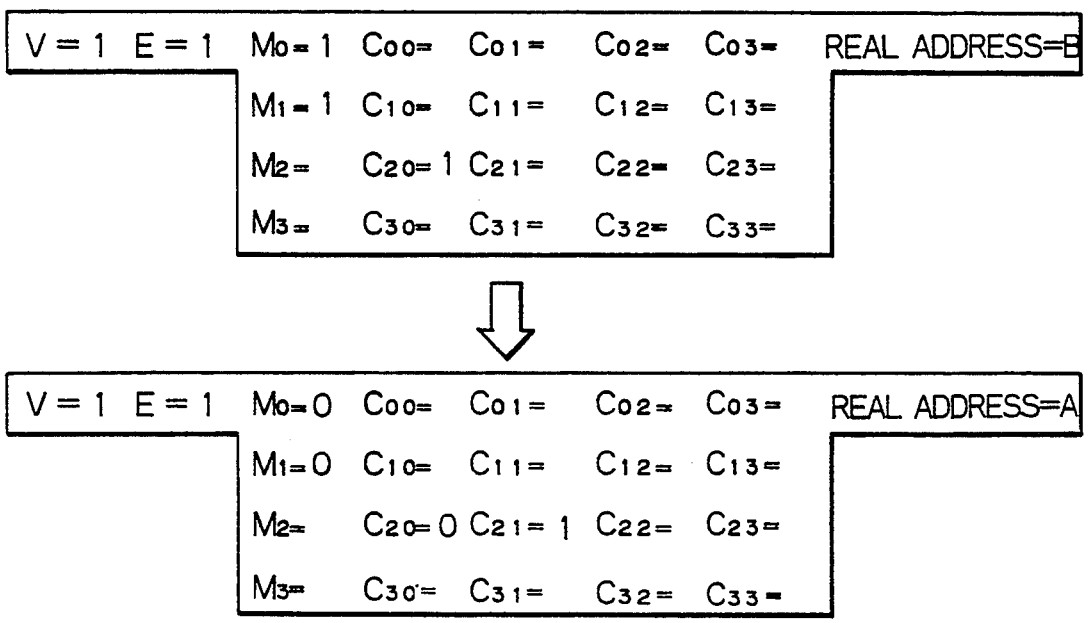

FIG. 8 shows the construction of a buffer control unit (SU) including the buffer storage unit 2 in each of the central processing units $1_0$, $1_1$, $1_2$, and $1_3$. In the figure, 20 is a buffer storage (BS) data managing unit which has a data managing mechanism of the buffer storage unit 2 having the memory structure as shown in FIG. 4, 21 is a BS tag unit which is the tag unit in the buffer storage unit 2 for managing the data shown in FIG. 6, and 22 is an effective address register (EAR) for receiving a logical address of 1 to 31 bits and for outputting a logical address of 1 to 12 bits. 23 is a translation look aside buffer (TLB) having a primary memory and an alternate memory each generating a logical address in response to the lower order logical address bits 13 to 19, 24 and 25 are comparators (COMP) for comparing the logical addresses of 1 to 12 bits from the EAR 22 and from the TLB 23, and 26 is a comparator for comparing a real address of each entry of each of the associative levels, WAY 0 to WAY 7, and a real address generated from the primary memory or the alternate memory of the TLB 23. 27 is an align and select unit for determining a write or read entry in the BS data managing unit 20, 28 is a word register, 29 is an align unit for aligning store data, 30 is a storing data register (SDR), and 31 is a read address register (RAR). 32 is a main storage address register (MSAR), 33 is a selector for selecting move out data, 34 is a move out buffer (MO BUF), 35 is a move out register (MOR), and 36 is a search address register (SRAR).

The buffer control unit SU in each central processing unit 1 receives an address sent from an instruction control unit IU, which is a unit for controlling the total pipe lines of the central processing unit 1 and for calculating an address for accessing the buffer storage unit 2. By using the calculated address, the BS data managing unit 20 is accessed to read out a main memory data block of 64 bytes. The read data block is sent through the align and select unit 27 and the word register 28 to the instruction control unit IU. Note, in the central processing unit 1, other than the buffer control unit SU and the instruction control unit IU, an arithmetic control unit EU for actually performing calculations such as additions, subtractions, multiplications, or divisions is provided, although not shown in FIG. 8 for simplicity.

In a reading operation, a reading logical address of bit 1 to bit 31 sent from the instruction control unit IU is set in an effective address register (EAR) 22. The lower order address bits of bits 13 to 19 are used as a line address for accessing an entry of the translation look aside buffer (TLB) 23. The TLB 23 has a primary memory and an alternate memory each having 256 entries. The line address is used to access one of the 256 entries. In response to the line address, the TLB 23 outputs logical addresses from the two entries of the primary memory and the alternate memory simultaneously. The read logical address from the primary memory is compared with bits 1 to 12 from the EAR 22. Also, the read logical address from the alternate memory is compared with bits 1 to 12 from the EAR 22. When a coincidence is detected in the comparator 24, a real address A is output to BS tag unit 21 from the primary memory, and when a coincidence is detected in the comparator 25, a real address B is output form the alternate memory. When no coincidence is detected in the comparators 24 and 25, it means that there is no real address corresponding to the accessing logical address.

The BS tag unit 21 is accessed by address bits 20 to 25 in the logical address sent from the instruction control unit IU. In a virtual addressing system, when a page address conversion of 4k-bytes unit is employed, the bits 1 to 19 are the subject of the address conversion. The logical address and the real address of the bits 20 to 31, however, are the same. Accordingly, the bits 20 to 25 in the logical address sent from the instruction control unit IU are used as a real address for accessing the BS data managing unit 20. The BS tag unit 21 consists of eight associative levels WAY 0 to WAY 7, which conform to the structure of the BS data managing unit 20. In response to the logical address input of bits 20 to 25, eight real address data stored in the WAY 0 to WAY 7 are read from the BS tag unit 21. Then, the read addresses read from the BS tag unit 21 and the real address read from the primary memory or the alternate memory of the TLB 23 are compared by each of the comparators 26; the number of comparators 26 is 8 multiplied by 2. Namely, a pair of comparators 26 are provided to correspond to each WAY so that the real address output from each WAY is compared with an output from the primary memory and with an output from the alternate memory simultaneously, without having to wait for a comparison result for detecting which one of the outputs of the TLB 23 generates a real address. Therefore, the comparators 26 compare the real addresses without waiting for the compared results of the logical addresses from the TLB 23 performed by the comparators 24 and 25. Thus the search for the real address in the BS tag unit 21 is effected at a high speed.

The align and select unit 27 receives the comparison results from the comparators 26 and the comparison results from the comparators 24 and 25 (not shown in FIG. 8), and checks whether one of the comparators 26 has detected a coincidence and whether one of the comparators 24 and 25 has detected a coincidence. Accordingly, the align and select unit 27 determines or detects a WAY in the BS tag unit 21 having the logical address which coincides with the logical address sent from the instruction control unit IU. On the other hand, the BS data managing unit 20 is accessed by the output of bits 20 to 25 from the EAR 22, which is delayed by one machine cycle from the output of the BS tag unit 21, so that a block of the main memory data is read out. The align and select unit 27 selects the block which corresponds to the determined or detected WAY, and determines a format for storing the block in the word register 28, i.e., whether the data should be padded from the head or beginning of the word register 28 or whether the data should be padded from the end of the word register 28. Then, the selected block is stored into the word register 28 in accordance with the determined storing format.

The read main memory data such as an instruction word or an operand code thus stored in the word register 28 is sent to an instruction control unit, not shown in the figure, and is used for decoding an instruction or as an operand data for calculations.

In a writing operation, a writing logical address is converted by the TLB 23 into a real address. The BS tag unit 21 is accessed and checked to determine whether or not a block of a desired address exists in the BS data managing unit 20. When it is determined that the block of the desired address exists in the BS data managing unit 20, writing data sent from an arithmetic control unit EU passes through the align unit 29 to be set in the SDR 30, and is then written into the BS data managing unit 20. In contrast, if it is determined that the block of the desired address does exist, the real address in the RAR 31 is set in the MSAR 32 and is sent to the memory control unit 4 as an address of the data block to be transferred from the global buffer storage unit 5.

Before the data is transferred from the memory control unit 4, the buffer memory control unit SU determines the number of the WAY to be moved out or to be transferred from the BS data managing unit 20. When the data block determined to be moved out is the data block which has been modified after being read from the memory control unit 4 in accordance with a store-in method, the data block must be moved out to the memory control unit 4. The move out process in this case is carried out in such a way that the real address of the entry in a WAY to be moved out is read from the BS tag unit 21, the read real address is selected by the selector 33, the selected address is set as a move out address in the MSAR 32, and simultaneously, the moved out data block read from the BS data managing unit 20 is stored in the MO buffer 34. Then, after acknowledging a reception enable state of the memory control unit 4, the data stored in the MO buffer 34 is sent through the MOR 35 to the memory control unit 4. The SRAR 36 is used for searching for an entry in the BS tag unit 21 by receiving, from the memory control unit 4, a real address of the entry to be forcibly moved out or to be made invalid.

FIG. 9A shows in detail an embodiment of the construction of the memory control unit 4 shown in FIG. 3. In the figure, 40 is a data managing unit, which is the data managing mechanism in the global buffer storage unit 5 and has the memory structure shown in FIG. 5, 41 is a GBS tag unit for managing data explained with reference to FIG. 7, 42 represent ports (P), and 43 is a tag priority circuit (T1). In addition, 44 is an address register, 45 is a comparator, 46 is a register (T2), 47 is a register, 48 is a GBS address input register (GBS AI), 49 is a GBS data output register (GBS DO), 50 is an MCU data output register (MDO), 51 is a register, and 52 is a syndrome check unit (SYD). Further, 53 is a correction unit (COR), 54 is a data pool unit, 55 is an ECC code generating unit, 56 is a register, 57 is a GBS data input register (GBS DI), 58 is a GBS LRU unit, 59 is a register, 60 is a register, 61 is a main storage move in register (MS MI), and 62 is a GBS move out register (GBS MO).

The five ports (P) 42 in the memory control unit (MCU) 4 shown in FIG. 9A receive requests from the central processing units $1_0$, $1_1$, $1_2$, and $1_3$ and the channel processing unit 11 to hold real addresses for accessing the GBS data managing unit 40, operand codes, and various control signals. The received requests are arranged in the priority order by the tag priority circuit 43 so that each request acquires a right to access the GBS tag unit 41.

When a request to read out data from the GBS data managing unit 40 is sent from a central processing unit or a channel processing unit to a port (P) 42, the GBS tag unit 41 is accessed by address data set in the address register 44, and a real address is read from the GBS tag unit 41 by this accessing. The read real address is compared by the comparator 45 with an accessing address sent through the T2 register 46, and when the real address read from the GBS tag unit 41 coincides with the accessing address from the T2 register 46, the register 47 sets the accessing address passed through the T2 register 46. The set accessing address is then set in the GBS AI 48 for accessing the GBS data managing unit 4.

When the accessing address is set in the GBS AI 48, a 64 byte-block of main memory data is read from the GBS data managing unit 40, and the read data block is set in the GBS DO 49 and then sent through the MDO 50 to the central processing unit $1_j$ or the channel processing unit 11 which has issued the request. In parallel with this operation, the read main memory data and its error checking and correction code are set in the register 51, and the data and the ECC code are checked by a syndrome code in the SYD 52. Accordingly, if there is a one bit error in the read main memory data, the error is corrected by the COR 53 and the data is then sent again through the MDO 50 to the central processing unit $1_j$ or the channel processing unit (CHP) 11 which has issued the request.

On the other hand, when a request to write data to the GBS data managing unit 40 is sent from a central processing unit $1_j$ or a channel processing unit 11 to a port (P) 42, similar to the reading access, a writing address for accessing the GBS data managing unit 40 is set in the GBS AI 48, and simultaneously, write data is input from the central processing unit $1_j$ or the channel processing unit 11 which has issued the writing request through the data pool circuit 54 to the GEN 55. The GEN 55 generates an error checking and correction (ECC) code, and the writing data and the ECC code are set through the COR 53 into the register 56. The data set in the register 56 is then set in the GBS DI 57 and is written to the GBS data managing unit 40.

In the process carried out in response to the accessing request to read data from the GBS data managing unit 40 or to write data into the GBS data managing unit 40, when the comparator 45 detects a coincidence between the reading address or the writing address in the GBS tag unit 41 and the accessing address, the GBS LRU 58 rewrites replacement data therein, since there is an address to be accessed in the GBS data managing unit 40. Namely, the replacement data indicates the history of each entry, to thus identify which one of the entries in each WAY has the lowest access frequency or most infrequently accessed. By referring to the replacement data, the data block in the entry having the lowest access frequency is moved out to the main storage unit 3 when a new data block is to be introduced into the global buffer storage unit 5.

When the comparator 45 does not detect a coincidence between the reading address or the writing address in the GBS tag unit 41 and the accessing address, the GBS LRU 58 is accessed so that the data block most infrequently accessed by the central processing units is selected as a replacing block.

When the replacing block is selected, and when a modify bit in the entry of the replacing block is "1", showing that the replacing block has been modified, the replacing block must be moved out from the global buffer storage unit 5 to a main storage unit 3. The block to be moved out is sent through the GBS DO 49, the SYD 52 and the COR 53, by which the error in the data is checked and corrected in accordance with an error checking and correction method, and then through the GBS MO 62 to the main storage unit 3.

Note when the desired address is not present in the GBS data managing unit 40 or when a data block is to be moved out from the global buffer storage unit 5 to a main storage unit 3, the address in the main storage unit 3, which is the destination of the replaced block or the moved out block, is sent through the register 59 to the main storage unit 3. Further, in the register 60, the real address of a data block in a central processing unit $1_j$, which is to be forcibly moved out or which is to be made invalid, is set in the register 60, and the set real address is then sent to the corresponding central processing unit $1_j$ or to the channel processing unit 11. The data transfer from the main storage unit 3 to the GBS data managing unit is effected through the MS MI 61, and the transferred data is then checked and corrected in accordance with the error checking and correction ECC in the SYD 52 and the COR 53. The checked and corrected data is then set in the register 56. The data set in the register 56 is then written through the GBS DI 57 to the GBS data managing unit 40.

FIG. 9B shows the GBS tag unit 41 and its peripheral circuits as shown in FIG. 9A, in more detail.

In this figure, the register 44 sets an address which is output from the TAG PRI 43 in FIG. 9A in the order of the priority thereof. In the embodiment of the present invention, a real address consisting of bits 1 to 28 is set. Among the bits 1 to 28, bits 1 to 23 are used as an address for accessing the GBS TAG 41, to simultaneously read a tag of an entry in each of the WAY 0 to WAY 3. The read tag data is set in registers GBS TAG READ REGs corresponding to the WAY 0 to WAY 3. The comparator 45 corresponding to each of the GBS TAG READ REGs checks the valid bit V, and compares the real address bits B1 to B9 with the real address bits 1 to 9 from the register 44. In one of the comparators 45, when the valid bit V is "1" indicating the entry is valid, and when the real addresses coincide with each other, the exclude bit E, the modify bits $M_0$ to $M_3$, and the copy bits $C_{00}$ to $C_{33}$ are sent to the buffer control unit 8 shown in FIG. 1 and the process to be explained with reference to FIGS. 11 to 25 is carried out.

The bit data V, B1 to B9, E, $M_0$ to $M_3$, and $C_{00}$ to $C_{33}$ are determined in the buffer control unit 8 shown in FIG. 1 and are set in a write register GBS TAG WRITE REG. The set data is then written to a designated WAY from one of the WAY 0 to WAY 3.

Figure 9C:
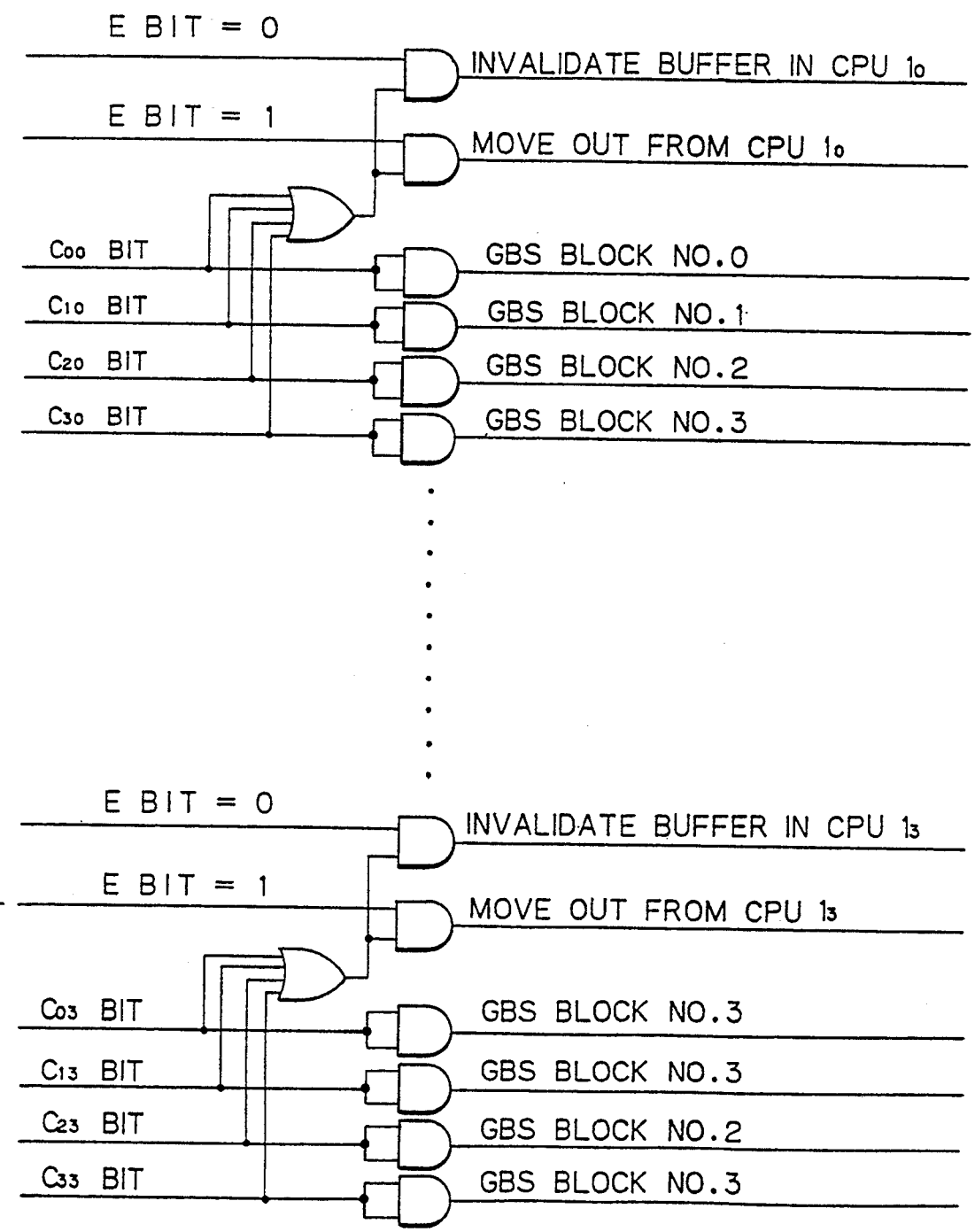
FIG. 9C is a diagram showing a logic circuit for generating an invalidating or moving out instruction applied to a central processing unit.

FIG. 9C shows a logic circuit for generating an invalidation instruction or a move out instruction applied to a central processing unit, according to an embodiment of the present invention.

In the figure, $C_{00}$, $C_{10}$, $C_{20}$, and $C_{30}$ are copy bits representing whether the CPU $1_0$ has a copy of a data block in the global buffer storage unit 5. When the logical OR of these copy bits $C_{00}$, $C_{10}$, $C_{20}$, and $C_{30}$ is "1" and the exclude bit E is "0", the data block in the CPU $1_0$ is made invalid. When the logical OR of these copy bits $C_{00}$, $C_{10}$, $C_{20}$, and $C_{30}$ is "1" and the exclude bit E is "1", the data block in the CPU $1_0$ is moved out. The copy bits $C_{00}$, $C_{10}$, $C_{20}$, and $C_{30}$ also determine a divided block in the entry of the global buffer storage unit 5 corresponding to the data block in the CPU to be made invalid or moved out. Instead of providing four independent signal lines of the GBS block numbers to be sent to the CPU as illustrated, it is possible to provide two address lines to be sent to the CPU. In this case, the CPU encodes signals on the two address lines to determine whether the data block is to be made invalid or to be moved out.

Similar control signals are formed for the other central processing units $1_1$, $1_2$, and $1_3$.

It will be seen that, when the exclude bit E is "0" and when the copy bit $C_{ij}$ is "1", the data block copied from the block number i to the central processing unit $1_j$ is made invalid. Also, when the exclude bit E is "1" and when the copy bit $C_{ij}$ is "1", the data block copied from the block number i to the central processing unit $1_j$ is moved out from the central processing unit $1_j$.

Figure 9D:
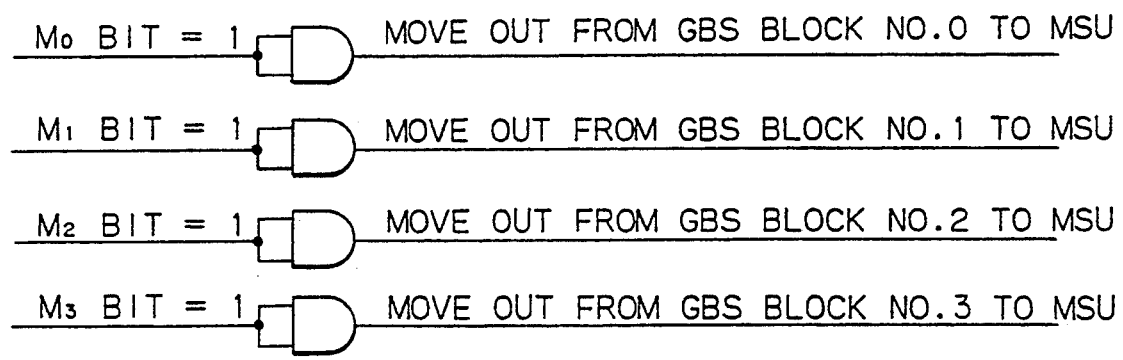
FIG. 9D is a diagram showing a logic circuit for generating a moving out instruction applied to the global buffer storage unit.

FIG. 9D shows a logic circuit for generating a move out instruction for moving a data block out from the global buffer storage unit 5 to the main storage unit 3. When a modify bit $M_i$ is "1", a move out instruction is generated to move a data block of the block number i out from the global buffer storage unit 5 to the main storage unit 3 of the managing origin. When the modify bit $M_i$ is "0", this move out instruction is not generated.

Figure 9E:
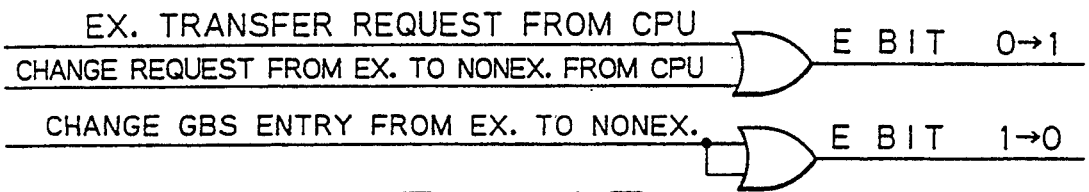
FIG. 9E is a diagram showing a logic circuit for changing an exclude bit in a GBS tag.

FIG. 9E shows a logic circuit for controlling the exclude bit E. As will be seen from the figure, a data transfer request from a central processing unit is a request with an exclusive right, or when a central processing unit requires a change of state from a state without an exclusive right to a state with an exclusive right, the exclude bit E is changed from "0" to "1". When a central processing unit requires a change of state from a state with an exclusive right to a state without an exclusive right, the exclude bit E is changed from "1" to "0".

Figure 9F:
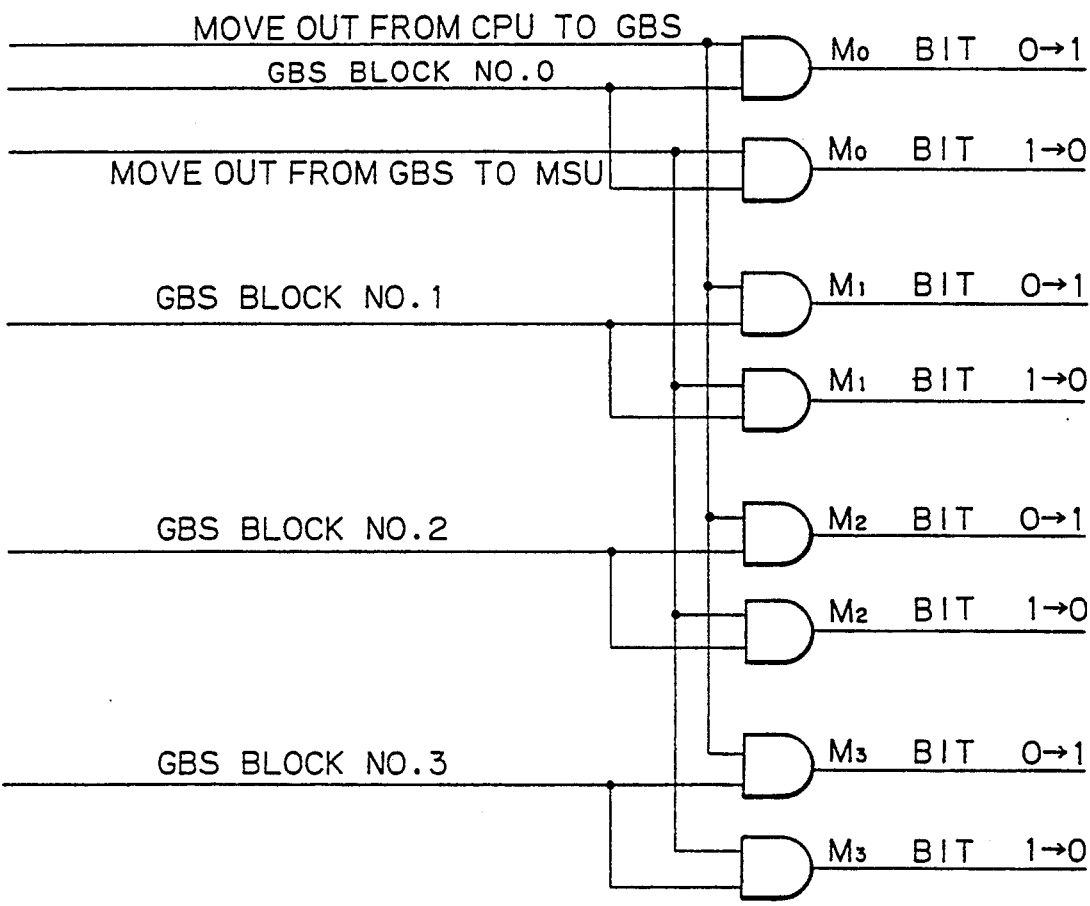
FIG. 9F is a diagram showing a logic circuit for changing modify bits in a GBS tag.

FIG. 9F shows a logic circuit for controlling the modify bits $M_0$, $M_1$, $M_2$, and $M_3$. As will be seen from the figure, when a data block is moved out from the central processing unit to the entry of the global buffer storage unit 5, the modify bit corresponding to the data block of 64 bytes in 256 bytes is changed from "0" to "1". Also, when the data block in the entry of the global buffer storage unit 5 is moved out to the main storage unit (MSU), the corresponding modify bit is changed from "1" to "0".

Figure 9G:
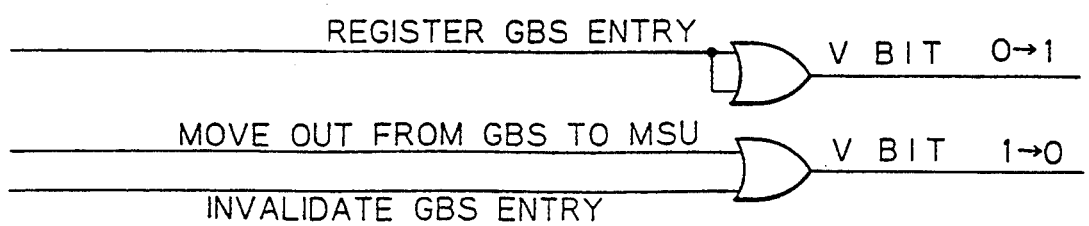
FIG. 9G is a diagram showing a logic circuit for changing a valid bit in a GBS tag.

FIG. 9G shows a logic circuit for controlling the valid bit V. As will be seen from the figure, the valid bit V is changed from "0" to "1" when the entry is registered in the global buffer storage unit 5, and is changed from "1" to "0" when the contents of the entry in the global buffer storage unit 5 are moved out to the main storage unit 3 or when the entry in the global buffer storage unit 5 is made invalid.

FIG. 9H shows a logic circuit for controlling the copy bits $C_{00}$ to $C_{33}$. As will be seen from the figure, the copy bit $C_{ij}$ is set from "0" to "1" when a copy of a data block of the block number i in the entry of the global buffer storage unit 5 is transferred to the buffer storage unit 2 in the central processing unit $1_j$. Also, the copy bit $C_{ij}$ is reset from "1" to "0" when a data block in the buffer storage unit 2 in the central processing unit $1_j$ is made invalid or is moved out to the entry of the global buffer storage unit 5.

The copy bits $C_{00}$, $C_{10}$, $C_{20}$, and $C_{30}$ are effective for or correlate with the central processing unit $1_0$. Namely, each copy bit $C_{00}$, $C_{10}$, $C_{20}$, or $C_{30}$ is formed by a logical AND of the instruction to the central processing unit $1_0$ and the block number of a divided data block of 64 bytes in the entry of the global buffer storage unit 5. Similarly, the copy bits $C_{01}$, $C_{11}$, $C_{21}$, and $C_{31}$ are effective for the central processing unit $1_1$; the copy bits $C_{02}$, $C_{12}$, $C_{22}$, and $C_{32}$ are effective for the central processing unit $1_2$; and the copy bits $C_{03}$, $C_{13}$, $C_{23}$, and $C_{33}$ are effective for the central processing unit $1_3$.

FIG. 10 shows a detailed construction of the main storage unit 3 shown in FIG. 3.

As shown in FIG. 10, the main storage unit 3 consists of four MSU banks 70 as an example. The MSU banks 70 are interleaved with a unit of 64 bytes, and when a data transfer from the main storage unit 3 to the global buffer storage unit 5 is to be effected or executed, the four MSU banks 70 are sequentially accessed to effect or execute four data transfers of 64 bytes. When a data block is to be moved out from the global buffer storage unit 5 to the main storage unit 3, only the modified block of 64 bytes is sent from the memory control unit 4 to the corresponding MSU bank 70 and is written therein. In FIG. 10, an MSU AR 71 is an address register for receiving the address of the data block in the main storage unit 3 when a move out request or a data transfer request is issued by the memory control unit (MCU) 4. In accordance with the address set or received in the MSU AR 71, the corresponding MSU bank 70 is accessed. An MSU RDR 72 is a read data register for latching the data read from the MSU bank 70, and the read data is transferred through the MSU RDR 72 to the memory control unit (MCU) 4. An MSU WR 73 is a write register for latching the data moved out from the memory control unit (MCU) 4, and the moved out data is written through the MSU WR 73 into the corresponding MSU bank 70.

Next, the operation of the store-in buffer control in the data processing system shown in FIG. 3, by using the GBS tag unit 41 shown in FIG. 9B, is described in more detail.

Figures 25, 26:

Various mode of operations exist, as follows:

(1) a process when a central processing unit requires a data transfer without an exclusive right (FIGS. 11 to 16);

(2) a process when a central processing unit requires a data transfer with an exclusive right (FIGS. 17 to 22);

(3) a process when a central processing unit requires a change of a state of its entry from a nonexclusive right state to an exclusive right state (FIG. 23); and (4) a process when a central processing unit issues a move out request (FIGS. 24 and 25).

In all of these FIGS. 11 to 25, it is assumed that a central processing unit 1, among the four central processing units $1_0$ to $1_3$, requests an access to an entry in an associative level having a real address A in the GBS tag unit 41. If a central processing unit is executing a process by using the entry before requesting an access to the entry by the central processing unit $1_1$, such central processing units are referred to in this specification as a former central processing unit and a latter central processing unit.

The above four modes of operations are sequentially described as follows.

(1) A process when the central processing unit $1_1$ requests a data transfer without an exclusive right (FIGS. 11 to 16)

This mode contains five submodes (1a) to (1e), which are sequentially described as follows.

(1a) When the accessing address A coincides with a real address A in a tag of the GBS tag unit 41, when the exclude bit E in this tag is "0", and when the valid bit V in this tag is "1" (FIG. 11), the coincidence of the addresses means that the entry including the data to be read out to the latter central processing unit $1_1$ is present in the global buffer storage unit 5. In addition, the exclude bit of "0" means that the former central processing unit, for example, central processing unit $1_0$, is merely reading a data block in this entry in the global buffer storage unit 5 only for a reference process, i.e., not for a rewriting process. Therefore, the data block read out from this entry of the global buffer storage unit 5 to the buffer storage unit 2 in the former central processing unit is not modified by the former central processing unit. Accordingly, it is not necessary to reflect the contents of the buffer storage unit of the former central processing unit at the global buffer storage unit 5 before transferring data from the entry of the global buffer storage unit 5 to the latter central processing unit. Thus, according to the request to transfer the data block from this entry in the global buffer storage unit 5 to the latter central processing unit $1_1$, the data block of 64 bytes in this entry is merely transferred from the global buffer storage unit 5 to the latter central processing unit $1_1$, without moving out the data block from the former central processing unit $1_0$ to the global buffer storage unit 5. After the data is transferred from the global buffer storage unit 5 to the latter central processing unit, the corresponding copy bit $C_{ij}$ representing the block j in this entry and the central processing unit $1_j$ is set to "1".

FIG. 11 shows an example of the case in which the upper portion and the lower portion of the figure respectively represent a GBS tag of an entry before and after responding to the request from the latter central processing unit $1_1$.

The tag corresponding to an entry of the global buffer storage unit 5 includes, before responding to the request from the latter central processing unit $1_1$, a real address A indicating that the data in this entry was transferred from the real address A of a main storage unit 3, a valid bit V equal to "1" indicating that this entry is valid, and an exclude bit E equal to "0" indicating that no central processing unit is executing a process with an exclusive right. In addition, the tag includes a copy bit $C_{00}$ equal to "1" indicating that a block of a block number 0 in the entry is being referred to or identified by the central processing unit $1_0$, modify bits $M_0$ to $M_3$ which are all "0" indicating that the data in all blocks in this entry have not been modified by any one of the central processing units, and copy bits $C_{01}$ to $C_{33}$ which are all "0" indicating that the data in the corresponding blocks are not copied by the corresponding central processing units.

In the tag after responding to the request from the latter central processing unit $1_1$, the copy bit $C_{21}$ is changed from "0" to "1" as shown in the lower portion of the figure. The other contents are the same as the contents of the tag shown in the upper portion of the figure. As a result, the former and the latter central processing units $1_0$ and $1_1$ respectively refer to or identify the block of the block number 0 and the block of the block number 2 in the entry without an exclusive right.

(1b) When the accessing address A coincides with a real address A in a tag in the GBS tag unit 41, when the exclude bit E in this tag is "1", and when the valid bit V in this tag is "1" (FIGS. 12 and 13), the coincidence of the addresses means that the entry including the data to be read out to the latter central processing unit is present in the global buffer storage unit 5. In addition, the exclude bit of "1" means that the former central processing unit is executing a process by using data in this entry with an exclusive right, i.e., the former central processing unit is executing a process to rewrite data in a block of this entry. Therefore, the data block read out from this entry of the global buffer storage unit 5 to the buffer storage unit 2 in the former central processing unit may be modified. When the exclude bit is "1", only a single central processing unit is allowed to access the entry. Therefore, it is checked, by referring to the copy bits, whether or not the former central processing unit is the same as the latter central processing unit.

($1b_i$) If the former central processing unit is the same as the latter central processing unit $1_1$ (FIG. 12), the same central processing unit $1_1$ can receive a new data block for reference in response to the request to transfer data from the global buffer storage unit 5, without returning the old data to the global buffer storage unit 5, because this central processing unit $1_1$ has the exclusive right to access the entry. After transferring the required data of 64 bytes from a block of a block number i in this entry of the buffer storage unit 5 to the central processing unit $1_1$ which originated the request, the corresponding copy bit $C_{i1}$ is made 37 1".

FIG. 12 shows an example of the case in which the upper portion and the lower portion of the figure respectively represent a GBS tag before and after responding to the request from the central processing unit $1_1$.

The tag corresponding to an entry of the global buffer storage unit 5 includes, before responding to the request from the central processing unit $1_1$, a real address A indicating that the data in this entry was transferred from the real address A of a main storage unit 3, a valid bit equal to "1" indicating that this entry is valid, and an exclude bit E equal to "1" indicating that a central processing unit is executing a process with an exclusive right. In addition, the tag includes a copy bit $C_{11}$ equal to "1" and the exclude bit E of "1" indicating that a block of a block number 1 in the entry is being exclusively referred to by the processing unit $1_1$, and modify bits $M_0$ to $M_3$ which are all "0" indicating that the data in all blocks in this entry have not been modified by any one of the central processing units 1. Further, the tag contains copy bits $C_{00}$ to $C_{03}$, $C_{10}$, and $C_{12}$ to $C_{33}$ which are all "0" indicating that the data in the corresponding blocks is not copied by the corresponding central processing units.

In the tag after responding to the request from the same central processing unit $1_1$, the copy bit $C_{21}$ is changed from "0" to "1" as shown in the lower portion of the figure. The other contents are the same as the contents of the tag shown in the upper portion of the figure. As a result, the central processing unit $1_1$ exclusively uses the data in the block of the block number 1 and the block of the block number 2 in this entry, although the request from the central processing unit $1_1$ was a data transfer for reference only without an exclusive right.

($1b_{ii}$) If the former central processing unit is different from the latter central processing unit $1_1$ (FIG. 13), it is impossible to transfer data from a block in this entry to the latter central processing unit $1_1$ while the former central processing unit still has the exclusive right to access this entry, because only one central processing unit having the exclusive right is allowed to access this entry. Therefore, it is necessary to reflect the contents of the buffer storage unit of the former central processing unit on the global buffer storage unit 5 before transferring data from the entry of the global buffer storage unit 5 to the latter central processing unit $1_1$. To this end, first the exclusively obtained contents in the former central processing unit are forcibly moved out to the original block in this entry of the global buffer storage unit 5 by issuing a forcible move out request from the global buffer storage unit 5 to the former central processing unit having the exclusive right. Then the exclude bit E and the copy bit corresponding to the former central processing unit and to the original block in which the forcibly moved out data is returned are reset to "0". Further, the modify bit corresponding to the original block is set to "1", indicating that the data in this block is modified because the data has been returned from the central processing unit having the exclusive right. Thereafter, the required 64 bytes data block is transferred from the designated block in this entry to the latter central processing unit $1_1$ which originated the request. Then a copy bit corresponding to the former central processing unit and to the original block is reset to "0" indicating that the data in this block is not copied to the former central processing unit. Note, in accordance with the move out of data from the former central processing unit to the global buffer storage unit 5, the valid bit in the BS tag unit 21 (see FIG. 8) in the former central processing unit which has managed the moved out block is reset to "0", indicating that the moved out block is invalid.

Figure 13:
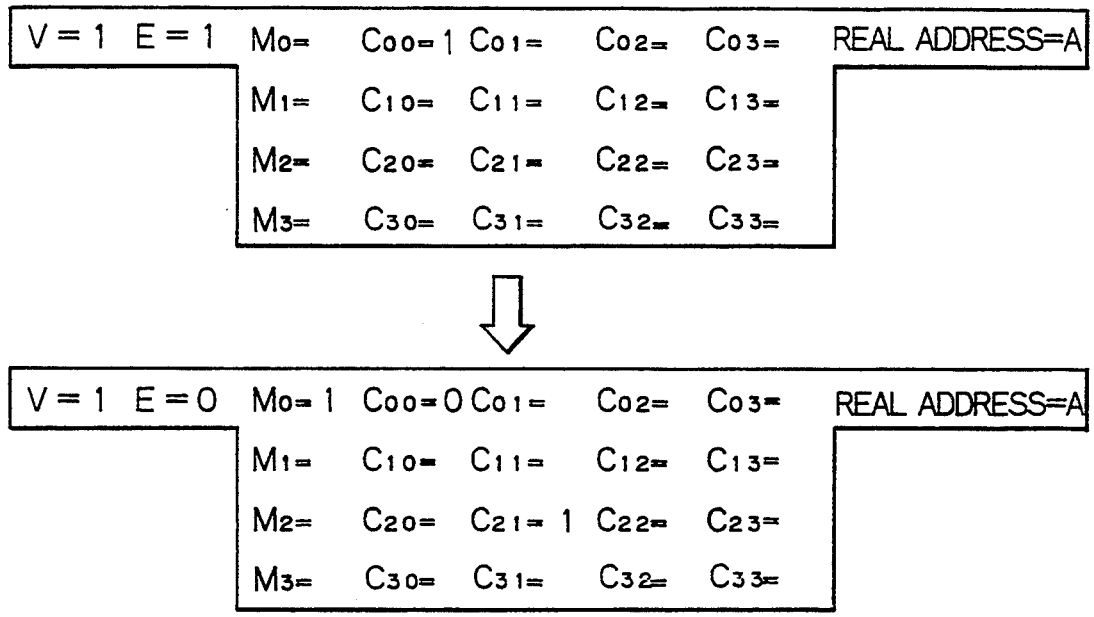

FIG. 13 shows an example of the case in which the upper portion and the lower portion of the figure respectively represent a tag before and after responding to the request from the central processing unit $1_1$.

The tag corresponding to an entry of the global buffer storage unit 5 includes, before responding to the request from the central processing unit $1_1$, a real address A indicating that the data in this entry was transferred from the real address A of a main storage unit 3, a valid bit V equal to "1" indicating that this entry is valid, and an exclude bit E equal to "1" indicating that a former central processing unit is executing a process with an exclusive right. In addition, the tag includes a copy bit $C_{00}$ equal to "1" and the exclude bit E of "1" indicating that a block of the block number 0 in the entry is being exclusively referred to and possibly modified by the processing unit $1_0$. Further, the tag includes modify bits $M_0$ to $M_3$ which are all "0" indicating that the data in all blocks in this entry have not been modified by any of the central processing units, and copy bits $C_{01}$ to $C_{33}$ which are all "0s" indicating that the data in the corresponding blocks are not copied by the corresponding central processing units.

In the tag after responding to the request from the central processing unit $1_1$, the copy bit $C_{21}$ is changed from "0" to "1" as shown in the lower portion of the figure, the modify bit $M_0$ is changed from "0" to "1", and the exclude bit E is changed from "1" to "0". The other contents are the same as the contents of the tag shown in the upper portion of the figure. As a result, the former central processing unit $1_0$ has lost the exclusive right and the latter central processing unit $1_1$ is reading the data from tile block of the block number 2 in this entry, without an exclusive right, i.e., only for reference.

(1c) When the accessing address A does not coincide with a real address of all entries of the GBS tag unit 41, so that the data transfer is to be effected from the main storage unit 3 to the latter central processing unit, and when there is an entry having a valid bit equal to "0" (FIG. 14), the global buffer storage unit 5 does not have the data block required by the latter central processing unit for only a reference thereto without an exclusive right. Therefore, the latter central processing unit requires a main storage unit 3 to transfer the data block therefrom. In this case, when there is an empty entry having a valid bit equal to "0", the data block of 256 bytes is transferred from the main storage unit 3 to the empty entry in the GBS data managing unit 40 and is written therein. Then, the requested 64 byte data block in the written data block of 256 bytes is transferred from the written entry to the latter central processing unit $1_1$. In addition, the valid bit V and the corresponding copy bit in the tag of the written entry are set to "1", the exclude bit in the tag of this entry is reset to "0", and the real address of the data block of 256 bytes is registered in the tag of this entry.

Figure 14:
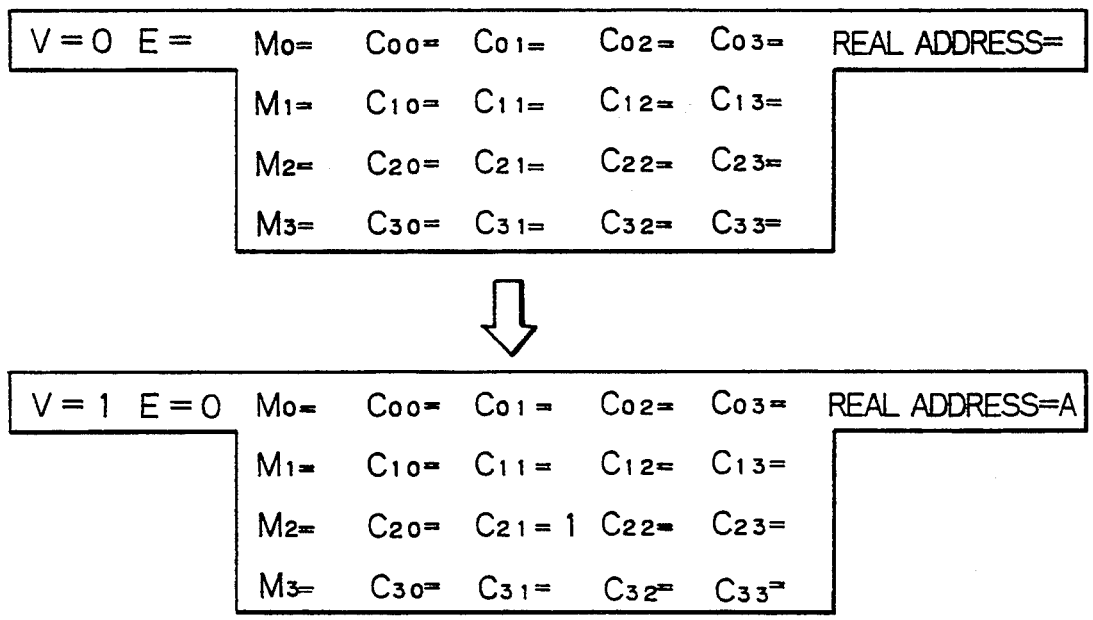

FIG. 14 shows an example of the case in which the upper portion of the figure represents a tag of an empty entry having a valid bit equal to "0", and the lower portion of the figure represents a tag after responding to the request from the central processing unit $1_1$.

When the valid bit V in a tag is "0", all data in the entry are deemed invalid. This tag is updated in such a way that, when a data block of 256 bytes at the real address A of a main storage unit 3 is transferred and stored in the empty entry, the valid bit V in the tag of the empty entry is changed from "0" to "1", the real address A is registered in the tag of this entry, and all of the copy bits $C_{00}$ to $C_{33}$ in the tag of this entry are reset to "0". Then, when the required 64 byte data block is transferred from the block number 2 in this entry to the central processing unit $1_1$, the copy bit $C_{21}$ is changed to "1" and the exclude bit E is reset to "0". The other copy bits except for the copy bit $C_{21}$ remain "0".

(1d) When the accessing address A does not coincide with any real address of all entries of the GBS tag unit 41, so that the data transfer is to be effected from the main storage unit 3 to the latter central processing unit, and when an entry having the contents which are determined to be replaced by the data block transferred from the main storage unit 3, has a valid bit V="1" and an exclude bit E="0" (FIG. 15), the global buffer storage unit 5 does not have the data block required by the latter central processing unit for only reference thereto without an exclusive right. Therefore, the latter central processing unit requires a main storage unit 3 for transferring the data block therefrom. In this case, when there is no empty entry in the global buffer storage unit 5, an entry is determined to be changed to an empty entry in accordance with the LRU method, to enable a transfer of the data block from the main storage unit 3 to the global buffer storage unit 5. When the thus determined entry (hereinafter referred to as a replacing entry) has an exclude bit equal to "0", representing that the replacing entry is not exclusively used by any of the central processing units, it is necessary to execute the following process to make the replacing entry an empty entry.

Namely, referring to the copy bits in the tag of the replacing entry, the central processing units which are reading the data in the blocks in this replacing entry are determined, and the data read into the thus determined central processing units is then made invalid. The data block corresponding to the modify bit of "1" may be different from the original data block in the main storage unit 3. Therefore, when there is a modify bit of "1" in the tag of the replacing entry, the data block corresponding to the modify bit of "1" must be reflected at the main storage unit 3. To this end, the data block corresponding to the modify bit of "1" is moved out or transferred to the original address of the data block in the main storage unit 3, and thus, the replacing entry becomes an empty entry and the modified contents are reflected at the main storage units. Thereafter, the modify bit "1" is reset to "0". Note that the data block corresponding to the modify bit "1" need not be always moved out but may be transferred, because the content of this block in the replacing entry is later replaced by new data.

Then, in accordance with the data transfer request given by the later central processing unit $1_1$ to the main storage units 3, the data block of 256 bytes is transferred from the designated address in a main storage unit 3 to the emptied entry in the GBS data managing unit 40, and is written therein. Then the requested 64 byte data block in the written data block of 256 bytes is transferred from the written entry to the latter central processing unit $1_1$. In addition, the valid bit V and the corresponding copy bit in the tag of the written entry are set to "1", the exclude bit in the tag of this entry is reset to "0", and the real address of the data block of 256 bytes is registered in the tag of this entry. The modify bit "0" indicates that the corresponding data block is not modified and the contents of the data block will be replaced by a new data block to be transferred from the main storage unit 3 to the replacing entry. Therefore, it is not necessary to move out the data block corresponding to the modify bit of "0" to the main memory.

Figure 15:
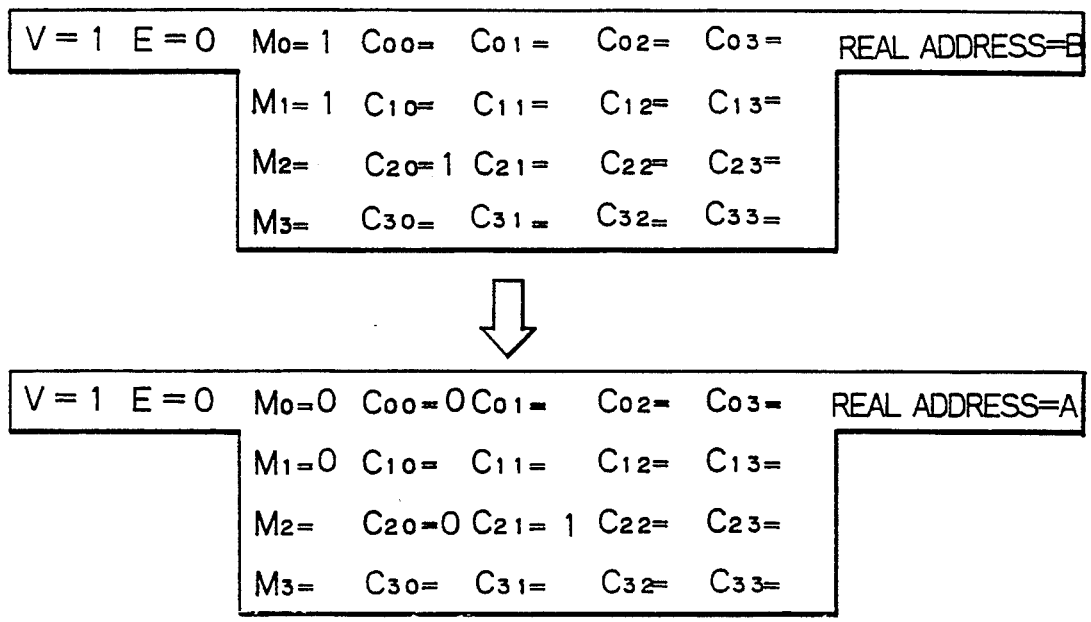

FIG. 15 shows an example of the case in which the upper portion of the figure represents a tag of an entry for which the contents are determined to be replaced by new data, and the lower portion of the figure represents the tag after responding to the request from the central processing unit $1_1$.

The tag of the replacing entry includes a valid bit V "1" indicating that this replacing entry is valid, an exclude bit E "0" indicating that this replacing entry is not used exclusively by any of the central processing units, and modify bits $M_0$ of "1", and $M_1$ of "1" indicating that the contents in the blocks of the number 0 and the number 1 may have been modified by one or more of the central processing units. In addition, the tag includes a copy bit $C_{20}$ of "1" indicating that the data in the block number 2 is copied to the buffer storage unit 2 in the central processing unit $1_0$, and the real address B indicating that the data in this replacing entry was transferred from the address B of the main storage units 3. The other modify bits and the copy bits are all "0".

The tag of this replacing entry is updated as follows. Namely, the copy bit $C_{20}$ is changed from "1" to "0" so that the data of the block number 2 in the central processing unit $1_0$ is made invalid. Also, the modified data in the block numbers 0 and 1 are moved out to the address B of the main storage unit 3, and then the modify bits $M_0$ and $M_1$ are changed to "0". Then, the required data block of 256 bytes at the real address A of a main storage unit 3 is transferred and stored in the replacing entry, and the real address A is registered in the tag of this entry. Then, when the required 64 byte data block is transferred from the block number 2 in this entry to the central processing unit $1_1$, the copy bit $C_{21}$ is changed to "1" and the exclude bit E is reset to "0". The other copy bits except for the copy bit $C_{21}$ remain "0".

(1e) When the accessing address A does not coincide with any real address in all tags in the GBS tag unit 41, so that the data transfer is to be effected from the main storage unit 3 to the latter central processing unit, and when a tag of an entry, the contents of which are determined to be replaced by the data block transferred from the main storage unit 3, has a valid bit V="1" and an exclude bit E="1", (FIG. 16), this case is similar to the case (d) described above. The only difference is that the exclude bit E of the replacing entry is "1". Since the exclude bit E is "1", the contents in the central processing unit $1_0$ must be forcibly moved out to the main storage unit 3.

In more detail, in this case the global buffer storage unit 5 does not have the data block required by the latter central processing unit $1_1$ for only reference thereto without any exclusive right, and therefore, the latter central processing unit $1_1$ instructs main storage unit 3 to transfer the data block therefrom. In this case, when there is no empty entry in the global buffer storage unit 5, an entry or replacing entry is determined to be changed to or replaced by an empty entry in accordance with the LRU method, to enable a transfer of the data block from the main storage unit 3 to the empty entry in the global buffer storage unit 5. When the tag of the thus determined replacing entry has an exclude bit equal to "1" representing that the replacing entry is exclusively used by one of the central processing units, it is necessary to execute the following processes, to make the replacing entry an empty entry.

Namely, referring to the copy bits in the replacing entry, it is determined which one or more of the central processing units is reading the data in the blocks in this replacing entry. Then, the data read into the thus determined central processing units is forcibly moved out directly to the original address of the main storage unit 3 without writing the same to the GBS data managing unit 40. The copy bit corresponding to the determined central processing unit and the block is then reset to "0". Even when the central processing units have the exclusive rights, the data in the central processing units having the exclusive rights may not have been modified, depending on the time. To determine whether or not the data in the central processing units are actually modified, the modify bits in the BS tag units in the central processing units are checked.

When there is a modify bit of "1" in the GBS tag of the replacing entry, the data block corresponding to the modify bit of "1" must be reflected at the main storage unit 3. To this end, the data block corresponding to the modify bit of "1" is moved out or transferred to the original address of the data block in the main storage unit 3. Thus, the replacing entry becomes an empty entry and the modified contents are reflected on the main storage units. Thereafter, the modify bit of "1" is reset to "0". Note that the data block corresponding to the modify bit of "1" need not be always moved out but may be transferred, because the content of this block in the replacing entry will be later replaced by new data.

Then, in accordance with the data transfer request sent by the later central processing unit $1_1$ to the main storage units 3, the data block of 256 bytes is transferred from the designated address in a main storage unit 3 to the emptied entry in the GBS data managing unit 40, and is written therein. Then, the requested 64 byte data block in the written data block of 256 bytes is transferred from the written entry to the latter central processing unit $1_1$. Next, the valid bit V and the corresponding copy bit in the tag of the written entry are set to "1", the exclude bit in the tag of this entry is reset to "0", and the real address of the data block of 256 bytes is registered in the tag of this entry. The modify bit of "0" indicates that the corresponding data block has not been modified and the contents of the data block will be replaced by a new data block to be transferred from the main storage unit 3 to the replacing entry. Therefore, it is not necessary to move out the data block corresponding to the modify bit of "0" to the main storage unit.

Figure 16:
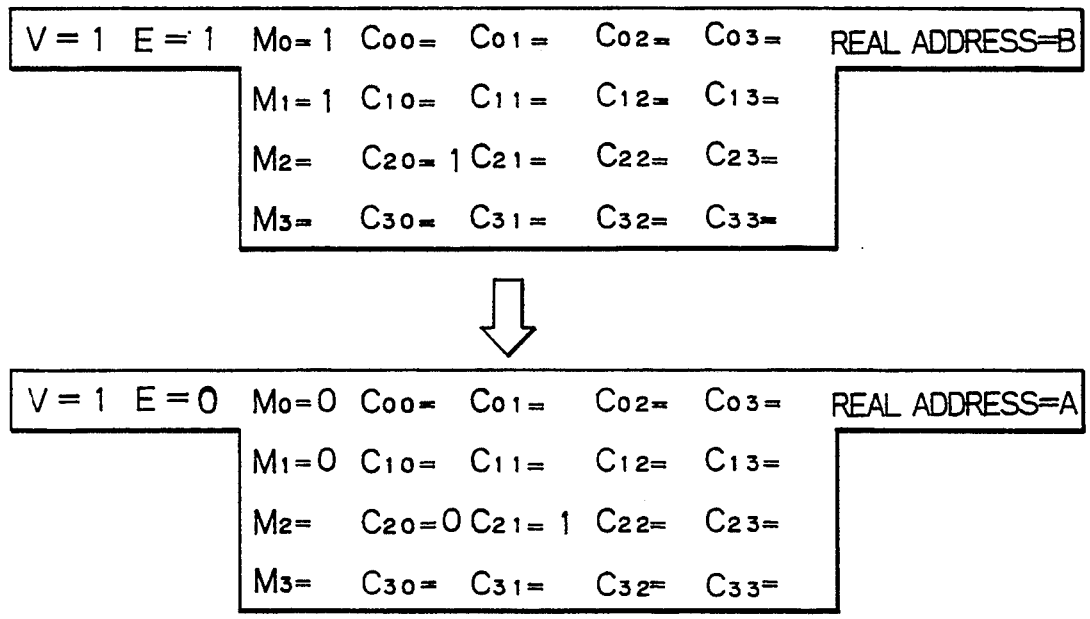

FIG. 16 shows an example of this case in which the upper portion of the figure represents a tag of an entry, the contents of which are determined to be replaced by new data, and the lower portion of the figure represents the tag after responding to the request from the central processing unit $1_1$.

The tag of the replacing entry includes a valid bit V of "1" indicating that this replacing entry is valid, an exclude bit E of "1" indicating that this replacing entry is used exclusively by one of the central processing units, and modify bits $M_0$ of "1" and $M_1$ of "1" indicating that the contents in the blocks of the number 0 and the number 1 may have been modified by one or more of the central processing units. In addition, the tag includes a copy bit $C_{20}$ of "1" indicating that the data in the block number 2 is copied to the buffer storage unit 2 in the central processing unit $1_0$, and the real address B indicating that the data in this replacing entry was transferred from the address B of the main storage units 3. The other modify bits and the copy bits are all "0".

The tag of this replacing entry is updated as follows. Namely, referring to the copy bit $C_{20}$ of "1", it is determined that the central processing unit $1_0$ is exclusively using the data in the block number 2, and therefore, the data of the block number 2 in the central processing unit $1_0$ is forcibly moved out to the address B of the main storage unit 3. Thereafter, the copy bit $C_{20}$ is reset to "0". Also, the modified data in the block numbers 0 and 1 are moved out to the address B of the main storage unit 3, and the modify bits $M_0$ and $M_1$ are changed to "0". Then, the required data block of 256 bytes at the real address A of a main storage unit 3 is transferred and stored in the replacing entry, and the real address A is registered in the tag of this entry. Then, when the required 64 byte data block is transferred from the block number 2 in this entry to the central processing unit $1_1$, the copy bit $C_{21}$ is changed to "1" and the exclude bit E is reset to "0". The other copy bits except for the copy bit $C_{21}$ remain "0".

(2) A process when the central processing unit $1_1$ requires a data transfer with an exclusive right (FIGS. 17 to 22).

This mode contains five submodes (2a) to (2e), which are similar to the respective five submodes (1a) to (1e) of the first mode (1). Namely the only difference is that the latter central processing unit requires an exclusive right. The submodes (2a) to (2e) of the second mode (2) are briefly described as follows.

(2a) When the accessing address A coincides with a real address A in an entry of the GBS tag unit 41, when the exclude bit E in this entry is "0", and when the valid bit V in this entry is "1" (FIG. 17), this case is similar to that shown in FIG. 11. The only difference between the two cases is that the latter central processing unit $1_1$ wishes to obtain an exclusive right.

In this case, the coincidence of the addresses means that the entry including the data to be read out to the latter central processing unit is present in the global buffer storage unit 5, and the exclude bit of "0" means that the former central processing unit is reading a data block in this entry in the global buffer storage unit 5 without an exclusive right, i.e., not for a rewriting process. Therefore, the data block read out from this entry of the global buffer storage unit 5 to the buffer storage unit 2 in the former central processing unit is not modified by the former central processing unit. Accordingly, to realize the acquisition of an exclusive right by the latter central processing unit $1_1$, it is sufficient to determine which former central processing unit is reading a data block in this entry and to make the contents in the determined former central processing unit invalid. Thus, according to the request to transfer a data block from this entry in the global buffer storage unit 5 to the latter central processing unit $1_1$, the required data block of 64 bytes in this entry is transferred from the global buffer storage unit 5 to the latter central processing unit $1_1$. After the data transfer from the global buffer storage unit 5 to the latter central processing unit $1_1$, the exclude bit E and the copy bit $C_{i1}$ corresponding to the required block i in this entry-and the central processing unit $1_1$ are set to "1".

FIG. 17 shows an example of this case in which the upper portion and the lower portion of the figure respectively represent a tag before and after responding to the request from the latter central processing unit $1_1$.

The tag corresponding to an entry of the global buffer storage unit 5 includes, before responding to the request from the latter central processing unit $1_1$, a real address A indicating that the data in this entry was transferred from the real address A of a main storage unit 3, a valid bit equal to "1" indicating that this entry is valid, and an exclude bit E equal to "0" indicating that no central processing unit is executing a process with an exclusive right. In addition, the tag includes copy bits $C_{00}$, $C_{10}$, and $C_{20}$ which are all "1" representing that the blocks of the numbers 0, 1, and 2 are being referred to or identified by the central processing unit $1_0$, copy bits $C_{00}$, $C_{12}$, and $C_{22}$ which are all "1" indicating that the blocks of the numbers 0, 1, and 2 are being referred to by the processing unit $1_2$, and modify bits $M_0$ to $M_3$ which are all "0" indicating that the data in all blocks in this entry have not been modified by any of the central processing units. Further, the tag includes the remaining copy bits which are all "0" indicating that the data in the corresponding blocks are not copied by the corresponding central processing units.

In the tag after responding to the request from the latter central processing unit $1_1$, the copy bits $C_{00}$, $C_{10}$, $C_{20}$, $C_{02}$, $C_{12}$, and $C_{22}$ are reset to "0" so that the data in the corresponding central processing units $1_0$ and $1_1$ are made invalid. Then, the required 64 byte data is sent from the block of the number 2 in this entry to the latter central unit $1_1$. Thereafter, the exclude bit E and the corresponding copy bit $C_{21}$ are set to "1" to provide an exclusive right to the latter central processing unit $1_1$.

(2b) When the accessing address A coincides with a real address A in an entry of the GBS tag unit 41, when the exclude bit E in this entry is "1"' and when the valid bit V in this entry is "1" (FIGS. 18 and 19), this case is similar to that described in (1b). The only difference between the two cases is that the latter central processing unit $1_1$ requires an exclusive right, and therefore, a detailed description of this case is omitted.

FIG. 18, which is the same as FIG. 12, shows an example of this case. The only difference in this case is that the latter central processing unit $1_1$ is requesting an exclusive right. In FIG. 18, the former central processing unit having an exclusive right and the latter central processing unit are the same, and therefore, the exclude bit E is kept at "1". The explanation of FIG. 18 is almost the same as that of FIG. 12, and therefore, an explanation of FIG. 18 is omitted here.

Figure 19:
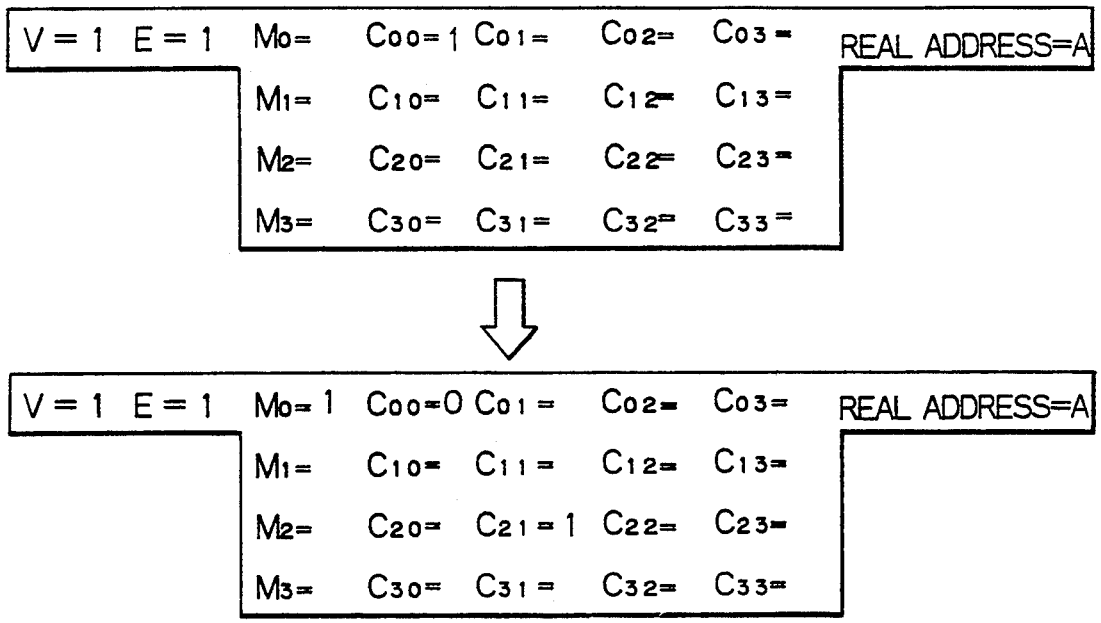

FIG. 19, which is the same as FIG. 13, shows another example of this case. Similar to the case of FIG. 13, the only difference in this case is that the latter central processing unit $1_1$ is requesting an exclusive right. In FIG. 19, the former central processing unit having an exclusive right and the latter central processing unit are different, but since the latter central processing unit $1_1$ is requesting an exclusive right, the exclude bit E is set to "1" after the process. The explanation of FIG. 19 is almost the same as that of FIG. 13, and therefore, the explanation of FIG. 19 is omitted here.

(2c) When the accessing address A does not coincide with a real address in all tags in the GBS tag unit 41, so that the data transfer is to be effected from the main storage unit 3 to the latter central processing unit, and when there is an entry having a valid bit equal to "0" (FIG. 20), this case is similar to that described (1c) shown in FIG. 14. The only difference between the two cases is that the latter central processing unit $1_1$ requires an exclusive right, and therefore, a detailed description of this case is omitted.

Figure 20:
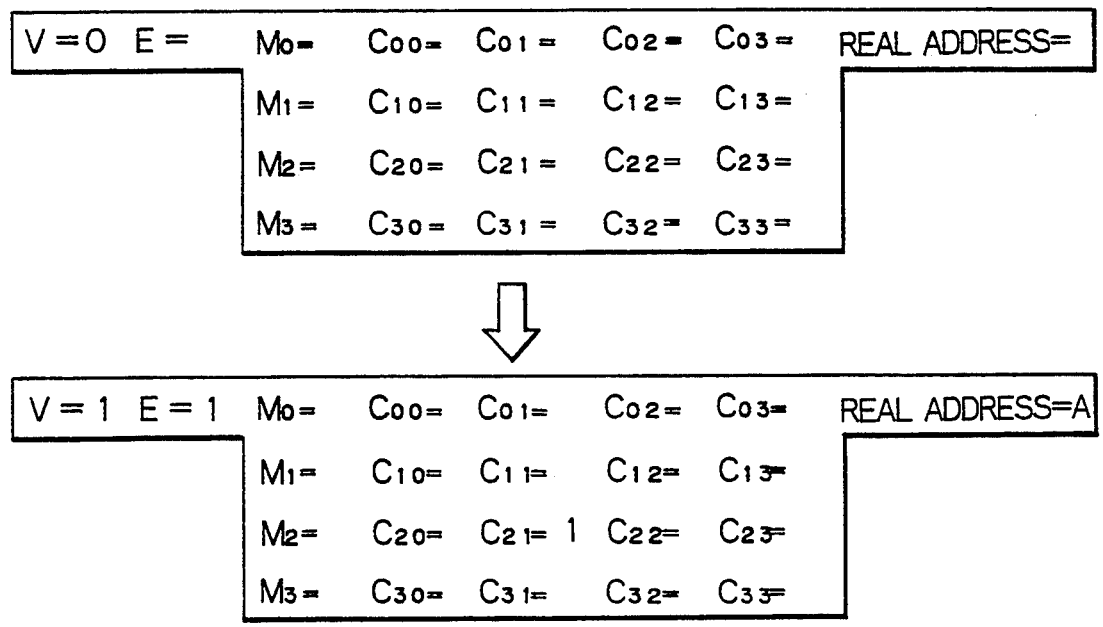

FIG. 20, which is almost the same as FIG. 14, shows an example of this case. The only difference in this case is that the latter central processing unit $1_1$ is requesting an exclusive right, and therefore, after the end of the process, the exclude bit E is set to "1". The explanation of FIG. 20 is almost the same as that of FIG. 14, and therefore, an explanation of FIG. 20 is omitted.

(2d) When the accessing address A does not coincide with a real address in all tags in the GBS tag unit 41, so that the data transfer is to be effected from the main storage unit 3 to the latter central processing unit, and when an entry, the contents of which are determined to be replaced by the data block transferred from the main storage unit 3, has a valid bit V="1" and an exclude bit E="0" (FIG. 21), then this case is similar to that described in (1d) in FIG. 15, the only difference being that the latter central processing unit $1_1$ requires an exclusive right, and therefore, a detailed description of this case is omitted.

Figure 21:
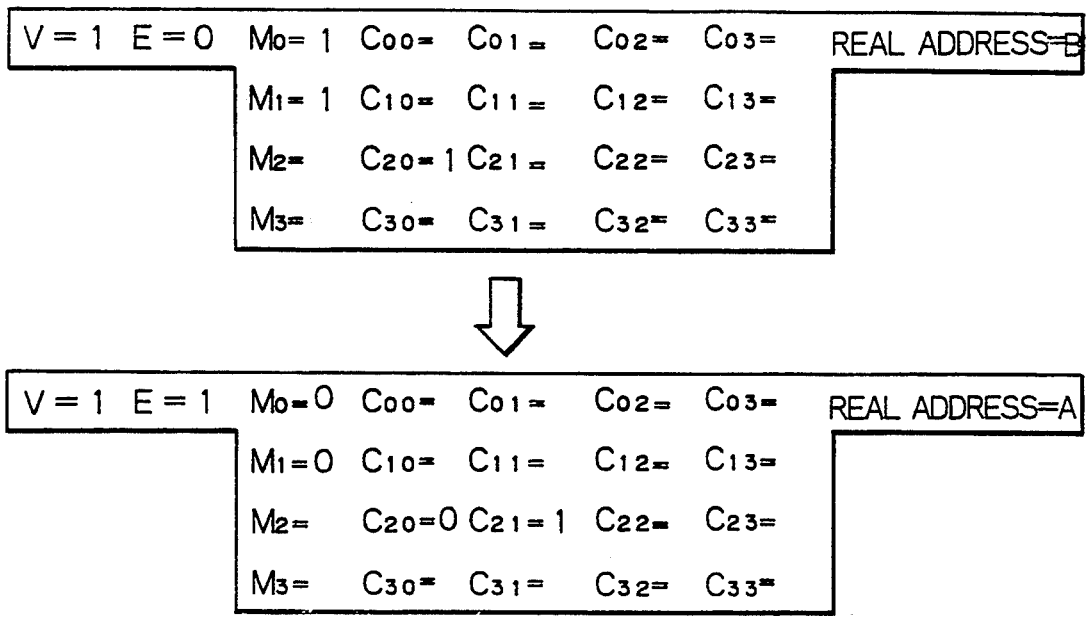

FIG. 21, which is almost the same as FIG. 15, shows an example of this case. The only difference in this case is that the latter central processing unit is requesting an exclusive right, and therefore, after the end of the process, the exclude bit E is set to "1". The explanation of FIG. 21 is almost the same as that of FIG. 15, and therefore, an explanation of FIG. 21 is omitted here.

(2e) When the accessing address A does not coincide with a real address in all tags in the GBS tag unit 41, so that the data transfer is to be effected from the main storage unit 3 to the latter central processing unit, and when an entry, the contents of which are determined to be replaced by the data block transferred from the main storage unit 3, has a valid bit V="1" and an exclude bit E="1" (FIG. 22), this case is similar to (1e) in FIG. 16. The only difference being that the latter central processing unit $1_1$ requires an exclusive right, and therefore, a detailed description of this case is omitted.

FIG. 22, which is almost the same as FIG. 16, shows an example of this case. The only difference in this case is that the latter central processing unit is requesting an exclusive right, and therefore, after the end of the process, the exclude bit E is set to "1". The explanation of FIG. 22 is almost the same as that of FIG. 16, and therefore, an explanation of FIG. 22 is omitted.

(3) A process when a central processing unit issues a request for a change of mode from a state in which the central processing unit is referring to a data block without an exclusive right to a state in which the central processing unit processes the data block with an exclusive right (FIG. 23)

In the above cases (1a) to (1e) and (2a) to (2e), the latter central processing unit does not have the necessary data in its buffer storage unit 2. Thus the latter central processing unit issues a request for data transfer of the necessary data from the global buffer storage unit. In contrast, in this case (3), while one or more of the central processing units are referring to a data block without an exclusive right, one of these central processing units wishes to process the same data block in its buffer storage unit 2 with an exclusive right.

In this case, it is determined whether the entry including the data block is present, by referring to the GBS tag unit 41. Then it is checked whether the exclude bit E of this entry is "0", indicating that the data blocks in this entry are being read by one or more of the central processing units without an exclusive right. Next, according to the copy bits of the entry, the one or more central processing units which are reading the data blocks in the entry are determined. The data blocks in the determined central processing units, except for the central processing unit requiring an exclusive right, are made invalid. Thereafter, the exclude bit E of this entry is set to "1".

FIG. 23 shows an example of this case. In FIG. 23, the upper portion shows a tag of an entry including a valid bit V equal to "1" indicating this entry is valid, and an exclude bit E of "0" indicating that this entry is used by one or more central processing units without an exclusive right. In addition, the tag includes copy bits $C_{20}$, $C_{21}$, and $C_{22}$ being "1" indicating that the central processing units $1_0$, $1_1$, and $1_2$ are reading the data block of the block number 2, and a real address A.

When the central processing unit $1_1$ requires an exclusive right, the copy bits $C_{20}$ and $C_{22}$ are changed to "0" so that the data blocks in the central processing units $1_0$ and $1_2$ are made invalid, and thereafter, the exclude bit E is changed to "1".

(4) A process when a buffer storage unit in a central processing unit stores an unnecessary data block but does not store a necessary data block, and thus the central processing unit issues a request to move out the unnecessary data block (FIG. 24 and FIG. 25)

This mode includes two submodes (4a) and (4b), as follows.

(4a) When the modify bit M in the BS tag shown in FIG. 6 corresponding to a data block to be moved out is "1", indicating that the data block in the central processing unit has been actually modified, the contents in the GBS tag are changed as shown in FIG. 24. Namely, after the data block is moved out from the central processing unit $1_1$ to the GBS data-managing unit 40, the corresponding copy bit $C_{21}$ in the GBS tag is reset to "0", and the corresponding modify bit $M_2$ in the GBS tag is set to "1", indicating that the data block moved into the block of the block number 2 has been modified. Thereafter, a new data block is transferred from the global buffer storage unit 5 to the moved out entry of the buffer storage unit 2 in the central processing unit $1_1$.

(4b) When the modify bit in the BS tag shown in FIG. 6 corresponding to a data block to be moved out is "0", indicating that the data block has not been modified, the contents in the GBS tag are changed as shown in FIG. 25. In this case, it is not necessary to move out the data block from the central processing unit $1_1$ to the global buffer storage unit 5. Instead, the central processing unit $1_1$ sends only the address of the data block to the GBS tag unit 21. In the global buffer storage unit 5, the copy bit $C_{21}$ corresponding the data block of the informed address is reset to "0", so that the data block in the central processing unit is made invalid. Thereafter, a new data block is transferred from the global buffer storage unit 5 to the entry storing the invalid data block in the buffer storage unit 2 of the central processing unit $1_1$.

Thus, according to the present invention, in a data processing system in which a plurality of central processing units 1 each having a store-in type buffer storage unit 2 commonly use a store-in type global buffer storage unit 5, the memory control of the store-in type can be efficiently effected.

Next, another embodiment of the present invention will be described.

In the above-described embodiment, each tag in the GBS tag unit 41 in the global buffer storage unit 5 must have $i \times j$ copy bits, where i is the number of the divided blocks in each entry of the global buffer storage unit 5 and j is the number of the central processing units. Therefore, in accordance with an increase of the number of the central processing units or the number of the divided blocks in each entry of the global buffer storage unit, the number of the copy bits is greatly increased, and accordingly the hardware amount is increased to accommodate the increased copy bits. As a result, the structure of the GBS tag in the afore-described embodiment is not the most suitable.

Accordingly, in another or third embodiment of the present invention, to reduce the amount of the hardware, the construction of the copy bits is as shown in FIG. 26. Namely, there are (M+N) copy bits consisting of M block bits $C_i$ respectively corresponding to the M-divided blocks in an entry, and N CPU bits $C_{pi}$ respectively corresponding to N central processing units 1. In the example shown in FIG. 26, there are four block bits $C_0$, $C_1$, $C_2$, and $C_3$ and four CPU bits $C_{p0}$, $C_{p1}$, $C_{p2}$, and $C_{p3}$. The valid bit V, the exclude bit E, and the address bits B1 to B9 are the same as in embodiment shown in FIG. 7.

By using these copy bits shown in FIG. 26, the number of the copy bits shown in FIG. 7, which was $(M \times N)$, can be reduced to $(M+N)$. For example, when the number of the central processing units is four and the number of the divided blocks in an entry of the global buffer storage unit 5 is four, sixteen copy bits were necessary in the construction shown in FIG. 7. But according to the third embodiment shown in FIG. 26, only eight copy bits are necessary. Also, when the number of the central processing units is eight and the number of the divided blocks is eight, 64 copy bits were necessary in the former embodiments. But according to the latter embodiment, only sixteen copy bits are necessary. Therefore, according to the latter or third embodiment of the present invention, the hardware needed for mounting the copy bits can be greatly reduced.

Figure 27A:
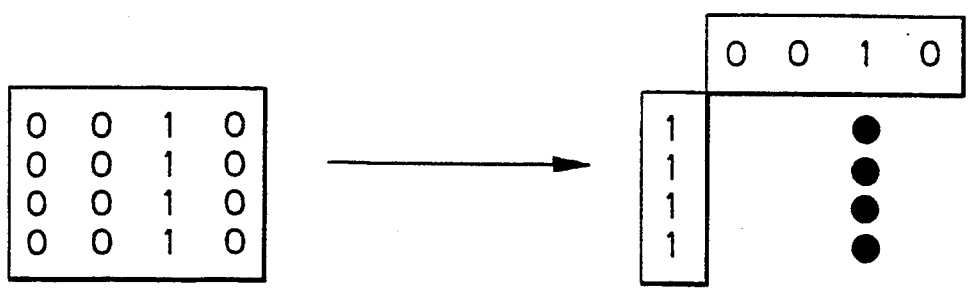
FIGS. 27A to 27D are diagrams explaining the process when the GBS tag shown in FIG. 26 is employed.
Figure 27B:
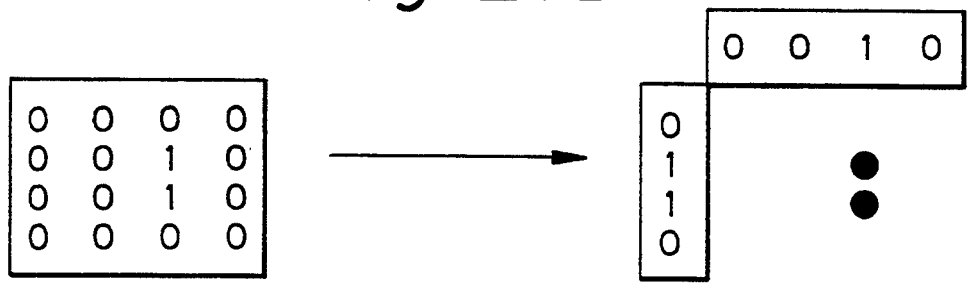
Figure 27C:
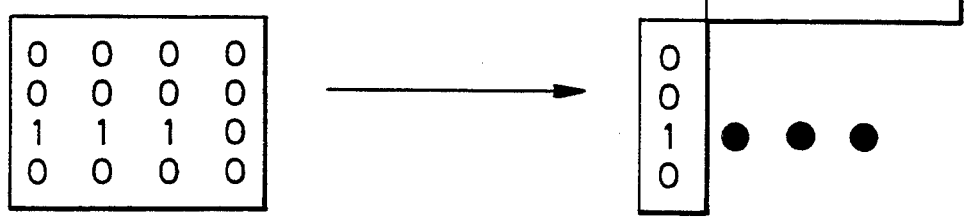
Figure 27D:
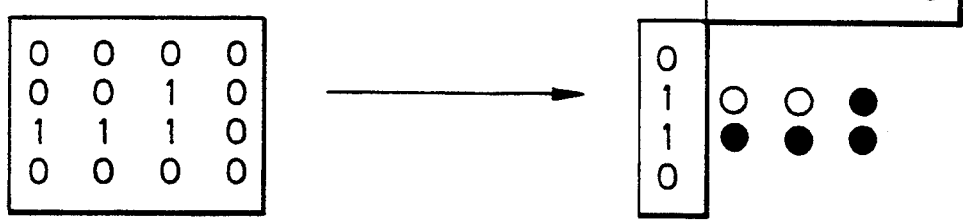

In these compacted copy bits, when a block bit $C_i$ is "1" and a CPU bit $C_{pj}$ is "1", this means that the block of the block number i is being copied to the central processing unit $1_j$. In the case of FIG. 27A, the blocks of the block numbers 0, 1, 2, and 3 are being copied to the central processing unit $1_2$. In the case of FIG. 27B, the blocks of the block numbers 1 and 2 are being copied to the central processing unit $1_2$; and in the case of FIG. 27C, the block of the block number 2 is being copied to the central processing units $1_0$, $1_1$, and $1_2$. In the case of FIG. 27D, the block of the block number 2 is being copied to the central processing units $1_0$, $1_1$, and $1_2$, and the block of the block number 1 is being copied to central processing unit $1_2$ (shown by black dots).

When these compacted copy bits are employed, and when the exclude bit in a tag of an entry to be managed is "1", indicating that the entry is exclusively used by a single central processing unit, only the same central processing unit can read the blocks in the entry. In this case, the compacted copy bits exactly represent the read blocks and the central processing unit which is reading the blocks. This case is shown in FIGS. 27A and 27B, in which the same central processing unit $1_2$ is copying the blocks.

When these compacted copy bits are employed, and when the exclude bit in a tag of an entry to be managed is "0", indicating that a plurality of the central processing units can read a plurality of blocks only for referring to the data, if a single block bit is "1", the compacted bits also exactly represent the read block and the central processing units which are reading the block. This case is shown in FIG. 27C, in which the block of the block number 2 is being read by the central processing units $1_0$, $1_1$, and $1_2$.

When these compacted copy bits are employed, and when the exclude bit in a tag of an entry to be managed is "0", indicating that a plurality of the central processing units can read a plurality of blocks, if a plurality of block bits are "1". However, the compacted copy bits do not always exactly represent the read blocks and the central processing units. For example, as shown in FIG. 27D, when the block of the block number 1 is being copied by the central processing unit $1_2$, and the block of the block number 2 is being copied by the central processing units $1_0$, $1_1$, and $1_2$ as shown in FIG. 27D by black circles, the block bits of the block numbers 1 and 2 are "1" and the CPU bits of the central processing units $1_0$, $1_1$, and $1_2$ are "1". By these compacted copy bits, not only the blocks which are being copied but also the blocks which are not being copied as illustrated in FIG. 27D by white circles are deemed as the blocks being copied. Therefore, although the data block of the block number 2 are not actually copied by the central processing units $1_0$ and $1_1$, an unnecessary moving out instruction or invalidating instruction is sent to the central processing units $1_0$ and $1_1$, to move out a data block which is not actually present in the central processing units $1_0$ and $1_1$. The practical overhead in the system performance when processing the unnecessary moving out or the unnecessary invalidation, however, is only one machine cycle for searching the buffer storage units 2 which are deemed to store the data blocks, because a response to the unnecessary instruction is returned before the central processing units which store the actual data blocks complete the processes. In addition, since there is no real address of a data block for responding to the forcible moving out instruction or the invalidation instruction because the central processing units do not actually store the data blocks corresponding to the instruction, even when the moving out instruction or the invalidation instruction is issued, no process is carried out. Therefore, an erroneous moving out operation or an erroneous invalidation operation is not carried out. In conclusion, almost no practical disadvantage arises even when the tag is so constructed as shown in FIG. 26.

Thus, according to the third embodiment of the present invention, in a data processing system in which a plurality of central processing units 1, each having a store-in type buffer storage unit 1, commonly use the global buffer storage unit 5, the store-in type memory control is efficiently executed with a reduced amount of hardware and without a deterioration of the control performance.

Next, a fourth embodiment of the present invention will be described. According to the fourth embodiment of the present invention, by using the above described data processing system, a new data processing system of the TCMP (Tightly Coupled Multiprocessor) type is provided.

FIG. 28 shows the new data processing system according to the fourth embodiment of the present invention. In FIG. 28, the new data processing system includes two systems which are each the data processing system of the first embodiment shown in FIG. 3. In these two systems, each of the memory control units 4 can receive, in accordance with a communication protocol, services provided by the global buffer storage unit 5 of the other system.

Namely, a GBS0, which is the global buffer storage unit 5 in one or first system, provides services to the CPU0 to CPU3 which are the central processing units 1 of the own system (#1), and to a CHP0 which is the channel processing unit 11 of the own system (#1). A GBS1, which is the global buffer storage unit 5 in the other or second system (#2), provides services to the CPU4 to CPU7 which are the central processing units 1 of the other system, and to a CHP1 which is the channel processing unit 11 of the other system. The GBS0 is connected not only to MSU0 and MSU1, which are the main storage units 3 of the own system (#1), but also to MSU2 and MSU3 which are the main storage units 3 of the other system. Further, by a bus connection between the memory control units 4, the GBS0 can copy not only the data block in the MSU0 and MSU1 of the own system (#1) but also the data block in the MSU2 and MSU3 of the other system. Similarly, the GBS1 can copy not only the data block in the MSU2 and MSU3 of the own system (#1) but also the data block in the MSU0 and MSU1 of the other system. By this construction, two methods can be used for carrying out the search process in the GBS tag unit 41 in the global buffer storage unit 5 of the opposite system (#2). That is, the search is carried out in the opposite system (#2) in accordance with a communication protocol, or the search is carried out in the own system (#1) by copying the managing data of the GBS tag unit 41 of the opposite system (#2).

The control of such a data processing system constructed as shown in FIG. 28 is basically realized by adding one of the controls as described in the processes (1a) to (4b), which are executed when a single global buffer storage unit 5 is employed, and a search process of a tag managed by the global buffer storage unit 5 in the opposite system (#2). The control carried out in the fourth embodiment of the present invention will now be described in more detail.

(A) A process when a central processing unit 1 requires data to be transferred without an exclusive right.

(Aa) When the accessing address A coincides with a real address A in a GBS tag of an entry in the GBS tag unit 41 of the own system (#1), when the exclude bit E in this tag is "0", and when the valid bit V in this tag is "1", the process is similar to the above described process (1a). Thus a data block is transferred from the entry of the GBS0 to the central processing unit requiring the data block.

(Ab) When the accessing address A coincides with a real address A in an entry of the GBS tag unit 41 of the own system (#1), when the exclude bit E in this entry is "1", and when the valid bit V in this entry is "1", the process is similar to the above described process (1b). Thus a data block is transferred from the entry to the central processing unit requiring the data block.

(Ac) When the accessing address A does not coincide with a real address of all entries of the GBS tag unit 41 in the own system (#1), and accordingly, the data transfer is to be effected from the main storage unit 3 to the latter central processing unit, and when there is an entry having a valid bit equal to "0", the global buffer storage unit 5 of the own system (#1) requires a data transfer from all of the main storage units 3 commonly used by the global buffer storage unit 5. Simultaneously, the global buffer storage unit 5 of the own system (#1) searches the GBS tag units 41 in the global buffer storage unit 5 of the opposite system (#2).

(Ac$_i$) When the accessing address A does not coincide with any real address in the GBS tag unit 41 of the opposite system (#2), the process is similar to the above described process (1c). Thus a data block is transferred from a main storage unit 3 through the global buffer storage unit 5 to the central processing unit requiring the data block.

(Ac$_{ii}$) When the accessing address A coincides with a real address in the GBS tag units 41 of the opposite system (#2), when the exclude bit E in the entry is "0", when the valid bit V in the entry is "1", and when all of the modify bits are "0", the process is similar to the above described process (1c). Thus a data block is transferred from a main storage unit 3 through the global buffer storage unit 5 to the central processing unit requiring the data block. During the process, when the data transfer speed from the global buffer storage unit 5 of the opposite system (#2) is higher than the data transfer speed from the main storage unit 3, preferably the data transfer request issued to the main storage units 3 is cancelled and a data block of 256 bytes as a whole is received from the global buffer storage unit 5 of the opposite system (#2).

(Ac$_{iii}$) When the accessing address A coincides with a real address in the GBS tag units 41 of the opposite system (#2), when the exclude bit E in the entry is "0", when the valid bit V in the entry is "1", and when at least one of the modify bits M in the entry is "1", this means that the data block corresponding to the modify bit of "1" in the entry of the global buffer storage unit 5 of the opposite system (#2) has been modified. Therefore, the data transfer request issued to the main storage units 3 is cancelled, and instead the global buffer storage unit 5 of the own system (#1) requires the global buffer storage unit 5 of the opposite system (#2) a data transfer to receive a data block of 256 bytes as a whole. The received data block is written into an empty entry in the GBS data managing unit 40. In the 256 byte data block written into the entry, the required data block of 64 bytes is transferred to the central processing unit which originated the request. The global buffer storage unit 5 of the opposite system (#2) sends the global buffer storage unit 5 of the own system (#1) information on the modify bit with regard to the transferred data block.

Two methods of sending the information on the modify bit are used.

According to one method, simultaneous with the data transfer from the opposite system (#2) to the global buffer storage unit 5 of the own system (#1), the data block corresponding to the modify bit of "1" is transferred to the main storage unit 3 and the modify bit is reset to "0". Then, all of the modify bits in the entry are sent as "0" to the global buffer storage unit 5 of the own system (#1).

According to the other method, the modify bits of "0" and "1" are sent as is to the global buffer storage unit 5 of the own system (#1) which originated the request.

(Ac$_{iv}$) When the accessing address A coincides with a real address in the GBS tag unit 41 of the opposite system (#2), and when the exclude bit E in the entry is "1", a central processing unit 1 reading the data block is determined with reference to the copy bits. Then, a forcible moving out instruction is given to the determined central processing unit, to move out the data block from the determined central processing unit to the global buffer storage unit 5 of the opposite system (#2). The data block forcibly moved out from the central processing unit to the global buffer storage unit 5 of the opposite system (#2) is transferred, in accordance with the above mentioned process (Ac$_{iii}$), to the global buffer storage unit 5 of the own system (#1) which originated the request. In the global buffer storage unit 5 of the opposite system (#2), the exclude bit of the entry to be transferred is reset to "0".

(Ad) When the accessing address A does not coincide with a real address of all entries of the GBS tag unit 41 of the own system (#1), and thus the data transfer is to be effected from the main storage unit 3 to the latter central processing unit, and when an entry, the contents of which are determined to be replaced by the data block transferred from the main storage unit 3, has a valid bit V="1" and an exclude bit E="0", this means that the global buffer storage unit 5 of the own system (#1) does not have the data block required by the central processing unit 1. In this case, in accordance with the above-described process (1d), an empty entry is prepared in the global buffer storage unit 5, and the above-described processes (Aci) to (Aciv) are then executed.

(Ae) When the accessing address A does not coincide with a real address of all entries of the GBS tag unit 41, and thus the data transfer is to be effected from the main storage unit 3 to the latter central processing unit, and when an entry, the contents of which are determined to be replaced by the data block transferred from the main storage unit 3, has a valid bit V="1" and an exclude bit E="1", an empty entry is first prepared in accordance with the above-described process (1e). Next, the above-described processes (Ac$_i$) to (Ac$_{iv}$) are then executed.

(B) A process when the central processing unit 1$_1$ requires a data transfer without an exclusive right (Ba) When the accessing address A coincides with a real address A in an entry of the GBS tag unit 41, when the exclude bit E in this entry is "0", and when the valid bit V in this entry is "1", a process similar to the process described in (2a) is executed. Thus a data block stored in the central processing unit of the own system (#1) is made invalid and the GBS tag unit 41 in the global buffer storage unit 5 of the opposite system (#2) is searched.

(Ba$_j$) When the accessing address A does not coincide with a real address in the GBS tag unit 41 of the opposite system (#2), the process is similar to the above described process (2a). Thus a data block is transferred from the global buffer storage unit 5 of the own system (#1) to the central processing unit requiring the data block.

(Ba$_{ii}$) When the accessing address A also coincides with a real address in the GBS tag unit 41 of the opposite system (#2), when the exclude bit E in the entry is "0", when the valid bit V in the entry is "1", and when all of the modify bits are "0", a central processing unit storing the data block is determined in accordance with the copy bits in the entry of the GBS tag unit 41 of the opposite system (#2). Then the data block in the determined central processing unit 1 is made invalid. Thereafter, similar to the above-described process (2a), a data block is transferred from the global buffer storage unit 5 of the own system (#1) to the central processing unit requesting the data block.

(Ba$_{iii}$) When the accessing address A coincides with a real address in the GBS tag unit 41 of the opposite system (#2), and when the exclude bit E in the entry is "1", the global buffer storage unit 5 of the own system (#1) is informed of an error, because this condition cannot be produced in a normal operation in the memory control system.

(Bb) When the accessing address A coincides with a real address in the GBS tag unit 41, and when the exclude bit E in the entry is "1", a process similar to the above-described process (2b) is carried out to transfer a data block from the global buffer storage unit 5 of the own system (#1) to the central processing unit 1 requesting the block data.

(Bc) When the accessing address A does not coincide with a real address in the GBS tag unit 41, and thus that the data transfer is to be effected from the main storage unit 3 to the latter central processing unit, and when there is an entry having a valid bit of "0", a data transfer request is issued to all of the commonly used main storage units 3 in the own system (#1), and the GBS tag unit 41 in the global buffer storage unit 5 of the opposite system (#2) is searched.

(Bc$_i$) When the accessing address A does not coincide with a real address in the GBS tag unit 41 of the opposite system (#2), the process is similar to the above described process (2c). Thus a data block is transferred from the main storage unit 3 through the global buffer storage unit 5 of the own system (#1) to the central processing unit requiring the data block.

(Bc$_{ii}$) When the accessing address A coincides with a real address in the GBS tag unit 41 of the opposite system (#2), when the exclude bit E in the entry is "0", when the valid bit V in the entry is "1", and when all of the modify bits are "0, a central processing unit storing the data block is determined in accordance with the copy bits in the entry of the GBS tag unit 41 of the opposite system (#2). Thereafter, the data block in the determined central processing unit 1 is made invalid, and the valid bit V in the entry is reset to "0". Then, similar to the above-described process (2c), a data block is transferred from the global buffer storage unit 5 of the opposite system (#2) to the central processing unit requesting the data block.

(Bc$_{iii}$) When the accessing address A coincides with a real address in an entry of the GBS tag unit 41 of the opposite system (#2), when the exclude bit E in the entry is 0" when the valid bit V in the entry is "i", and when at least one of the modify bits M in the entry is "1", the same process as the above-described process (Ac$_{iii}$) is carried out. Thus a data block is transferred to the central processing unit and the valid bit V in the entry in the opposite system (#2) is reset to "0".

(Bc$_{iv}$) When the accessing address A coincides with a real address in an entry of the GBS tag unit 41, and when the exclude bit in the entry is "1", the same process as the above-described process (Ac$_{iv}$) is carried out. Thus a data block is transferred to the central processing unit requesting the data block and the valid bit V in the entry in the opposite system (#2) is reset to "0".

(Bd) When the accessing address A does not coincide with a real address of all entries of the GBS tag unit 41 of the opposite system (#2), and thus the data transfer is to be effected from the main storage unit 3 to the latter central processing unit, and when an entry, the contents of which are determined to be replaced by the data block transferred from the main storage unit 3, has a valid bit V="1" and an exclude bit E="0", the same process as the above-described process (2d) is carried out. Thus, an empty entry is prepared in the global buffer storage unit 5 of the opposite system (#2), and then any one of the above-described processes (Bc$_i$ to Bc$_{iv}$) is executed.

(Be) When the accessing address A does not coincide with a real address of all entries of the GBS tag unit 41 of the opposite system (#2), and thus the data transfer is to be effected from the main storage unit 3 to the latter central processing unit, and when an entry, the contents of which are determined to be replaced by the data block transferred from the main storage unit 3, has a valid bit V="1" and an exclude bit E="0", the same process as the above-described process (2e) is carried out. Thus, an empty entry is prepared in the global buffer storage unit 5 of the opposite system (#2), and then any one of the above-described processes (Bc$_i$ to Bc$_{iv}$) is executed.

(Bf) When a central processing unit issues a request for a change of mode from a state in which the central processing unit is referring to a data block without an exclusive right to a state in which the central processing unit processes the data block with an exclusive right, the same process as the above-described process (3) is executed. Accordingly, the process without an exclusive right is carried out in the own system (#1) and the real address, which coincides with the accessing address, is searched for in the entries in the GBS tag unit 41 in the global buffer storage unit 5 of the opposite system (#2).

(Bf$_i$) When the accessing address does not coincide with a real address of the entries in the GBS tag unit 41 of the opposite system (#2), the process is ended.

(Bf$_{ii}$) When the accessing address coincides with a real address of an entry in the GBS tag unit 41 of the opposite system (#2), and when the exclude bit in the entry is "0", a central processing unit storing the data block is determined in accordance with the copy bits in the entry of the GBS tag unit 41 of the opposite system (#2). In addition, the data block in the determined central processing unit 1 is made invalid. Thereafter, the valid bit in the entry is reset to "0", and the process is then ended (Bf$_{iii}$) When the accessing address coincides with a real address of an entry in the GBS tag unit 41 of the opposite system (#2), and when the exclude bit in the entry is "1", the global buffer storage unit 5 of the own system (#1) is informed of an error, because this condition cannot be produced in a normal operation in the memory control system.

Thus, in the data processing system provided according to the present invention, the process for maintaining the coincidence of the main memory data in the whole system is efficiently carried out by using managing data in the GBS tag unit 41.

As described above, according to the present invention, in a data processing system having a tree-hierarchical memory structure comprising a large capacity global buffer storage unit between one or a plurality of central processing units each comprising a buffer storage unit and one or a plurality of main storage units commonly used by the central processing units, the control of the buffer storage can be efficiently carried out by a store-in method. Therefore, when a data processing system of a multi-processor type having a tree-hierarchical memory structure is used, the data processing can be efficiently carried out even when the number of the processors is increased. Further, according to the present invention, a TCMP-type data processing system with an extremely high performance and commonly used global buffer storage units can be provided.

Further, the present invention is not limited to these embodiments, but various variations and modifications may be made without departing from the scope of the present invention.

I claim:

1. A hierarchical memory control system comprising:

N central processing units each including a store-in type buffer storage unit having a plurality of buffer entries, each buffer entry having a data block and a block size and storing part of main memory data, where N is a first positive integer;

a main storage unit, storing main memory data commonly used by said N central processing units; and a store-in type global buffer storage unit coupled to said N central processing units and to said main storage unit, said N central processing units being able to commonly access said store-in type global buffer storage unit;

said store-in type global buffer storage unit comprising:

data managing means, operatively connected to said N central processing units and to said main storage unit, and having entries each for keeping a data block transferred from said main storage unit, each of said entries having an M times large block size in comparison with the block size of said buffer entries, the data block in each being divided into M divided blocks, where M is a second positive integer;

tag means, operatively connected to said data managing means, for managing the entries of said data managing means; and buffer control means, operatively connected to said tag means and to said data managing means, for controlling said store-in type global buffer storage unit;

said tag means comprising:

a valid bit indicating whether a corresponding entry of said data managing means is valid;

an exclude bit indicating whether the corresponding entry of said data managing means is accessed by one of said N central processing units with an exclusive right;

M modify bits respectively corresponding to said M divided blocks, each of said M modify bits indicating whether the divided data in the corresponding divided block has been modified after the divided data was transferred from said main storage unit;

copy bits, each corresponding to one of said M divided blocks and one of said N central processing units, for indicating whether the divided data in the corresponding divided block is copied to the buffer storage unit in the one of said N central processing units; and address bits indicating an address of the data block being transferred from said main storage unit;

said buffer control means controlling said tag means and said data managing means such that, when the data block stored in said buffer storage unit is modified, the modified data block is copied to said store-in type global buffer storage unit and when the data block stored in said store-in type global buffer storage is modified, the modified data block is copied to said main storage unit.

2. A hierarchical memory control system as claimed in claim 1, wherein:

said tag means comprising tags respectively corresponding to the entries of said data managing means, each of said tags including data for managing the data block;

said data managing means comprising a non-exclusive data block;

said corresponding dividing block storing a required data block; and if the one of said N central processing units generates an accessing address to access said non-exclusive data block in said data managing means without the exclusive right, if the accessing address coincides with said address in one of said tags forming a tag in said tag means, when the valid bit in said tag indicates that the corresponding entry of said data managing means is valid, and when the exclude bit in said tag indicates that the corresponding entry of the data managing means is used without the exclusive right, said buffer control means controls said data managing means and said tag means such that the required data block in said store-in type global buffer storage unit is transferred to the one of the N central processing units generating said accessing address, and one of the copy bits corresponding to the corresponding divided block storing said required data block and the one of the N central processing units generating said accessing address is changed to represent that the non-exclusive data block is being copied to the one of the N central processing units.

3. A hierarchical memory control system as claimed in claim 1, comprising:

data control means for controlling said data managing means and said tag means;

said corresponding divided block storing a required data block;

said tag means comprising tags respectively corresponding to the entries of said data managing means, each of said tags including data for managing the data block;

said data managing means comprising a non-exclusive data block; and when the one of said N central processing units generates an accessing address to access said non-exclusive data block in said data managing means without the exclusive right, when the accessing address coincides with said address bits in one of said tags forming a tag in said tag means, when the valid bit in said tag indicates that the corresponding entry of said data managing means is valid, when the exclude bit in said tag indicates that the corresponding entry of the data managing means is used by another of said N central processing units with the exclusive right forming an exclusive central processing unit, and when the exclusive central processing unit using the corresponding entry of the data managing means with an exclusive right is the same as the one of said N central processing units generating the accessing address, the data control means controls said data managing means and said tag means such that the required data block in said store-in type global buffer storage unit is transferred to the one of said N central processing units generating said accessing address, the exclude bit in the tag is set to indicate that the corresponding entry is used with the exclusive right, and one of the copy bits corresponding to the corresponding divided block storing said required data block and the one of the N central processing units generating said accessing address is changed to represent that the non-exclusive data block is being copied to the one of the N central processing units.

4. A hierarchical memory control system as claimed in claim 1, comprising:

data control means for controlling said data managing means and said tag means;

said tag means comprising tags respectively corresponding to the entries of said data managing means, each of said tags including data for managing the data block;

said data managing means comprising a non-exclusive data block; and when the one of said N central processing units generates an accessing address to access said non-exclusive data block in said data managing means without the exclusive right, when the accessing address coincides with said address bits in one of said tags forming a tag in said tag means, when the valid bit in said tag indicates that the corresponding entry of said data managing means is valid, when the exclude bit in said tag indicates that the corresponding entry of the data managing means is used by another of said N central processing units with the exclusive right forming an exclusive central processing unit having exclusive data, and when the exclusive central processing unit using the corresponding entry of the data managing means with the exclusive right is different from the one of said N central processing units generating the accessing address, the data control means controls said data managing means and said tag means such that the exclusive data in the exclusive central processing unit is forcibly moved out to the data block in the corresponding entry of said data managing means forming a forcibly moved out data block, the exclude bit is reset to indicate that the corresponding entry is used without the exclusive right, one of the copy bits corresponding to the exclusive central processing unit and to the forcibly moved out data block is reset to indicate that the exclusive central processing unit does not copy the data block in the data managing means, one of the M modify bits corresponding to the forcibly moved out data block is set to indicate that the exclusive data in the forcibly moved out data block has been modified forming a required data block having modified data, the required data block is transferred forming a transferred required block to the one of said N central processing units generating the accessing address, and another of the copy bits corresponding to the one of said N central processing units generating the accessing address and to the transferred required block is reset to indicate that the modified data in the required block is copied to the one of said N central processing units.

5. A hierarchical memory control system as claimed in claim 1, comprising:
    data control means for controlling said data managing means and said tag means;
    said valid bit for indicating that the corresponding entry is empty;
    said tag means comprising tags respectively corresponding to the entries of said data managing means, each of said tags including data for managing the data block;
    said data managing means comprising a non-exclusive data block including a required data block; and
    when the one of said N central processing units generates an accessing address to access said non-exclusive data block in said data managing means without the exclusive right, when the accessing address does not coincide with said address in all of said tags in said tag means, and when the valid bit in one of said tags forming a tag indicates that the corresponding entry of said data managing means is empty forming an empty entry, the data control means controls said data managing means and said tag means such that the non-exclusive data block including the required data block is transferred from said main storage unit to the empty entry in said data managing means, the required data block is transferred from the empty entry to the one of said N central processing units which is generating the accessing address, one of the copy bits corresponding to the non-exclusive data block in the empty entry and the one of said N central processing units which is generating the accessing address is set to indicate that the non-exclusive data block in the empty entry is copied to the one of said N central processing units generating the accessing address, the valid bit in the tag corresponding to the empty entry is set to indicate that the empty entry is valid, the exclude bit in the tag corresponding to the empty entry is reset to indicate that the empty entry is used without the exclusive right, and the address of said non-exclusive data block is written in the tag corresponding to the empty entry.

6. A hierarchical memory control system as claimed in claim 1, comprising:
    data control means for controlling said data managing means and said tag means;
    said data managing means comprising a non-exclusive data block, a replacing entry having contents, replacing data, replacing copy bits, a replacing block, a replacing data block, second replacing data, a second replacing block having second contents and a second replacing data block;
    said tag means comprising tags respectively corresponding to the entries of said data managing means, each of said tags including data for managing the data block;
    said main storage unit storing a storage data block, and transferring a transfer data block having a required data block; and
    when the one of said N central processing units generates an accessing address to access the non-exclusive data block in said data managing means without the exclusive right, when the accessing address does not coincide with said address in all of said tags in said tags means, when the replacing entry is determined so that the contents in said replacing entry are to be replaced by the storage data block transferred from said main storage unit, when the valid bit in one of said tags forming a tag corresponding to said replacing entry indicates that the replacing entry of said data managing means is valid, and when the exclude bit in the tag indicates that the replacing entry is used without the exclusive right, the data control means controls said data managing means and said tag means such that, referring to the replacing copy bits in the replacing entry, another of said N central processing units which is reading the replacing data in the replacing entry is determined forming a determined central processing unit and the replacing block in the replacing entry from which the replacing data block is read to the determined central processing unit is determined forming a determined block having determined data, one of said copy bits corresponding to the determined central processing unit and to the determined block is reset to indicate that the determined data in the determined central processing unit is made invalid, the second replacing block in the replacing entry corresponding to one of the M modify bits which indicates that the second replacing data in the second replacing block has been modified is determined forming a second determined block having data, the data in the second determined block is transferred to the main storage unit, the one of the M modify bits corresponding to the second replacing block from which the data has been transferred to the main storage unit is reset to indicate that the second contents in the second replacing block are not modified, the transfer data block including the required data block is transferred from said main storage unit to the replacing entry in said data managing means, the required data block is transferred from the replacing entry to the one of said N central processing units which is generating the accessing address, another of the copy bits corresponding to the second replacing block in the replacing entry and the one of said N central processing units which is generating the accessing address is set to indicate that the second replacing data block in the second replacing block in the replacing entry is copied to the one of said N central processing units which is generating the accessing address, and the address of said second replacing data block is written in the tag corresponding to the replacing entry.

7. A hierarchical memory control system as claimed in claim 1, comprising:
    data control means for controlling said data managing means and said tag means;
    said data managing means comprising a non-exclusive data block, a replacing entry having contents, replacing data, replacing copy bits, a replacing block, a replacing data block, second replacing data, a second replacing block having second contents and a second replacing data block;
    said tag means comprising tags respectively corresponding to the entries of said data managing means, each of said tags including data for managing the data block;

said main storage unit storing a storage data block, and transferring a transfer data block having a required data block; and when the one of said N central processing units generates an accessing address to access the non-exclusive data block in said data managing means without the exclusive right, when the accessing address does not coincide with the address in all of said tags in said tag means, when the replacing entry is determined so that the contents in said replacing entry are to be replaced by the storage data block transferred from said main storage unit, when the valid bit in one of said tags forming a tag corresponding to said replacing entry indicates that the replacing entry of said data managing means is valid, and when the exclude bit in the tag indicates that the replacing entry is used with the exclusive right, the data control means controls said data managing means and said tag means such that, referring to the replacing copy bits in the replacing entry, another of said N central units which is reading the replacing data in the replacing entry is determined forming a determined central processing unit for storing copy data, and the replacing block in the replacing entry from which the replacing data block is read to the determined central processing unit is determined forming a determined block having determined data, the determined data in the determined central processing unit is forcibly moved out to the main storage unit, one of the copy bits corresponding to the determined central processing unit and to the determined block is reset to indicate that there is no said copy data in the determined central processing unit, the second replacing block in the replacing entry corresponding to one of the M modify bits which indicates that the second replacing data in the second replacing block has been modified is determined forming a second determined block having data, the data in the second determined block is transferred to the main storage unit, the one of the M modify bits corresponding to the second replacing block from which the data has been transferred to the main storage unit is reset to indicate that the second contents in the second replacing block are not modified, the transfer data block including the required data block is transferred from said main storage unit to the replacing entry in said data managing means, the required data block is transferred from the replacing entry to the one of said N central processing units which is generating the accessing address, another of the copy bits corresponding to the second replacing block in the replacing entry and the one of said N central processing units which is generating the accessing address is set to indicate that the second replacing data block in the second replacing block in the replacing entry is copied to the one of said N central processing units generating the accessing address, the address of said second replacing data block is written in the tag corresponding to the replacing entry, and the exclude bit of the tag corresponding to the replacing entry is reset to indicate that the replacing entry is used without the exclusive right.

8. A hierarchical memory control system as claimed in claim 1, wherein said data managing means comprising an exclusive data block;

said corresponding divided block storing a required data block;

said tag means comprising tags respectively corresponding to the entries of said data managing means, each of said tags including data for managing the data block;

said corresponding entry comprising a corresponding data block and data; and when the one of said N central processing units generates an accessing address to access the exclusive data block in said data managing means with the exclusive right, when the accessing address coincides with said address bits in one of said tags forming a tag in said tag means, when the valid bit in said tag indicates that the corresponding entry of said data managing means is valid, and when the exclude bit in said tag indicates that the corresponding entry of the data managing means is used without the exclusive right, said buffer control means controls said data managing means and said tag means such that, referring to the copy bits in the tag corresponding to the corresponding entry, another of said N central processing units which stores a copy of the data in the corresponding entry forming copy data is determined forming a determined central processing unit, the corresponding block from which the data is copied to the determined central processing unit is determined forming a determined block, the copy data in the determined central processing unit is made invalid by resetting one of the copy bits corresponding to the determined central processing unit and to the determined block, the required data block in said global buffer storage unit is transferred to the one of said N central processing units which is generating said accessing address, the one of the copy bits corresponding to the corresponding divided block storing said required data block and the one of said N central processing units generating said accessing address is set to indicate that the exclusive data block is being copied to the one of said N central processing units which is generating the accessing address, and the exclude bit in the tag corresponding to the corresponding entry is set to indicate that the corresponding entry is used with the exclusive right.

9. A hierarchical memory control system as claimed in claim 1, comprising:

data control means for controlling said data managing means and said tag means;

said data managing means comprising an exclusive data block;

said tag means comprising tags respectively corresponding to the entries of said data managing means, each of said tags including data for managing the data block;

said corresponding divided block storing a required data block; and when the one of said N central processing units generates an accessing address to access the exclusive data block in said data managing means with the exclusive right, when the accessing address coincides with said address bits in one of said tags forming a tag in said tag means, when the valid bit in said tag indicates that the corresponding entry of said data managing means is valid, when the exclude bit in said tag indicates that the corresponding entry of the data managing means is used by another of said N central processing units with the exclusive right, and when the another of said N central processing units using the corresponding entry of the data managing means with the exclusive right is the same as the one of said N central processing units generating the accessing address, the data control means controls said data managing means and said tag means such that the required data block in said global buffer storage unit is transferred to the one of said N central processing units generating said accessing address, one of the copy bits corresponding to the corresponding divided block storing said required data block and the one of said N central processing units generating said accessing address is changed to represent that the exclusive data block is being copied to the one of said N central processing units, and the exclude bit in the tag corresponding to the corresponding entry is set to indicate that the corresponding entry is used with the exclusive right.

10. A hierarchical memory control system as claimed in claim 1, comprising:

data control means for controlling said data managing means and said tag means, said tag means comprising tags respectively corresponding to the entries of said data managing means, each of said tags including data for managing the data block;

said data managing means comprising an exclusive data block; and when the one of said N central processing units generates an accessing address to access the exclusive data block in said data managing means with the exclusive right, when the accessing address coincides with said address bits in one of said tags forming a tag in said tag means, when the valid bit in said tag indicates that the corresponding entry of said data managing means is valid, when the exclude bit in said tag indicates that the corresponding entry of the data managing means is used by another of said N central processing units with an exclusive right forming an exclusive central processing unit having exclusive data, and when the exclusive central processing unit using the corresponding entry of the data managing means with the exclusive right is different from the one of said N central processing units generating the accessing address, the data control means controls said data managing means and said tag means such that the exclusive data in the exclusive central processing unit is forcibly moved out to the data block in the corresponding entry of said data managing means forming a forcibly moved out data block, the exclude bit is set to indicate that the corresponding entry is used with the exclusive right, one of the copy bits corresponding to the exclusive central processing unit and to the forcibly moved out data block is reset to indicate that the exclusive central processing unit does not copy the data block in the data managing means, one of the M modify bits corresponding to the forcibly moved out data block is set to indicate that the exclusive data in the forcibly moved out data block has been modified forming a required data block having modified data, the required data block is transferred forming a transferred required data block to the one of said N central processing units generating the accessing address, and another of the copy bits corresponding to the one of said N central processing units generating the accessing address and to the transferred required block is reset to indicate that the modified data in the required block is copied to the one of said N central processing units.

11. A hierarchical memory control system as claimed in claim 1, comprising:

data control means for controlling said data managing means and said tag means;

said valid bit for indicating that the corresponding entry is empty;

said tag means comprising tags respectively corresponding to the entries of said data managing means, each of said tags including data for managing the data block;

said data managing means comprising an exclusive data block including a required data block; and when the one of said N central processing units generates an accessing address to access the exclusive data block in said data managing means with the exclusive right, when the accessing address does not coincide with the address in all of said tags in said tags means, and when the valid bit in one of said tags forming a tag indicates that the corresponding entry of said data managing means is empty forming an empty entry, the data control means controls said data managing means and said tags means such that the exclusive data block including the required data block is transferred from said main storage unit to the empty entry in said data managing means, the required data block is transferred from the empty entry to the one of said N central processing units which is generating the accessing address, one of the copy bits corresponding to the non-exclusive data block in the empty entry and the one of said N central processing units which is generating the accessing address, the valid bit in the tag corresponding to the empty entry is set to indicate that the empty entry is valid, the exclude bit in the tag corresponding to the empty entry is set to indicate that the empty entry is used with the exclusive right, and the address of said empty data block is written in the tag corresponding to the empty entry.

12. A hierarchical memory control system as claimed in claim 1, comprising:

data control means for controlling said data managing means and said tag means;

said data managing means comprising an exclusive data block, a replacing entry having contents, replacing data, replacing copy bits, a replacing block, a replacing data block, second replacing data, a second replacing block having second contents, and a second replacing data block;

said tag means comprising tags respectively corresponding to the entries of said data managing means, each of said tags including data for managing the data block;

the main storage unit storing a storage data block, and transferring a transfer data block to the replacing entry having a required data block; and when the one of said N central processing units generates an accessing address to access the exclusive data block in said data managing means with the exclusive right, when the accessing address does not coincide with said address in all of said tags in said tag means, when the replacing entry is determined so that the contents in said replacing entry are to be replaced by the storage data block transferred from said main storage unit, when the valid bit in one of said tags forming a tag corresponding to said replacing entry indicates that the replacing entry of said data managing means is valid, and when the exclude bit in the tag indicates that the replacing entry is used without the exclusive right, the data control means controls said data managing means and said tag means such that, referring to the replacing copy bits in the replacing entry, another of said N central processing units which is reading the replacing data in the replacing entry is determined forming a determined central processing unit and the replacing block in the replacing entry from which the replacing data block is read to the determined central processing unit is determined forming a determined block having determined data, one of said copy bits corresponding to the determined central processing unit and to the determined block is reset to indicate that the determined data in the determined central processing unit is made invalid, the second replacing block in the replacing entry corresponding to one of the M modify bits which indicates that the second replacing data in the second replacing block has been modified is determined forming a second determined block having data, the data in the second determined block is transferred to the main storage unit, the one of the M modify bits corresponding to the second replacing block from which the data has been transferred to the main storage unit is reset to indicate that the second contents in the second replacing block are not modified, the transfer data block including the required data block is transferred from said main storage unit to the replacing entry in said data managing means, the required data block is transferred from the replacing entry to the one of said N central processing units which is generating the accessing address, another of the copy bits corresponding to the second replacing block in the replacing entry and the one of said N central processing units which is generating the accessing address is set to indicate that the second replacing data block in the second replacing block in the replacing entry is copied to the one of said N central processing units which is generating the accessing address, the exclude bit in the tag corresponding to the replacing entry is set to indicate that the replacing entry is used with the exclusive right, and the address of said second replacing data block is written in the tag corresponding to the replacing entry.

13. A hierarchical memory control system as claimed in claim 1, comprising:
data control means for controlling said data managing means and said tag means;
said data managing means comprising an exclusive data block, or replacing entry having contents, replacing data, replacing copy bits, a replacing block, a replacing data block, second replacing data, a second replacing block having second contents, and a second replacing data block;
said tag means comprising tags respectively corresponding to the entries of said data managing means, each of said tags including data for managing the data block;

the main storage unit storing a storage data block, and transferring a transfer data block having a required data block to the replacing entry; and when the one of said N central processing units generates an accessing address to access the exclusive data block in said data managing means with the exclusive right, when the accessing address does not coincide with the address in all of said tags in said tag means, when the replacing entry is determined so that the contents in said replacing entry are to be replaced by the storage data block transferred from said main storage unit, when the valid bit in one of said tags forming a tag corresponding to said replacing entry indicates that the replacing entry of said data managing means is valid, and when the exclude bit in the tag indicates that the replacing entry is used with the exclusive right, the data control means controls said data managing means and said tag means such that, referring to the replacing copy bits in the replacing entry, another of said N central processing units which is reading the replacing data in the replacing entry is determined forming a determined central processing unit storing copy data, and the replacing block in the replacing entry from which the replacing data block is read to the determined central processing unit is determined forming a determined block having determined data, the determined data in the determined central processing unit is forcibly moved out to the main storage unit, one of the copy bits corresponding to the determined central processing unit and to the determined block is reset to indicate that there is no said copy data in the determined central processing unit, the second replacing block in the replacing entry corresponding to one of the M modify bits which indicates that the second replacing data in the second replacing block has been modified is determined forming a second determined block having data, the data in the second determined block is transferred to the main storage unit, the one of the M modify bits corresponding to the second replacing block from which the data has been transferred to the main storage unit is reset to indicate that the second contents in the second replacing block are not modified, the transfer data block including the required data block is transferred from said main storage unit to the replacing entry in said data managing means, the required data block is transferred from the replacing entry to the one of said N central processing units which is generating the accessing address, another of the copy bits corresponding to the second replacing block in the replacing entry and the one of said N central processing units which is generating the accessing address is set to indicate that the second replacing data block in the second replacing block in the replacing entry is copied to the one of said N central processing units generating the accessing address, the address of said second replacing data block is written in the tag corresponding to the replacing entry, and the exclude bit of the tag corresponding to the replacing entry is set to indicate that the replacing entry is used with the exclusive right.

14. A hierarchial memory control system as claimed in claim 1, comprising:
data control means for controlling said data managing means and said tag means;

said tag means comprising tags respectively corresponding to the entries of said data managing means, each of said tags including data for managing the data block;

said data managing means comprising a non-exclusive data block; and while at least one of the N central processing units are referring the non-exclusive managing data block without the exclusive right, when one of the at least one of the N central processing units requires to process the non-exclusive managing data block in the buffer storage unit with the exclusive right forming a requesting central processing unit, the data control means controls said data managing means and said tag means such that, referring to the copy bits in one of the tags forming a tag corresponding to the corresponding entry which stores said non-exclusive managing data block, one of said copy bits corresponding to another of the N central processing units other than the requesting central processing unit requesting the exclusive right are reset to indicate that the non-exclusive data block read in the another of said N central processing units other than the requesting central processing unit which is requesting the exclusive right are made invalid, and then the exclude bit in said tag is set to indicate that said non-exclusive data block is read with the exclusive right by the requesting central processing unit requesting the exclusive right.

15. A hierarchical memory control system as claimed in claim 1, comprising:

data control means for controlling said data managing means and said tag means;

said store-in type buffer storage unit storing a transfer data block;

said copy bits comprising a corresponding copy bit;

said tag means comprising tags respectively corresponding to the entries of said data managing means, each of said tags including data for managing the data block;

said store-in type global buffer storage unit comprising a global entry; and when another of the N central processing units issues a request to move out the transfer data block from the buffer storage unit to the store-in type global buffer storage unit, when the exclude bit in one of the tags corresponding to said transfer data block is set to indicate that the transfer data block is accessed by the another of by the N central processing units with the exclusive right, and when the transfer data block to be moved out has been modified by the another of the N central processing units, the data control means controls said data managing means and said tag means such that, after moving out the transfer data block from said buffer storage unit to the store-in type global buffer storage unit, the corresponding copy bit is reset to indicate that the another of the N central processing units does not have a copy of said transfer data block, and one of the M modify bits corresponding to the transfer data block is set to indicate that said transfer data block moved into the global entry of the store-in type global buffer storage unit has been modified.

16. A hierarchical memory control system as claimed in claim 1, comprising:

data control means for controlling said data managing means and said tag means;

said store-in type buffer storage unit storing a transfer data block;

said tag means comprising tags respectively corresponding to the entries of said data managing means, each of said tags including data for managing the data block;

said copy bits comprising a corresponding copy bit; and when another of the N central processing units issues a request to move out the transfer data block from the buffer storage unit to the global buffer storage unit, when the exclude bit in one of the tags corresponding to said transfer data block is set to indicate that the transfer data block is accessed by the another of the N central processing units with the exclusive right, and when the transfer data block to be moved out has not been modified by the another of the N central processing units, the data control means controls said data managing means and said tag means such that, after moving out the transfer data block from said buffer storage unit to the global buffer storage unit, the corresponding copy bit is reset to indicate that the another of the N central processing units does not have a copy of said transfer data block, and one of the M modify bits corresponding to said transfer data block is not changed.

17. A hierarchical memory control system as claimed in claim 1, wherein:

said tag means comprising tags respectively corresponding to the entries of said data managing means, each of said tags including data for managing the data block; and said copy bits in each of said tags comprise $M \times N$ copy bits, each of said copy bits corresponding to one of the M divided blocks and the one of the N central processing units.

18. A hierarchical memory control system as claimed in claim 1, wherein:

said tag means comprising tags respectively corresponding to the entries of said data managing means, each of said tags including data for managing the data block; and said copy bits in each of said tags comprises M block bits each corresponding to one of the M divided blocks and N CPU bits each corresponding to the one of the N central processing units, so that, when one of the M block bits corresponding to the one of the M divided blocks indicates is being copied and when one of the N CPU bits indicates that the one of the N central processing units is copying data, the block is considered copied to said one of the N central processing units.

19. A hierarchical memory control system as claimed in claim 1, wherein:

said tag means comprising tags respectively corresponding to the entries of said data managing means, each of said tags including data for managing the data block; and each of said tags includes a single exclude bit for indicating whether one of the entries corresponding to one of the tags is used by another of the N central processing units with the exclusive right.

20. A hierarchical memory control system as claimed in claim 1, wherein:

said managing entries store a corresponding block; and said tag means comprise tags respectively corresponding to the entries of said data managing means, each of said tags including data for managing the data block, and each of said tags includes M exclude bits each for indicating whether the corresponding block in one of the managing entries corresponding to one of the tags is used by another of the N central processing units with the exclusive right.

21. A hierarchical memory control system comprising first and second data processing systems, each of the first and second data processing systems comprising:

N central processing units each including a store-in type buffer storage unit having a plurality of buffer entries, each buffer entry having a data block and a block size and storing part of main memory data, where N is a first positive integer;

a main storage unit, storing main memory data commonly used by said N central processing units; and a global buffer storage unit of a store-in type coupled to said N central processing units and to said main storage unit, said N central processing units being able to commonly access said global buffer storage unit;

said global buffer storage unit comprising:

data managing means, operatively connected to said N central processing units and to said main storage unit, and having entries each for a data block transferred from said main storage unit, each of said entries having entries each for keeping a data block transferred from said main storage unit, each of said entries having an M times large block size in comparison with the block size of said buffer entries, the data block in each being divided into M divided blocks, where M is a second positive integer;

tag means, operatively connected to said data managing means, for managing the entries of said data managing means, and buffer control means, operatively connected to said tag means and to said data managing means, for controlling said global buffer storage unit;

said tag means comprising:

a valid bit indicating whether a corresponding entry of said data managing means is valid;

an exclude bit indicating whether the corresponding entry of said data managing means is accessed by one of said N central processing units with an exclusive right;

M modify bits respectively corresponding to said M divided blocks, each of said M modify bits indicating whether the divided data in the corresponding divided block has been modified after the divided data was transferred from said main storage unit;

copy bits each corresponding to one of said M divided blocks and one of said N central processing units, for indicating whether the divided data in the corresponding divided block is copied to the buffer storage unit in the one of said N central processing units; and address bits indicating an address of data block being transferred from said main storage unit, said data block being transferred;

said buffer control means for controlling said tag means and said managing means such that, when the data block stored in said buffer storage unit is modified, the modified data block is copied to said global buffer storage unit, and when the data block stored in said global buffer storage means is modified, the modified data is copied to said main storage unit;

wherein:

the global buffer storage unit commonly uses the main storage unit by referring to the tag means of the global buffer storage unit of the second data processing system;

when one of the N central processing units of the first data processing system generates a data block transfer request to the global storage unit, the buffer control means in the second data processing system searches for the requested data block in the data managing means by referring to the tag means, and when it is determined that the requested data block is not stored in the data managing means, the buffer control means in the first data processing system generates a data block transfer request to the main storage unit, and in addition, generates a search request to search for the requested data block in the data managing means of the second data processing system by referring to the managing data in the tag means of the second data processing system, as a result of the search, when the requested data block is stored in the data managing means of the second data processing system, the data block transfer request issued to the main storage unit of the first data processing system is cancelled, and a transfer request to transfer one of the entries including the requested data block is issued to the global buffer storage unit of the second data processing system, the global buffer storage unit of the second data processing system which receives the transfer request transfers using a transfer process the one of the entries including the requested data block to the global buffer storage unit of the first data processing system, and, in the transfer process, when the exclude bit in one of the tags corresponding to the one of the entries indicates that the one of the entries corresponds to the exclusive right, the buffer storage unit of central processing is moved out to the global buffer storage unit of the second data processing system, and the one of the entries transferred to the global buffer storage unit of the first data processing system.

22. A hierarchical memory control system as claimed in claim 21, wherein:

said tag means comprising tags respectively corresponding to the entries of said data managing means, each of said tags including data for managing the data block; and the global buffer storage unit of the second data processing system includes a coy of the data in the tag means in the global buffer storage unit of the first data processing system, and, by referring to the copy, the global buffer storage unit of the second data processing system determines whether the data block requested by one of the N central processing units of the second data processing system is stored in the global buffer storage unit of the first data processing system.

23. A hierarchical memory control system as claimed in claim 21, wherein said M divided blocks of the first data processing system comprises a transferred block; and when another of the M modify bits corresponding to the transferred block indicates that the transferred block has been modified, the transferred block is transferred to the main storage unit of the second data processing unit, the another of said M modify bits is reset to indicate that the transferred block is not modified, and the entry is transferred to the global buffer storage unit of the second data processing system.

24. A hierarchical memory control system as claimed in claim 21, wherein the global buffer storage unit of the second data processing system originating the data block transfer request registers the M modify bits in the entry to be transferred in the tag means of the second data processing system.

25. A hierarchical memory control system comprising:

N central processing units each including a store-in type buffer storage unit, where N is a first positive integer;

a main storage unit connected to said N central processing units, storing main memory data commonly used by said N central processing units; and a store-in type global buffer storage unit connected between said N central processing units and said main storage unit, said store-in type global buffer storage unit having entries each for storing a data block transferred from said main storage unit, the data block in each of the entries of said store-in type global buffer storage unit being divided into M divided blocks, where M is a second positive integer;

said store-in type global buffer storage unit comprising:

tag means for managing the entries of said global buffer storage unit, said tag means including tags respectively corresponding to the entries of said store-in type global buffer storage unit, buffer control means, operatively connected to said tag means, for controlling said global buffer storage;

said tag means comprising:

exclude indication means indicating whether the corresponding entry of said store-in type global buffer storage unit is accessed by one of said N central processing units with an exclusive right;

a plurality of modify indication means respectively corresponding to each of said M divided blocks, each of said plurality of modify indication means for indicating whether the divided data in the corresponding divided block has been modified after the divided data in the corresponding divided block was transferred from said main storage unit;

copy indication means, each corresponding to each of said M divided blocks and each of said N central processing units, for indicating whether the copy of the divided data in the corresponding divided block is transferred to the buffer storage unit in each of said N central processing units; and address data indication means indicating an address in said main storage unit, said data block being transferred from said address of the main storage unit to one of the entries of said store-in type global buffer storage unit;

said buffer control means controlling said tag means such that, when the data block stored in said buffer storage unit is modified, the modified data block is copied to said global buffer storage unit, and when the data block stored in said store-in type global buffer storage unit is modified, the modified data block is copied to said main storage unit in accordance with said managing data in said tag means.

26. A hierarchical memory control system as claimed in claim 25, wherein each of said copy indication means corresponds to one of said M divided blocks and one of said N central processing units.

27. A hierarchical memory control system as claimed in claim 26, wherein each of said data in each of said tags further comprising valid indication means for indicating whether the entries of said store-in type global buffer storage unit are valid.

28. A hierarchical memory control system as claimed in claim 27, wherein said divided block storing a required data block;

said store-in type global buffer storage unit storing a non-exclusive data block; and when the one of said N central processing units generates an accessing address to access the non-exclusive data block in said store-in type global buffer storage unit without the exclusive right, when the accessing address coincides with said address indication means in one of said tags forming a tag in said tag means, when the valid indication means in said tag indicates that the corresponding entry of said store-in type global buffer storage unit is valid, and when the exclude indication means in said tag indicates that the corresponding entry of the store-in type global buffer storage unit is used without the exclusive right, said buffer control means controls said store-in type global buffer storage unit and said tag means such that the required data block in said store-in type global buffer storage unit is transferred to the one of said N central processing units generating said accessing address, and the copy indication means corresponding to the divided block storing said required data block and the one of said N central processing units generating said accessing address is changed to represent that the non-exclusive data block is being copied to the one of said N central processing units.

29. A hierarchical memory control system as claimed in claim 27, comprising:

data control means for controlling said store-in type global buffer storage unit and said tag means;

said divided block storing a required data block;

said-store-in type global buffer storage unit storing a nonexclusive data block; and when the one of said N central processing units generates an accessing address to access the non-exclusive data block in said store-in type global buffer storage unit without the exclusive right, when the accessing address coincides with said address indication means in one of said tags forming a tag in said tag means, when the valid indication means in said tag indicates that the corresponding entry of said store-in type global buffer storage unit is valid, when the exclude indication means in said tag indicates that the corresponding entry of the store-in type global buffer storage unit is used by another of said N central processing units with the exclusive right forming an exclusive central processing unit, and when the exclusive central processing unit using the corresponding entry of the store-in type global buffer storage unit with the exclusive right is the same as the one of said N central processing units generating the accessing address, the data control means controls said store-in type global buffer storage unit and said tag means such that the required data block in said global buffer storage unit is transferred to the one of said N central processing units generating said accessing address, the exclude indication means in the tag is set to indicate that the corresponding entry is used with the exclusive right, and the copy indication means corresponding to the divided block storing said required data block and the one of said N central processing units generating said accessing address is changed to represent that the nonexclusive data block is being copied to the one of said N central processing units.

30. A hierarchical memory control system as claimed in claim 27, comprising:

data control means for controlling said store-in type global buffer storage unit and said tag means;

said store-in type global buffer storage unit storing a nonexclusive data block; and when the one of said N central processing units generates an accessing address to access said nonexclusive data block in store-in type said global buffer storage unit within the exclusive right, when the accessing address coincides with said address indication means in one of said tags forming a tag in said tag means, when the valid indication means in said tag indicates that the corresponding entry of said store-in type global buffer storage unit is valid, when the exclude indication means in said tag indicates that the corresponding entry of the store-in type global buffer storage unit is used by another of said N central processing units with the exclusive right forming an exclusive central processing unit having exclusive data, and when the exclusive central processing unit using the corresponding entry of the store-in type global buffer storage unit with the exclusive right is different from the one of said N central processing units generating the accessing address, the data control means controls said store-in type global buffer storage unit and said tag means such that the exclusive data in the exclusive central processing unit is forcibly moved out to the data block in the corresponding entry of said store-in type global buffer storage unit forming a forcibly moved out data block, the exclude indication means is reset to indicate that the corresponding entry is used without the exclusive right, one of the copy indication means corresponding to the exclusive central processing unit and to the forcibly moved out data block is reset to indicate that the exclusive central processing unit does not copy the data block in the store-in type global buffer storage unit, one of the modify indication means corresponding to the forcibly moved out data block is set to indicate that the exclusive data in the forcibly moved out data block has been modified forming a required data block having modified data, the required data block is transferred forming a transferred required block to the one of said N central processing units generating the accessing address, and another of the copy indication means corresponding to the one of said N central processing units generating the accessing address and to the transferred required block is reset to indicate that the modified data in the required block is copied to the one of said N central processing units.

31. A hierarchical memory control system as claimed in claim 27, comprising:

data control means for controlling said store-in type global buffer storage unit and said tag means;

said valid indication means for indicating that the corresponding entry is empty;

said store-in type global buffer storage unit storing a nonexclusive data block including a required data block; and when one of said N central processing units generates an accessing address to access the nonexclusive data block in said store-in type global buffer storage unit without the exclusive right, when the accessing address does not coincide with the address in all of said tags in said tag means, and when the valid indication means in one of the tags forming a tag indicates that the corresponding entry of said store-in type global buffer storage unit is empty forming an empty entry, the data control means controls said store-in type global buffer storage unit and said tag means such that the nonexclusive data block including the required data block is transferred from said main storage unit to the empty entry in said store-in type global buffer storage unit, the required data block is transferred from the empty entry to the one of said N central processing units which is generating the accessing address, one of the copy indication means corresponding to the nonexclusive data block in the empty entry and the one of said N central processing units which is generating the accessing address is set to indicate that the nonexclusive data block in the empty entry is copied to the one of said N central processing units generating the accessing address, the valid indication means in the tag corresponding to the empty entry is set to indicate that the empty entry is valid, the exclude indication means in the tag corresponding to the empty entry is reset to indicate that the empty entry is used without the exclusive right, and the address of said nonexclusive data block is written in the tag corresponding to the empty entry.

32. A hierarchical memory control system as claimed in claim 27, comprising:

data control means for controlling said store-in type global buffer storage unit and said tag means;

said store-in type global buffer storage unit storing a nonexclusive data block, a replacing entry having replacing copy indication means, first contents, first replacing data, a first replacing block, a first replacing data block, second replacing data, and a second replacing block having second contents and a second replacing data block;

said main storage unit storing a storage data block, and transferring a transfer data block having a required data block; and when the one of said N central processing units generates an accessing address to access the nonexclusive data block in said global buffer storage unit without the exclusive right, when the accessing address does not coincide with the address in all of said tags in said tag means, when the replacing entry is determined so that the first contents in said replacing entry are to be replaced by the storage data block transferred from said main storage unit, when the valid indication means in one of the tags forming a tag corresponding to said replacing entry indicates that the replacing entry of said store-in type global buffer storage unit is valid, and when the exclude indication means in the tag indicates that the replacing entry is used without the exclusive right, the data control means controls said store-in type global buffer storage unit and said tag means such that, referring to the replacing copy indication means in the replacing entry, another of said N central processing units which is reading the first replacing data in the replacing entry is determined forming a determined central processing unit and the first replacing block in the replacing entry from which the first replacing data block is read to the determined central processing unit is determined forming a determined block having determined data, one of the copy indication means corresponding to the determined central processing unit and to the determined block is reset to indicate that the determined data in the determined central processing unit is made invalid, the second replacing block in the replacing entry corresponding to one of the plurality of modify indication means which indicates that the second replacing data in the second replacing block has been modified is determined forming a second determined block having data, the data in the second determined block is transferred to the main storage unit, the one of the plurality of modify indication means corresponding to the second replacing block from which the data has been transferred to the main storage unit is reset to indicate that the second contents in the second replacing block are not modified, the transfer data block including the required data block is transferred from said main storage unit to the replacing entry in said store-in type global buffer storage unit, the required data block is transferred from the replacing entry to the one of said N central processing units which is generating the accessing address, the replacing copy indication means corresponding to the first replacing block in the replacing entry and the one of said N central processing units which is generating the accessing address is set to indicate that the first replacing data block in the first replacing block in the replacing entry is copied to the one of said N central processing units which is generating the accessing address, and the address of said second replacing data block is written in the tag corresponding to the replacing entry.

33. A hierarchical memory control system as claimed in claim 27, comprising:
data control means for controlling said store-in type global buffer storage unit and said tag means;
said store-in type global buffer storage unit storing a nonexclusive data block, a replacing entry having replacing copy indication means, first contents, first replacing data, a first replacing block, a first replacing data block, second replacing data, and a second replacing block having second contents and a second replacing data block;
said main storage unit storing a storage data block, and transferring a transfer data block having a required data block; and
when the one of said N central processing units generates an accessing address to access the nonexclusive data block in said store-in type global buffer storage unit without the exclusive right, when the accessing address does not coincide with the address in all of said tags in said tag means, when the replacing entry is determined so that the first contents in said replacing entry are to be replaced by the storage data block transferred from said main storage unit, when the valid indication means in one of the tags forming a tag corresponding to said replacing entry indicates that the replacing entry of said store-in type global buffer storage unit is valid, and when the exclude indication means in the tag indicates that the replacing entry is used with the exclusive right, the data control means controls said store-in type global buffer storage unit and said tag means such that, referring to the replacing copy indication means in the replacing entry, another of said N central processing units which is reading the first replacing data in the replacing entry is determined forming a determined central processing unit having copy data and the first replacing block in the replacing entry from which the first replacing data block is read to the determined central processing unit is determined forming a determined block having determined data, the determined data in the determined central processing unit is forcibly moved out to the main storage unit, one of the copy indication means corresponding to the determined central processing unit and to the determined block is reset to indicate that there is no said copy data in the determined central processing unit, the second replacing block in the replacing entry corresponding to one of the plurality of modify indication means which indicates that the second replacing data in the second replacing block has been modified is determined forming a second determined block having data, the data in the second determined block is transferred to the main storage unit, the one of the plurality of modify indication means corresponding to the second replacing block from which the data has been transferred to the main storage unit is reset to indicate that the second contents in the second replacing block are not modified, the transfer data block including the required data block is transferred from said main storage unit to the replacing entry in said store-in type global buffer storage unit, the required data block is transferred from the replacing entry to the one of said N central processing units which is generating the accessing address, of the replacing copy indication means corresponding to the first replacing block in the replacing entry and the one of said N central processing units which is generating the accessing address is set to indicate that the first replacing data block in the first replacing block in the replacing entry is copied to the one of said N central processing units generating the accessing address, the address of said first replacing data block is written in the tag corresponding to the replacing entry, and the exclude indication means of the tag corresponding to the replacing entry is reset to indicate that the replacing entry is used without the exclusive right.

34. A hierarchical memory control system as claimed in claim 27, wherein
said store-in type global buffer storage unit comprising an exclusive data block;
said corresponding divided block storing a required data block;

said corresponding entry comprising a corresponding data block and data; and when the one of said N central processing units generates an accessing address to access the exclusive data block in said store-in type global buffer storage unit with the exclusive right, when the accessing address coincides with said address indication means in one of said tags forming a tag in said tag means, when the valid indication means in said tag indicates that the corresponding entry of said store-in type global buffer storage unit is valid, and when the exclude indication means in said tag indicates that the corresponding entry of the store-in type global buffer storage unit is used without the exclusive right, said buffer control means controls said store-in type global buffer storage unit and said tag means such that, referring to the copy indication means in the tag corresponding to the corresponding entry, another of said N central processing units which stores a copy of the data in the corresponding entry forming copy data is determined forming a determined central processing unit, the corresponding block from which the data is copied to the determined central processing unit is determined forming a determined block, the copy data in the determined central processing unit is made invalid by resetting one of the copy indication means corresponding to the determined central processing unit and to the determined block, the required data block in said store-in type global buffer storage unit is transferred to the one of said N central processing units which is generating said accessing address, the one of the copy indication means corresponding to the corresponding divided block storing said required data block and the one of said N central processing units generating said accessing address is set to indicate that the exclusive data block is being copied to the one of said N central processing units which is generating the accessing address, and the exclude indication means in the tag corresponding to the corresponding entry is set to indicate that the corresponding entry is used with the exclusive right.

35. A hierarchical memory control system as claimed in claim 27, comprising:

data control means for controlling said store-in type global buffer storage unit and said tag means;

said store-in type global buffer storage unit comprising an exclusive data block;

said corresponding divided block storing a required data block; and when the one of said N central processing units generates an accessing address to access the exclusive data block in said store-in type global buffer storage unit with the exclusive right, when the accessing address coincides with said address indication means in one of said tags forming a tag in said tag means, when the valid indication means in said tag indicates that the corresponding entry of said store-in type global buffer storage unit is valid, when the exclude indication means in said tag indicates that the corresponding entry of the store-in type global buffer storage unit is used by another of said N central processing units with the exclusive right, and when the another of said N central processing units using the corresponding entry of the store-in type global buffer storage unit with the exclusive right is the same as the one of said N central processing units generating the accessing address, the data control means controls said store-in type global buffer storage unit and said tag means such that the required data block in said store-in type global buffer storage unit is transferred to the one of said N central processing units generating said accessing address, one of the copy indication means corresponding to the corresponding divided block storing said required data block and the one of said N central processing units generating said accessing address is changed to represent that the exclusive data block is being copied to the one of said N central processing units, and the exclude indication means in the tag corresponding to the corresponding entry is set to indicate that the corresponding entry is used with the exclusive right.

36. A hierarchical memory control system as claimed in claim 27, comprising:

data control means for controlling said store-in type global buffer storage unit and said tag means;

said store-in type global buffer storage unit comprising an exclusive data block; and when the one of said N central processing units generates an accessing address to access the data block in said store-in type global buffer storage unit with the exclusive right when the accessing address coincides with said address indication means in one of said tags forming a tag in said tag means, when the valid indication means in said tag indicates that the corresponding entry of said store-in type global buffer storage unit is valid, when the exclude indication means in said tag indicates that the corresponding entry of the store-in type global buffer storage unit is used by another of said N central processing units with the exclusive right, forming an exclusive central processing unit having exclusive data, and when the exclusive central processing unit using the corresponding entry of the store-in type global buffer storage unit with the exclusive right is different from the one of said N central processing units generating the accessing address, the data control means controls said store-in type global buffer storage unit and said tag means such that the exclusive data in the exclusive central processing unit is forcibly moved out to the data block in the corresponding entry of said store-in type global buffer storage unit forming a forcibly moved out data block, the exclude indication means is set to indicate that the corresponding entry is used with the exclusive right, one of the copy indication means corresponding to the exclusive central processing unit and to the forcibly moved out data block is reset to indicate that the exclusive central processing unit does not copy the data block in the store-in type global buffer storage unit, one of the plurality of modify indication means corresponding to the forcibly moved out data block is reset to indicate that the exclusive central processing unit does not copy the data block in the store-in type global buffer storage unit, one of the plurality of modify indication means corresponding to the forcibly moved out data block is set to indicate that the exclusive data in the forcibly moved out data block has been modified forming a required data block having modified data, the required data block is transferred forming a transferred required block to the one of said N central processing units generating the accessing address, and another of the copy indication means corresponding to the one of said N central processing units generating the accessing address and to the transferred required block is reset to indicate that the modified data in the required block is copied to the one of said N central processing units.

37. A hierarchical memory control system as claimed in claim 27, comprising:

data control means for controlling said store-in type global buffer storage unit and said tag means;

said valid indication means for indicating that the corresponding entry is empty;

said store-in type global buffer storage unit storing an exclusive data block including a required data block; and when the one of said N central processing units generates an accessing address to access the exclusive data block in said store-in type global buffer storage unit with the exclusive right, when the accessing address does not coincide with the address in all of said tags in said tag means, and when the valid indication means in one of said tags forming a tag indicates that the corresponding entry of said store-in type global buffer storage unit is empty forming an empty entry, the data control means controls said store-in type global buffer storage unit and said tag means such that the exclusive data block including the required data block is transferred from said main storage unit to the empty entry in said store-in type global buffer storage unit, the required data block is transferred from the empty entry to the one of said N central processing units which is generating the accessing address, one of the copy indication means corresponding to the exclusive block in the empty entry and the one of said N central processing units which is generating the accessing address is set to indicate that the exclusive data block in the empty entry is copied to the one of said N central processing units generating the accessing address, the valid indication means in the tag corresponding to the empty entry is set to indicate that the empty entry is valid, the exclude indication means in the tag corresponding to the empty entry is set to indicate that the empty entry is used with the exclusive right, and the address of said exclusive data block is written in the tag corresponding to the empty entry.

38. A hierarchical memory control system as claimed in claim 27, comprising:

data control means for controlling said store-in type global buffer storage unit and said tag means;

said store-in type global buffer storage unit storing an exclusive data block, a replacing entry having replacing copy indication means, first contents, first replacing data, a first replacing block, a first replacing data block, second replacing data, and a second replacing block having second contents and a second replacing data block;

said main storage unit storing a storage data block, and transferring a transfer data block having a required data block; and when the one of said N central processing units generates an accessing address to access the exclusive data block in said store-in type global buffer storage unit with the exclusive right, when the accessing address does not coincide with the address in all of said tags in said tag means, when the replacing entry is determined so that the first contents in said replacing entry are to be replaced by the storage data block transferred from said main storage unit, when the valid indication means in one of the tags forming a tag corresponding to said replacing entry indicates that the replacing entry of said store-in type global buffer storage unit is valid, and when the exclude indication means in the tag indicates that the replacing entry is used without the exclusive right, the data control means controls said store-in type global buffer storage unit and said tag means such that, referring to the replacing copy indication means in the replacing entry, another of said N central processing units which is reading the first replacing data in the replacing entry is determined forming a determined central processing unit and the first replacing block in the replacing entry from which the first replacing data block is read to the determined central processing unit is determined forming a determined block having determined data, one of the copy indication means corresponding to the determined central processing unit and to the determined block is reset to indicate that the determined data in the determined central processing unit is made invalid, the second replacing block in the replacing entry corresponding to one of the plurality of modify indication means which indicates that the second replacing data in the second replacing block has been modified is determined forming a second determined block having data, the data in the second determined block is transferred to the main storage unit, the one of the plurality of modify indication means corresponding to the second replacing block from which the data has been transferred to the main storage unit is reset to indicate that the second contents in the second replacing block are not modified, the transfer data block including the required data block is transferred from said main storage unit to the replacing entry in said store-in type global buffer storage unit, the required data block is transferred from the replacing entry to the one of said N central processing units which is generating the accessing address, another of the copy indication means corresponding to the first replacing block in the replacing entry and the one of said N central processing units which is generating the accessing address is set to indicate that the first replacing data block in the first replacing block in the replacing entry is copied to the one of said N central processing units which is generating the accessing address, the exclude indication means in the tag corresponding to the replacing entry is set to indicate that the replacing entry is used with the exclusive right, and the address of said first replacing data block is written in the tag corresponding to the replacing entry.

39. A hierarchical memory control system as claimed in claim 27, comprising:

data control means for controlling said store-in type global buffer storage unit and said tag means;

said store-in type global buffer storage unit storing an exclusive data block, a replacing entry having replacing copy indication means, first contents, first replacing data, a first replacing block, a first replacing data block, second replacing data, and a second replacing block having second contents and a second replacing data block;

said main storage unit storing a storage data block, and transferring a transfer data block having a required data block; and when the one of said N central processing units generates an accessing address to access the exclusive data block in said store-in type global buffer storage unit with the exclusive right, when the accessing address does not coincide with the address in all of said tags in said tag means, when the replacing entry is determined so that the first contents in said replacing entry are to be replaced by the storage data block transferred from said main storage unit, when the valid indication means in one of the tags forming a tag corresponding to said replacing entry indicates that the replacing entry of said store-in type global buffer storage unit is valid, and when the exclude indication means in the tag indicates that the replacing entry is used with the exclusive right, the data control means controls said store-in type global buffer storage unit and said tag means such that, referring to the replacing copy indication means in the replacing entry, another of said N central processing units which is reading the first replacing data in the replacing entry is determined forming a determined central processing unit having copy data and the first replacing block in the replacing entry from which the first replacing data block is read to the determined central processing unit is determined, forming a determined block having determined data, the determined data in the determined central processing unit is forcibly moved out to the main storage unit, one of the copy indication means corresponding to the determined central processing unit and to the determined block is reset to indicate that there is no said copy data in the determined central processing unit, the second replacing block in the replacing entry corresponding to one of the plurality of modify indication means which indicates that the second replacing data in the second replacing block has been modified is determined forming a second determined block having data, the data in the second determined block is transferred to the main storage unit, the one of the plurality of modify indication means corresponding to the second replacing block from which the data has been transferred to the main storage unit is reset to indicate that the second contents in the second replacing block are not modified, the transfer data block including the required data block is transferred from said main storage unit to the replacing entry in said store-in type global buffer storage unit, the required data block is transferred from the replacing entry to the one of said N central processing units which is generating the accessing address, another of the copy indication means corresponding to the first replacing block in the replacing entry and the one of said N central processing units which is generating the accessing address is set to indicate that the first replacing data block in the first replacing block in the replacing entry is copied to the one of said N central processing units generating the accessing address, the address of said first replacing data block is written in the tag corresponding to the replacing entry, and the exclude indication means of the tag corresponding to the replacing entry is set to indicate that the replacing entry is used with the exclusive right.

40. A hierarchical memory control system as claimed in claim 27, comprising:

data control means for controlling said store-in type global buffer storage unit tag means;

said data managing means comprising a nonexclusive managing data block; and while at least one of the N central processing units are referring the nonexclusive data block without the exclusive right, when one of the at least one of the N central processing units requires to process the nonexclusive data block in the buffer storage unit with the exclusive right forming a requesting central processing unit, the data control means controls said store-in type global buffer storage unit and said tag means such that, referring to the copy indication means in one of the tags forming a tag corresponding to the corresponding entry which stores said nonexclusive data block, one of the copy indication means corresponding to another of said N central processing units other than the requesting central processing unit requesting the exclusive right are reset to indicate that the nonexclusive data block read in the another of said N central processing units other than the requesting central processing unit which is requesting the exclusive right are made invalid, and then the exclude indication means in said tag is set to indicate that said nonexclusive data block is read with the exclusive right by the requesting central processing unit requesting the exclusive right.

41. A hierarchical memory control system as claimed in claim 27, comprising:

data control means for controlling said store-in type global buffer storage unit and said tag means;

said store-in type buffer storage unit storing a transfer data block;

said copy indication means includes a corresponding copy indication means;

said store-in type global buffer storage unit comprising a global entry; and when another of the N central processing units issues a request to move out the transfer data block from the buffer storage unit to the store-in type global buffer storage unit, when the exclude indication means in one of the tags corresponding to said transfer data block is set to indicate that the transfer data block is accessed by the another of the N central processing units with the exclusive right, and when the transfer data block to be moved out has been modified by the another of the N central processing units, the data control means controls said store-in type global buffer storage unit and said tag means such that, after moving out the transfer data block from said buffer storage unit to the store-in type global buffer storage unit, the corresponding copy indication means is reset to indicate that the another of the N central processing units does not have a copy of said transfer data block, and one of the plurality of modify indication means corresponding to the transfer data block is set to indicate that said transfer data block moved into the store-in type global entry of the global buffer storage unit has been modified.

42. A hierarchical memory control system as claimed in claim 27, comprising:

data control means for controlling said store-in type global buffer storage unit and said tag means;

said store-in type buffer storage unit storing a transfer data block;

said copy indication means including a corresponding copy indication means; and when another of the N central processing units issues a request to move out the transfer data block from the buffer storage unit to the store-in type global buffer storage unit, when the exclude indication means in one of the tags corresponding to said transfer data block is set to indicate that the transfer data block is accessed by the another of the N central processing units with the exclusive right, and when the transfer data block to be moved out has not been modified by the another of the N central processing units, the data control means controls said store-in type global buffer storage unit and said tag means such that, after moving out the transfer data block from said buffer storage unit to the store-in type global buffer storage unit, the corresponding copy indication means is reset to indicate that the another of the N central processing units does not have a copy of said transfer data block, and one of the plurality of modify indication means corresponding to said transfer data block is not changed.

* * * * *

UNITED STATES PATENT AND TRADEMARK OFFICE
CERTIFICATE OF CORRECTION

PATENT NO. : 5,361,342
DATED : November 1, 1994
INVENTOR(S) : Hirosada TONE

It is certified that error appears in the above-indentified patent and that said Letters Patent is hereby corrected as shown below:

Title page, [75] Inventor, delete "Fuchu" and insert therefor –Tokyo–.

Col. 4, line 46, delete "(#)" and insert therefor –(#1)–.

Col. 5, line 31, delete "priest" and insert therefor –present–.

Col. 7, line 29, delete "(N $\geqq$ 2)" and insert therefor –(N $\geq$ 2)–.

Signed and Sealed this

Twenty-first Day of March, 1995

Attest:

BRUCE LEHMAN

Attesting Officer  Commissioner of Patents and Trademarks